US010924977B2

(12) United States Patent
Kumar et al.

(10) Patent No.: US 10,924,977 B2
(45) Date of Patent: Feb. 16, 2021

(54) FORBIDDEN AREA PROCEDURES AND CONNECTION RELEASE MANAGEMENT

(71) Applicant: QUALCOMM Incorporated, San Diego, CA (US)

(72) Inventors: Rajeev Kumar, Bangalore (IN); Kundan Lucky, Bangalore (IN); Rohit Kapoor, Bangalore (IN); Fatih Ulupinar, San Diego, CA (US); Ravindra Manohar Patwardhan, San Diego, CA (US); Preeti Srinivas Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/343,906

(22) PCT Filed: Jun. 29, 2017

(86) PCT No.: PCT/US2017/040124
§ 371 (c)(1),
(2) Date: Apr. 22, 2019

(87) PCT Pub. No.: WO2018/080606
PCT Pub. Date: May 3, 2018

(65) Prior Publication Data
US 2020/0059295 A1 Feb. 20, 2020

(30) Foreign Application Priority Data

Oct. 24, 2016 (IN) .............................. 201641036384

(51) Int. Cl.
H04W 48/04 (2009.01)
H04B 7/185 (2006.01)
(Continued)

(52) U.S. Cl.
CPC ........ H04W 48/04 (2013.01); H04B 7/18541 (2013.01); H04B 7/18545 (2013.01);
(Continued)

(58) Field of Classification Search
USPC ........................................................ 455/430
See application file for complete search history.

(56) References Cited

U.S. PATENT DOCUMENTS 6,567,668 B1   5/2003   Valentine et al.
6,868,270 B2   3/2005   Dent
(Continued)

FOREIGN PATENT DOCUMENTS

CN   101600228 A   12/2009
CN   102223595 A   10/2011
(Continued)

OTHER PUBLICATIONS

3GPP TS 36.300 version 8.5.0 Release 8 (Jul. 2008) Jul. 2008 (Year: 2008).*

(Continued)

Primary Examiner — Nathan S Taylor

(57) ABSTRACT

The disclosure relates in some aspects to forbidden area procedures and connection release management for a user terminal (UT). Forbidden area-related procedures include, for example, using a special paging area code (PAC) in conjunction with a forbidden area, defining a location reporting threshold for a UT based on the proximity of the UT to a forbidden area, or using a default paging area code if a service restriction for a UT has ended. Connection release management includes, for example, a UT sending a request to cause the release of a Radio Connection that the UT no longer needs, or a UT sending a Location Indication (e.g., including a flag requesting release of a connection) to release the connection used for location reporting when a (Continued)

UT is done sending the location information and is going to go back to idle mode.

16 Claims, 58 Drawing Sheets

(51) Int. Cl.
| | |
|---|---|
| *H04W 68/00* | (2009.01) |
| *H04W 76/30* | (2018.01) |
| *H04W 76/20* | (2018.01) |
| *H04W 4/021* | (2018.01) |
| *H04W 4/02* | (2018.01) |
| *H04W 68/02* | (2009.01) |
| *H04W 76/27* | (2018.01) |
| *H04W 60/04* | (2009.01) |
| *H04W 60/00* | (2009.01) |
| *H04W 64/00* | (2009.01) |
| *G08G 1/00* | (2006.01) |

(52) U.S. Cl.
CPC ..... *H04B 7/18558* (2013.01); *H04B 7/18565* (2013.01); *H04W 4/02* (2013.01); *H04W 4/021* (2013.01); *H04W 60/04* (2013.01); *H04W 68/005* (2013.01); *H04W 68/02* (2013.01); *H04W 76/20* (2018.02); *H04W 76/27* (2018.02); *H04W 76/30* (2018.02); *G08G 1/207* (2013.01); *H04W 4/023* (2013.01); *H04W 60/00* (2013.01); *H04W 64/00* (2013.01)

(56) References Cited

U.S. PATENT DOCUMENTS

| | | | |
|---|---|---|---|
| 7,181,212 B2 | 2/2007 | Hogan et al. | |
| 7,346,361 B2 | 3/2008 | Kang et al. | |
| 8,116,736 B2 | 2/2012 | Dalsgaard et al. | |
| 8,195,188 B2 | 6/2012 | Fomukong et al. | |
| 8,559,942 B2 | 10/2013 | Fomukong et al. | |
| 9,504,013 B2 | 11/2016 | Ahluwalia et al. | |
| 2002/0045455 A1* | 4/2002 | Spratt | G01S 1/045 |
| | | | 455/456.1 |
| 2002/0111180 A1 | 8/2002 | Hogan et al. | |
| 2003/0022689 A1* | 1/2003 | McElwain | H04M 15/00 |
| | | | 455/551 |
| 2005/0101288 A1 | 5/2005 | Hulkkonen et al. | |
| 2007/0105567 A1 | 5/2007 | Mohanty et al. | |
| 2008/0305835 A1* | 12/2008 | Johnstone | H04W 48/02 |
| | | | 455/561 |
| 2009/0003285 A1 | 1/2009 | Mohanty et al. | |
| 2010/0002720 A1 | 1/2010 | Ji et al. | |
| 2010/0075658 A1* | 3/2010 | Hou | H04W 48/02 |
| | | | 455/422.1 |
| 2010/0289659 A1 | 11/2010 | Verbil | |
| 2011/0061106 A1* | 3/2011 | Kovacs | G06F 21/6263 |
| | | | 726/26 |
| 2013/0225172 A1 | 8/2013 | Singh et al. | |
| 2013/0288679 A1 | 10/2013 | Yi et al. | |
| 2015/0078250 A1* | 3/2015 | Mineta | H04J 13/0051 |
| | | | 370/320 |
| 2016/0247330 A1* | 8/2016 | Rork | H04W 4/021 |
| 2016/0323800 A1 | 11/2016 | Ulupinar et al. | |
| 2019/0174571 A1* | 6/2019 | Deenoo | H04W 36/30 |
| 2019/0246342 A1* | 8/2019 | Wang | H04W 36/08 |
| 2019/0253952 A1 | 8/2019 | Kumar et al. | |

FOREIGN PATENT DOCUMENTS

| | | | | |
|---|---|---|---|---|
| CN | 102223603 A | 10/2011 | | |
| CN | 103929795 A | 7/2014 | | |
| CN | 105910610 A | 8/2016 | | |
| EP | 2355600 A1 | 8/2011 | | |
| EP | 2950504 A1 | 12/2015 | | |
| GB | 2344677 A | 6/2000 | | |
| WO | WO-2010109300 A1 * | 9/2010 | ........ | H04W 36/0055 |
| WO | WO-2012142114 A1 | 10/2012 | | |

OTHER PUBLICATIONS

International Search Report and Written Opinion—PCT/US2017/040124—ISA/EPO—dated Feb. 21, 2018.
Partial International Search Report—PCT/US2017/040124—ISA/EPO—dated Nov. 14, 2017.
Xie J., "Paging-Aided Connection Setup for Real-Time Communication in Mobile Internet", New Frontiers in Telecommunications, IEEE International Conference on Communications, ICC 2003, Anchorage, Alaska; IEEE Operations Center, Piscataway, NJ, vol. 3, May 11, 2003, pp. 1858-1862, XP009074809, DOI: 10.1109/ICC.2003.1203921, ISBN: 978-0-7803-7802-5.
International Preliminary Report on Patentability—PCT/US2017/040120, The International Bureau of WIPO—Geneva, Switzerland, dated Feb. 22, 2019.
International Preliminary Report on Patentability—PCT/US2017/040124, The International Bureau of WIPO—Geneva, Switzerland, dated Feb. 14, 2019.
International Search Report and Written Opinion—PCT/US2017/040120—ISA/EPO—dated Jan. 16, 2018.
Partial International Search Report—PCT/US2017/040120—ISA/EPO—dated Oct. 16, 2017.

* cited by examiner

FORBIDDEN AREA PROCEDURES AND CONNECTION RELEASE MANAGEMENT

CROSS-REFERENCE TO RELATED APPLICATION(S)

This application claims priority to and the benefit of Indian Patent Application Serial No. 201641036384, filed on Oct. 24, 2016, the entire content of which is incorporated herein by reference.

INTRODUCTION

Various aspects described herein relate to wireless communication and, more particularly but not exclusively, to forbidden area procedures and connection release management.

A satellite-based communication system may include one or more satellites to relay communication signals between gateways and user terminals (UTs). A gateway is an earth station having an antenna for transmitting signals to, and receiving signals from, communication satellites. A gateway provides communication links, using the satellites, for connecting a UT to other UTs or to users of other communication systems, such as a public switched telephone network, the Internet and various public and/or private networks. In some aspects, a satellite is an orbiting receiver and repeater used to relay information.

Geosynchronous satellites have long been used for communication. A geosynchronous satellite is stationary relative to a given location on the earth. However, because geosynchronous satellites are limited to a geosynchronous orbit (GSO), which is a circle having a radius of approximately 42,164 km from the center of the earth directly above the earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire earth or at least large parts of the earth. In non-geosynchronous satellite-based systems, such as LEO satellite-based systems, the satellites move relative to a communication device (such as a gateway or a UT) on the ground.

At some point in time, a UT may need to be handed-off to another satellite. For example, a UT that in communication with a particular LEO satellite may need to be handed-off to a different LEO satellite as the satellites move within their respective orbits. It is desirable to ensure that a UT can readily be paged as the coverage for the UT shifts from satellite to satellite. In addition, a UT might not be entitled to service or might not be able to access service in certain locations (e.g., so-called forbidden areas). It is desirable to properly handle service rejections, re-connections, and related operations in areas in and around these forbidden areas. Accordingly, there is a need for effective techniques for managing paging areas, forbidden areas, and connection signaling.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, a method of communication includes determining that a user terminal (UT) is located within a forbidden area, and sending a Radio Connection Reconfiguration message to the UT as a result of the determination, wherein the Radio Connection Reconfiguration message includes a paging area code (PAC) associated with the forbidden area for the UT. In some aspects, the method further includes receiving a Radio Connection Release message after sending the Radio Connection Reconfiguration message where the Radio Connection Release message includes a request to initiate a Core Network Control Layer update procedure, and initiating the Core Network Control Layer update procedure as a result of receiving the Radio Connection Release message. In some aspects, the Core Network Control Layer update procedure includes sending a forbidden paging area code (PAC). In some aspects, the Radio Connection Release message includes a request to initiate a Core Network Control Layer update procedure. In some aspects, the Radio Connection Release message includes timing information that controls when the UT is to attempt reconfiguration. In some aspects, the Radio Connection Release message includes information indicative of the forbidden area.

In an aspect of the disclosure, an apparatus for communication includes a memory and a processor coupled to the memory. The processor and the memory are configured to determine that a user terminal (UT) is located within a forbidden area, and send a Radio Connection Reconfiguration message to the UT as a result of the determination, wherein the Radio Connection Reconfiguration message includes a paging area code associated with the forbidden area for the UT.

In an aspect of the disclosure, an apparatus for communication includes means for determining that a user terminal (UT) is located within a forbidden area, and means for sending a Radio Connection Reconfiguration message to the UT as a result of the determination, wherein the Radio Connection Reconfiguration message includes a paging area code associated with the forbidden area for the UT.

In an aspect of the disclosure, a non-transitory computer-readable medium storing computer-executable code includes code to: determine that a user terminal (UT) is located within a forbidden area, and send a Radio Connection Reconfiguration message to the UT as a result of the determination, wherein the Radio Connection Reconfiguration message includes a paging area code associated with the forbidden area for the UT.

In some aspects, a method of communication includes receiving location information for a user terminal (UT), determining, based on the location information, a proximity of the UT to a forbidden area, and defining a location reporting threshold for the UT based on the determination. In some aspects, the method further includes sending the location reporting threshold to the UT via a Radio Connection Reconfiguration message. In some aspects, the location reporting threshold comprises a distance threshold. In some aspects, the location reporting threshold includes a duration threshold. In some aspects, the determination includes determining that the UE is near the forbidden area. In some aspects, the determination includes determining that the UE is in the forbidden area.

In an aspect of the disclosure, an apparatus for communication includes a memory and a processor coupled to the memory. The processor and the memory are configured to receive location information for a user terminal (UT), determine, based on the location information, a proximity of the UT to a forbidden area, and define a location reporting threshold for the UT based on the determination.

In an aspect of the disclosure, an apparatus for communication includes means for receiving location information for a user terminal (UT), means for determining, based on the location information, a proximity of the UT to a forbidden area, and means for defining a location reporting threshold for the UT based on the determination.

In an aspect of the disclosure, a non-transitory computer-readable medium storing computer-executable code includes code to: receive location information for a user terminal (UT), determine, based on the location information, a proximity of the UT to a forbidden area, and define a location reporting threshold for the UT based on the determination. send the location reporting threshold to the UT via a Radio Connection Reconfiguration message.

In some aspects, a method of communication includes determining that a service restriction for a user terminal (UT) has ended, and conducting a mobility operation using a default paging area code (PAC) as a result of the determination. In some aspects, the conducting of the mobility operation includes initiating a Register procedure, and initiating a Radio Connection without sending any PAC information. In some aspects, the default PAC is excluded from a set of paging area codes used for paging area update operations. In some aspects, the default PAC is used between a Core Network Control Layer and a Radio Connection Layer internal to the UT. In some aspects, the default PAC is not sent in any signaling messages over-the-air.

In an aspect of the disclosure, an apparatus for communication includes a memory and a processor coupled to the memory. The processor and the memory are configured to determine that a service restriction for a user terminal (UT) has ended, and conduct a mobility operation using a default paging area code (PAC) as a result of the determination.

In an aspect of the disclosure, an apparatus for communication includes means for determining that a service restriction for a user terminal (UT) has ended, and means for conducting a mobility operation using a default paging area code (PAC) as a result of the determination In an aspect of the disclosure, a non-transitory computer-readable medium storing computer-executable code includes code to: determine that a service restriction for a user terminal (UT) has ended, and conduct a mobility operation using a default paging area code (PAC) as a result of the determination In some aspects, a method of communication includes determining that a trigger condition has occurred at a user terminal (UT), and sending a request, from the UT, to release a connection as a result of the determination. In some aspects, the determination that the trigger condition has occurred includes determining that the UT will enter idle mode after reporting location information for the UT. In some aspects, the method further includes sending the location information for the UT, wherein the location information is sent in conjunction with the request to release the connection. In some aspects, the determination that the trigger condition has occurred includes determining that a network has completed downloading of satellite transition information. In some aspects, the determination that the trigger condition has occurred includes determining that the UT has completed sending of location information. In some aspects, the determination that the trigger condition has occurred includes determining that the UT will transition to idle mode. In some aspects, the determination that the trigger condition has occurred includes determining that a procedure for which the connection was established has completed. In some aspects, the connection is a Radio Connection for the UT. In some aspects, the connection is a Core Network Interface connection.

In an aspect of the disclosure, an apparatus for communication includes a memory and a processor coupled to the memory. The processor and the memory are configured to determine that a trigger condition has occurred at a user terminal (UT), and send a request, from the UT, to release a connection as a result of the determination.

In an aspect of the disclosure, an apparatus for communication includes means for determining that a trigger condition has occurred at a user terminal (UT), and means for sending a request, from the UT, to release a connection as a result of the determination.

In an aspect of the disclosure, a non-transitory computer-readable medium storing computer-executable code includes code to: determine that a trigger condition has occurred at a user terminal (UT), and send a request, from the UT, to release a connection as a result of the determination.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

The disclosure relates in some aspects to communicating paging area information for a user terminal (UT). In some aspects, Radio signals are used to provide paging area code (PAC) information. For example, a network may send a PAC to a UT via a Radio Connection Reject message or a Radio Connection Reconfiguration message. In some aspects, the PAC may be a special PAC to be used in conjunction with a forbidden area. In some aspects, a UT may send its old PAC to the network (e.g., upon request or during a PAC update).

The disclosure relates in some aspects to use of a default PAC. For example, a camping UT may use a default PAC known by the UT and a network to enable the UT to obtain PAC information from the network. In one use case, a UT that has not yet been assigned a PAC by the network can use the default PAC to start a signaling procedure. In response, the network sends a PAC to the UT via signaling (e.g., via a connection setup message or a connection reject message). In another use case, a UT may discard a network-provided PAC and use the reserved PAC upon lapse of a service restriction (e.g., upon the UT leaving a forbidden area). The UT may then use the reserved PAC for a connection re-attempt procedure.

The disclosure relates in some aspects to UT location reporting. For example, a location reporting threshold may be defined for a UT based on the proximity of the UT to a forbidden area. As another example, a network may send a Location Request message to a UT to request the UT's latest location (e.g., GPS location).

The disclosure relates in some aspects to connection release management. For example, a UT may send a request to cause the release of a Radio Connection that the UT no longer needs. As another example, a UT may send a Location Indication (e.g., including a flag requesting release of a connection) to release the connection used for location reporting when a UT is done sending the location information and is going to go back to idle mode. As yet another example, the network may send to the UT a Radio Connection Release message that includes information such as: a duration indication, a Restricted Area Definition, an indication to force initiation of an update procedure, or any combination thereof.

The disclosure relates in some aspects to connection reject management. For example, the network may send to the UT a Radio Connection Reject message that includes information such as: a new PAC for the UT, a request for the UT to immediately attempt to reconnect to the network, or a request for an old PAC.

Various aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

I. Example Satellite System

Figure 1:
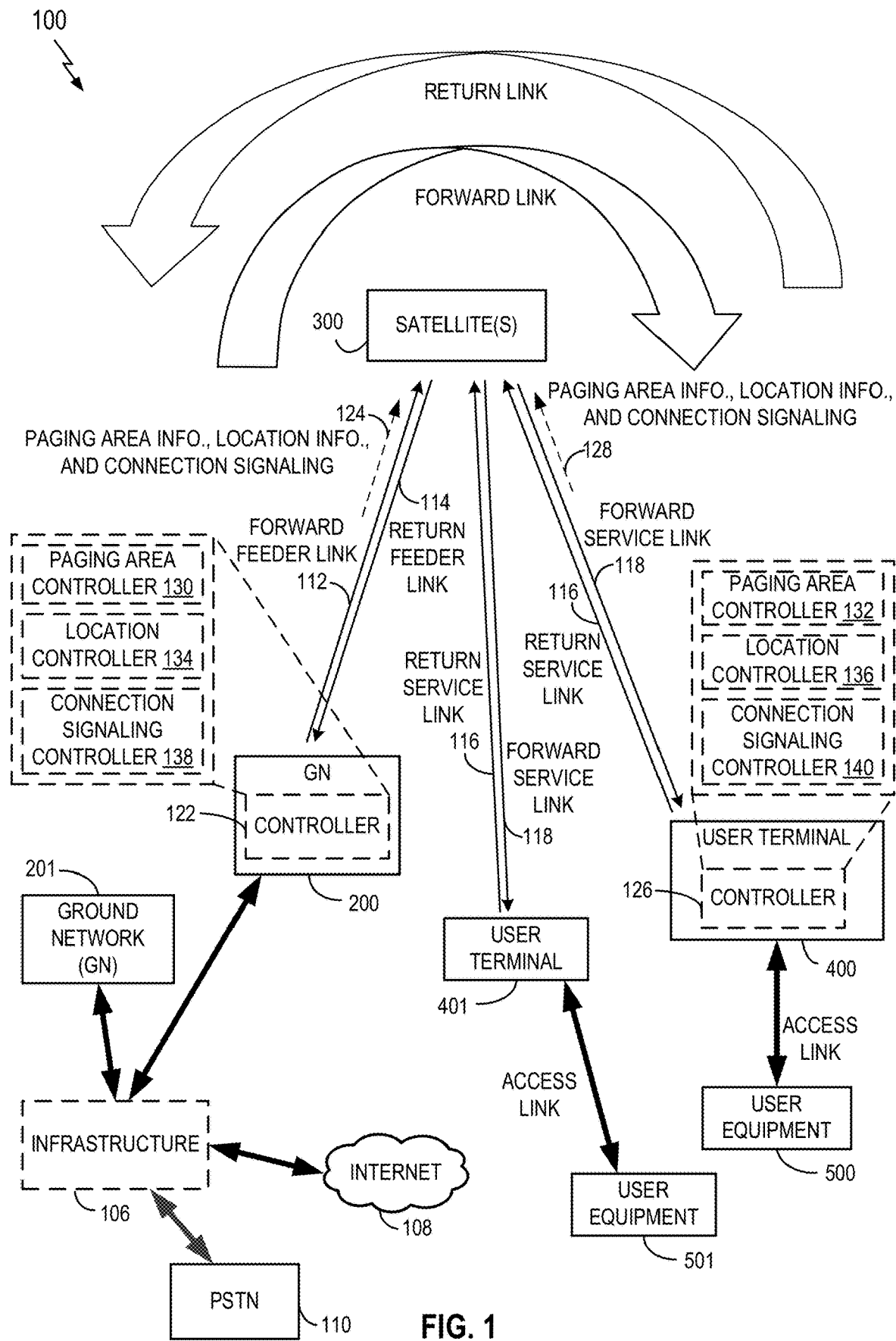
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), a ground network (GN) 200 (e.g., corresponding to a satellite gateway or a satellite network portal) in communication with the satellite 300, a plurality of UTs 400 and 401 in communication with the satellite 300, and a plurality of user equipment (UE) 500 and 501 in communication with the UTs 400 and 401, respectively.

The satellite 300 can receive signals from and transmit signals to the UT 400, 401 provided the UT 400, 401 is within the "footprint" of the satellite 300. The footprint of the satellite 300 is the geographic region on the surface of the earth within the range of signals of the satellite 300. The footprint is usually geographically divided into "beams," through the use of antennas (e.g., the antennas may be used to create fixed, static beams or may be used to create dynamically adjustable beams through beam-forming techniques). A cell may constitute any forward link frequency within a beam. In the case where each beam uses only one frequency, "cell" and "beam" are interchangeable. Each beam covers a particular geographic region within the footprint. Beams may be directed so that more than one beam from the same satellite 300 covers the same specific geographic region. In addition, beams from multiple satellites 300 may be directed to cover the same geographic region.

Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The GN 200 may have access to the Internet 108 or one or more other types of public, semiprivate or private networks. In the example illustrated in FIG. 1, the GN 200 is in communication with infrastructure 106, which is capable of accessing the Internet 108 or one or more other types of public, semiprivate or private networks. The GN 200 may also be coupled to various types of communication backhaul, including, for example, landline networks such as optical fiber networks or public switched telephone networks (PSTN) 110. Further, in alternative implementations the GN 200 may interface to the Internet 108, PSTN 110, or one or more other types of public, semiprivate or private networks without using the infrastructure 106. Still further, the GN 200 may communicate with other GNs, such as the GN 201 through the infrastructure 106 or alternatively may be configured to communicate to the GN 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the GN 200 in both directions are called feeder links, whereas communication between the satellite and each of the UTs 400 and 401 in both directions are called service links A signal path from the satellite 300 to a ground station, which may be the GN 200 or one of the UTs 400 and 401, may be generically called a downlink A signal path from a ground station to the satellite 300 may be generically called an uplink Additionally, as illustrated, signals can have a general directionality such as a forward link and a return link (or reverse link). Accordingly, a communication link in a direction originating from the GN 200 and terminating at the UT 400 through the satellite 300 is called a forward link, whereas a communication link in a direction originating from the UT 400 and terminating at the GN 200 through the satellite 300 is called a return link or a reverse link. As such, the signal path from the GN 200 to the satellite 300 is labeled a "Forward Feeder Link" 112 whereas the signal path from the satellite 300 to the GN 200 is labeled a "Return Feeder Link" 114 in FIG. 1. In a similar manner, the signal path from each UT 400 or 401 to the satellite 300 is labeled a "Return Service Link"

116 whereas the signal path from the satellite 300 to each UT 400 or 401 is labeled a "Forward Service Link" 118 in FIG. 1.

A controller 122 of the GN 200 generates, uses, and manages paging area information, location information, and connection signaling 124 in cooperation with a controller 126 of the UT 400 that likewise generates, uses, and manages paging area information, location information, and connection signaling 128.

For example, functionality for paging area management 130 of the controller 122 may perform paging-related tasks (e.g., paging area updates) and send the associated paging area information to the UT 400. In response, functionality for paging area management 132 of the controller 126 may process the received paging information to assign paging areas to the UT 400 and perform related operations.

In a complementary manner, the functionality for paging area management 132 may perform paging-relates tasks (e.g., paging area updates) send the associated paging area information to the GN 200. For example, the functionality for paging area management 132 may report current or previous paging areas allocated to the UT 400. In response, the functionality for paging area management 130 may process received paging information to reassign paging areas for the UT 400 and perform related operations.

Functionality for location management 134 of the controller 122 and functionality for location management 136 of the controller 126 may communicate to enable the GN 200 to obtain location information from the UT 400. For example, the functionality for location management 136 may determine the location of the UT 400 and send an indication of this location to the GN 200. The functionality for location management 134 may use the location information, for example, to determine whether the UT 400 is in a forbidden area. The functionality for location management 134 may also request the location information from and send location reporting thresholds to the functionality for location management 136.

Functionality for connection signaling management 138 of the controller 122 and functionality for connection signaling management 140 of the controller 126 may cooperate to establish and tear down connections used for obtaining paging area information, sharing location-related information, handling operations in forbidden areas, and other purposes. To this end, the functionality for connection signaling management 140 may send connection request messages, connection release request messages, and other connection-related signaling to the GN 200. Similarly, the functionality for connection signaling management 138 may send connection reject messages, connection release messages, connection request messages, connection establishment messages, restricted area information, and other connection-related signaling to the UT 400.

Other components of the satellite communication system 100 may include corresponding controllers as well. For example, other GNs, satellites, and UTs (not shown) may include corresponding controllers.

Figure 2:
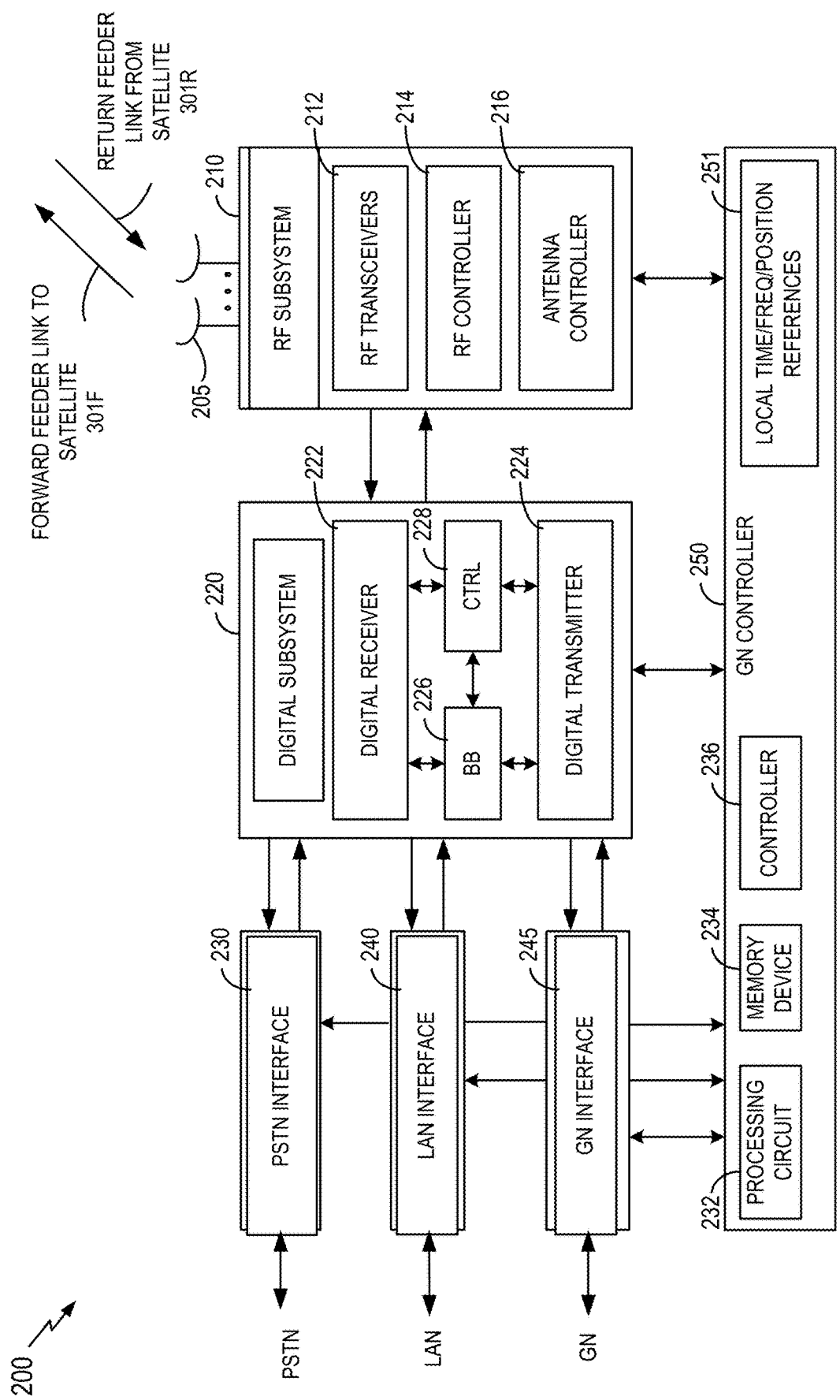
FIG. 2 is a block diagram of an example of a ground network (GN) of FIG. 1 in accordance with some aspects of the disclosure.

FIG. 2 is an example block diagram of the GN 200, which also can apply to the GN 201 of FIG. 1. The GN 200 is shown to include a number of antennas 205, an RF subsystem 210, a digital subsystem 220, a Public Switched Telephone Network (PSTN) interface 230, a Local Area Network (LAN) interface 240, an GN interface 245, and an GN controller 250. The RF subsystem 210 is coupled to the antennas 205 and to the digital subsystem 220. The digital subsystem 220 is coupled to the PSTN interface 230, to the LAN interface 240, and to the GN interface 245. The GN controller 250 is coupled to the RF subsystem 210, the digital subsystem 220, the PSTN interface 230, the LAN interface 240, and the GN interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the GN 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2)

apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the GN 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The GN interface 245 may provide communication signals to, and receive communication signals from, one or more other GNs associated with the satellite communication system 100 of FIG. 1 (and/or to/from GNs associated with other satellite communication systems, not shown for simplicity). For some implementations, the GN interface 245 may communicate with other GNs via one or more dedicated communication lines or channels (not shown for simplicity). For other implementations, the GN interface 245 may communicate with other GNs using the PSTN 110 and/or other networks such as the Internet 108 (see also FIG. 1). For at least one implementation, the GN interface 245 may communicate with other GNs via the infrastructure 106.

Overall GN control may be provided by the GN controller 250. The GN controller 250 may plan and control utilization of the satellite 300's resources by the GN 200. For example, the GN controller 250 may analyze trends, generate traffic plans, allocate satellite resources, monitor (or track) satellite positions, and monitor the performance of the GN 200 and/or the satellite 300. The GN controller 250 may also be coupled to a ground-based satellite controller (not shown for simplicity) that maintains and monitors orbits of the satellite 300, relays satellite usage information to the GN 200, tracks the positions of the satellite 300, and/or adjusts various channel settings of the satellite 300.

For the example implementation illustrated in FIG. 2, the GN controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the GN 200 with each other and/or with the satellite(s) 300. The local time, frequency, and position references 251 may also provide position information (e.g., ephemeris data) of the satellite(s) 300 to the various components of the GN 200. Further, although depicted in FIG. 2 as included within the GN controller 250, for other implementations, the local time, frequency, and the position references 251 may be a separate subsystem that is coupled to the GN controller 250 (and/or to one or more of the digital subsystem 220 and the RF subsystem 210).

Although not shown in FIG. 2 for simplicity, the GN controller 250 may also be coupled to a network control center (NCC) and/or a satellite control center (SCC). For example, the GN controller 250 may allow the SCC to communicate directly with the satellite(s) 300, for example, to retrieve ephemeris data from the satellite(s) 300. The GN controller 250 may also receive processed information (e.g., from the SCC and/or the NCC) that allows the GN controller 250 to properly aim its antennas 205 (e.g., at the appropriate satellite(s) 300), to schedule beam transmissions, to coordinate handoffs, and to perform various other well-known functions.

The GN controller 250 may include one or more of a processing circuit 232, a memory device 234, or a controller 236 that independently or cooperatively perform operations related to paging, location reporting, connection signaling, and so on for the GN 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the controller 236 is configured (e.g., programmed) to perform some or all of these operations. Although depicted in FIG. 2 as included within the GN controller 250, for other implementations, one or more of the processing circuit 232, the memory device 234, or the controller 236 may be a separate subsystem that is coupled to the GN controller 250 (and/or to one or more of the digital subsystem 220 and the RF subsystem 210).

Figure 3:
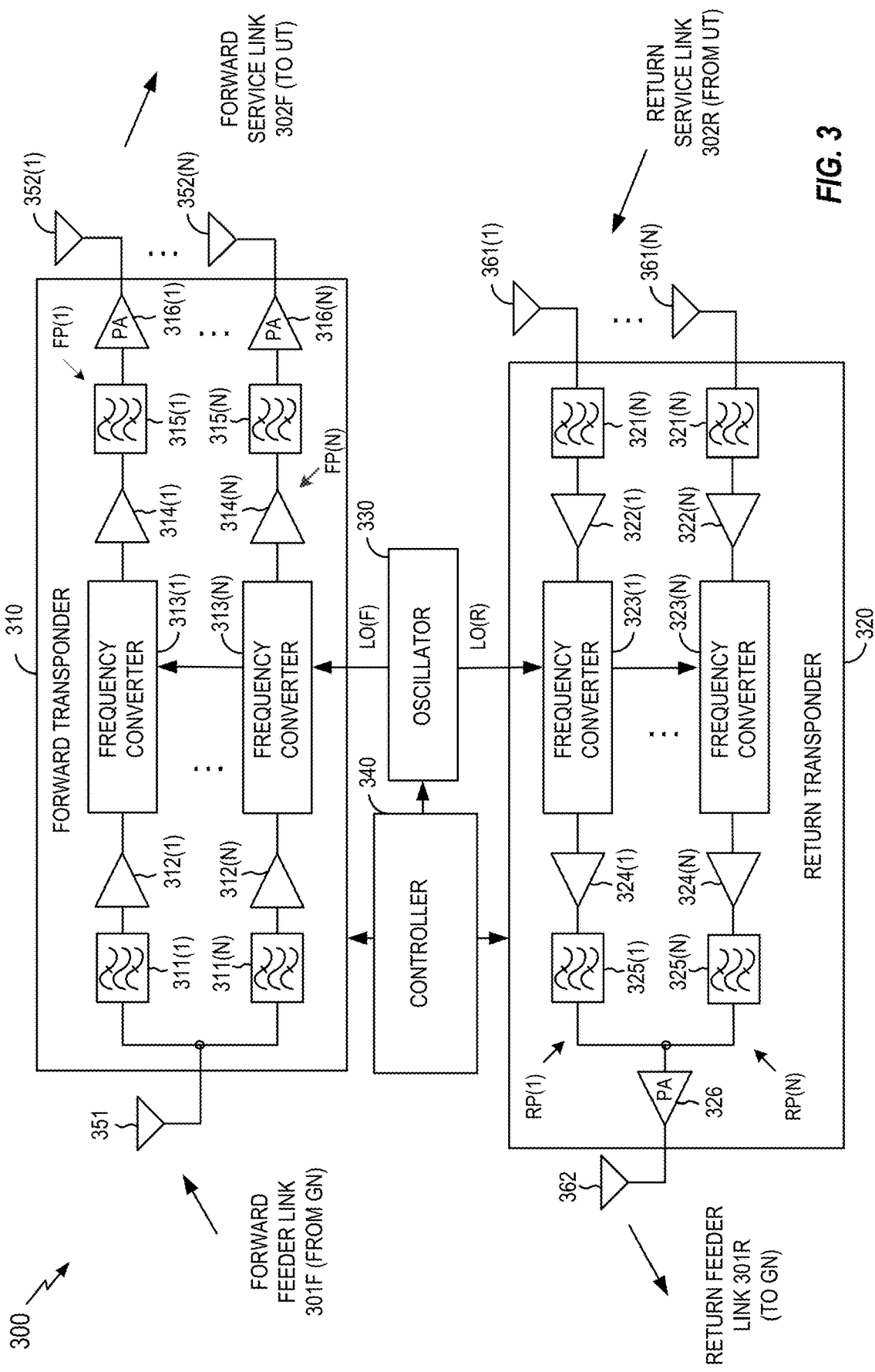
FIG. 3 is a block diagram of an example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the GN 200 and the UT 400. It will be appreciated that the disclosure is not limited to any specific satellite configuration and any satellite or combinations of satellites that can provide the functional connection between the GN 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the GN 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the GN 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the GN 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the GN 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the GN 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

Figure 4:
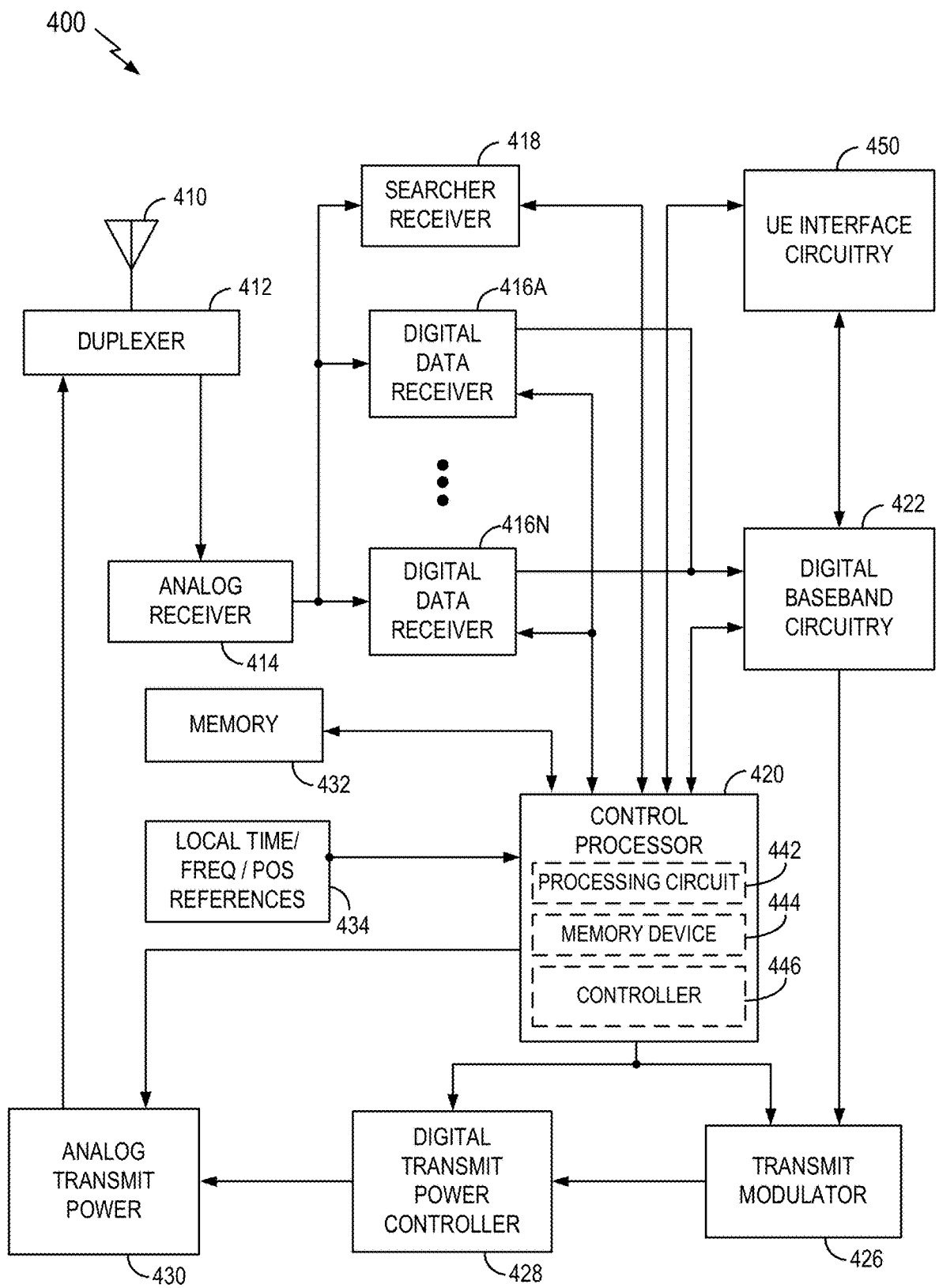
FIG. 4 is a block diagram of an example of a UT of FIG. 1 in accordance with some aspects of the disclosure.

FIG. 4 is an example block diagram of the UT 400 or the UT 401 for illustrative purposes only. It will be appreciated that specific UT configurations can vary significantly. Thus, the disclosure is not limited to any specific UT configuration and any UT that can provide the functional connection between the satellite 300 and the UE 500 or 501 can be considered within the scope of the disclosure.

UTs may be used in various applications. In some scenarios, a UT may provide a cellular backhaul. In this case, the UT may have a relatively large antenna and/or multiple antennas (e.g., to protect against blockage). In some scenarios, a UT may be deployed in an enterprise environment (e.g., placed on the roof of a building). In this case, the UT may have a relatively large antenna and/or multiple antennas (e.g., to provide relatively high backhaul bandwidth). In some scenarios, a UT may be deployed in a residential environment (e.g., placed on the roof of a house). In this case, the UT may have a smaller (and relatively inexpensive) antenna and provide fixed access for data service (e.g., Internet access). In some scenarios, a UT may be deployed in a maritime environment (e.g., placed on a cruise ship, a cargo ship, etc.). In this case, the UT may have a relatively large antenna and/or multiple antennas (e.g., to prevent blockage and provide relatively high bandwidth data service). In some scenarios, a UT may be deployed on a vehicle (e.g., carried by first responders, emergency crews, etc.). In this case, the UT may have a smaller antenna and used to provide temporary Internet access to a particular area (e.g., where cellular service is out). Other scenarios are possible.

The configuration of a particular UT may depend on the application for which the UT will be used. For example, the type of antenna, the antenna shape, the quantity of antennas, the supported bandwidth, the supported transmit power, the receiver sensitivity, etc., may depend on the corresponding application. As one example, a flat panel antenna (with a relatively low profile) may be used for aircraft applications.

In the example of FIG. 4, the UT is shown to include a transceiver where at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency paging elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a controller 446 that independently or cooperatively perform operations related to paging, location reporting, connection signaling, and so on for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the controller 446 is configured (e.g., programmed) to perform some or all of these operations. Although depicted in FIG. 4 as included within the control processor 420, for other implementations, one or more of the processing circuit 442, the memory device 444, or the controller 446 may be a separate subsystem that is coupled to the control processor 420.

Figure 5:
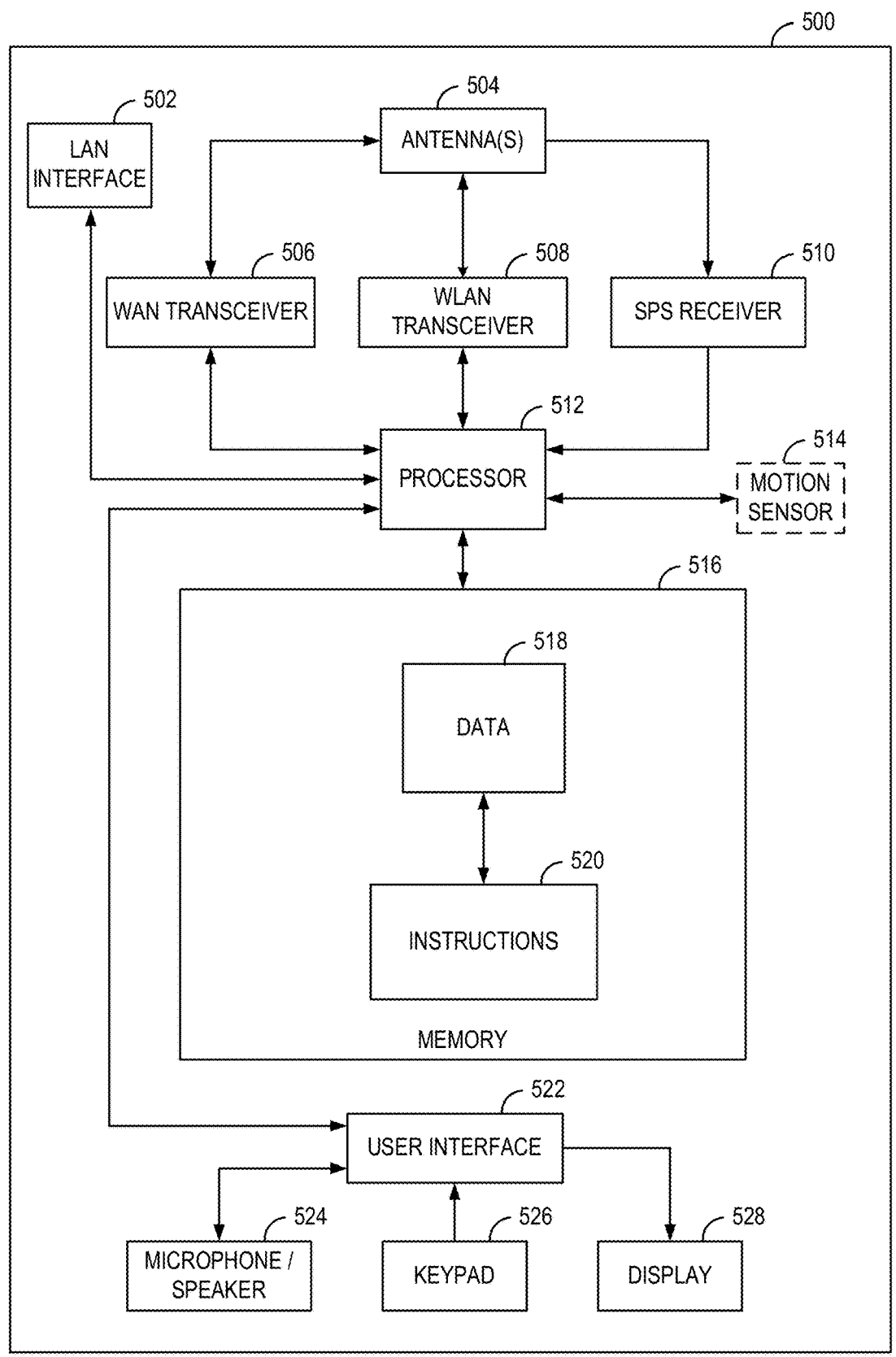
FIG. 5 is a block diagram of an example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the GN's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an GN. Thus, an GN may have several NACs (e.g., implemented by the GN controller 250 of FIG. 2), each of which controls a corresponding one of the satellites controlled by the GN. In addition, a given satellite may support multiple beams Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

II. Example Details of a Satellite Communication System

Figure 6:
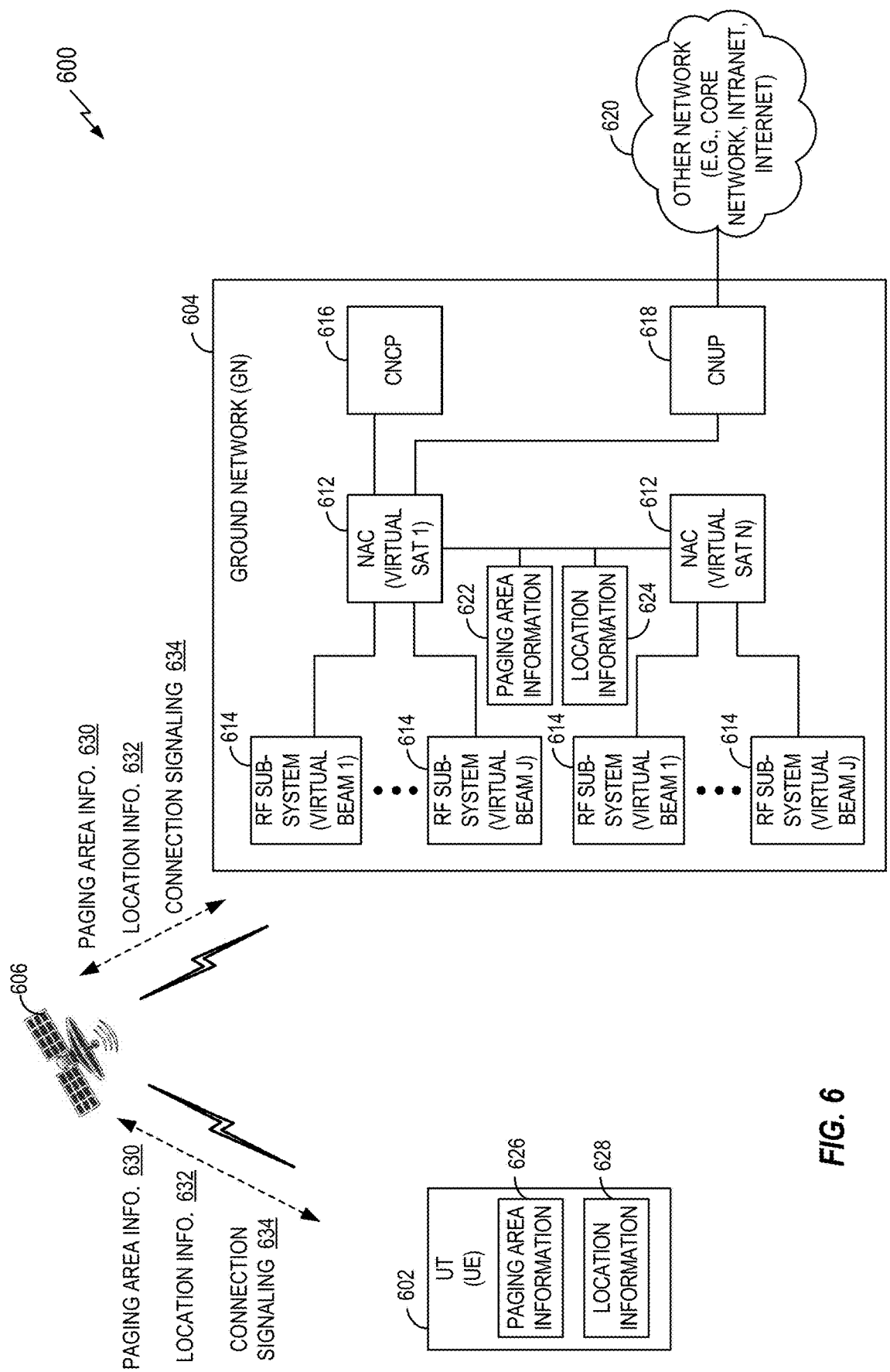
FIG. 6 is a block diagram of an example communication system in accordance with some aspects of the disclosure.

FIG. 6 illustrates a non-geosynchronous satellite communication system 600, such as a LEO satellite communication system for data, voice, video, or other communication, in which the above information, signaling, and procedures may be used. The communication system 600 includes UT 602 that can communicate with a GN 604 via a satellite 606. The UT 602, the GN 604, and the satellite 606 may respectively correspond to, for example, the UT 400, the GN 200, and the satellite 300 of FIG. 1.

The GN 604 also includes a core network control plane (CNCP) 616 and a core network user plane (CNUP) 618, or other similar functionality, for communicating with another network 620. In some aspects, a CNCP may provide mobility management functionality such as, for example, keeping track of the current location of UTs through the use of paging areas, location areas, routing areas, or some other suitable technique; controlling paging for UTs; and providing access control for UTs. In some aspects, a CNUP may provide gateway functionality such as, for example, interfacing with a packet network and/or other types of networks. The network 620 may thus represent, for example, a core network (e.g., 3G, 4G, 5G, etc.), an intranet, the Internet, some other type of network, or a combination thereof.

The GN 604 includes network access controllers (NACs) 612, each of which interfaces with one or more radio frequency (RF) subsystems 614 for communicating with the UT 602 and other UTs (not shown) via the satellite 606 (or some other satellite, not shown). In some aspects, a NAC 612 may provide radio interface functionality such as modulation, demodulation, channel coding, channel decoding, multiplexing and demultiplexing. In addition, a NAC 612 may support Radio functions such as broadcast of system information and Radio connection control.

Example functionality of a NAC (e.g., a NAC 612 of FIG. 6) will be described in more detail in the context of a satellite communication system 700 of FIG. 7. As shown, a NAC may include two components, a BxP and an AxP, for controlling and/or communicating via a satellite. Thus, in general, the functionality of the components of FIG. 7 are similar to the functionality of the components of the satellite communication system 600 of FIG. 6.

In some aspects, a BxP corresponds to beam-related functionality. For example, the term BxP may refer to a combination of a Beam Control Processor (BCP) and a Beam Traffic Processor (BTP). That is, the acronym BxP may stand for Beam Control/Traffic Processor. In some aspects, a BxP may include radio network components for controlling a satellite. For example, a BxP may include, for a given cell/beam of a satellite, a corresponding set of digital circuits that serves that cell/beam. Thus, in some aspects, a BxP corresponds to a particular antenna. Also, in some aspects, a given BxP may be associated with a particular band for a given cell/beam of a satellite. In some scenarios, a logical BxP may be uniquely identified by a 4-tuple including a satellite access network (SAN), a GN antenna, a Satellite Beam, and a forward service link (FSL) Frequency.

In some aspects, an AxP corresponds to an anchor point. For example, the term AxP may refer to a combination of an Anchor Control Processor (ACP) and an Anchor Traffic Processor (ATP). That is, the acronym AxP may stand for Anchor Control/Traffic Processor. In some aspects, an anchor point may be associated with a particular region (e.g., an administrative region, a country boundary, etc.). A given AxP may serve one or more satellites. Also, a given satellite may service one or more AxPs.

Figure 7:
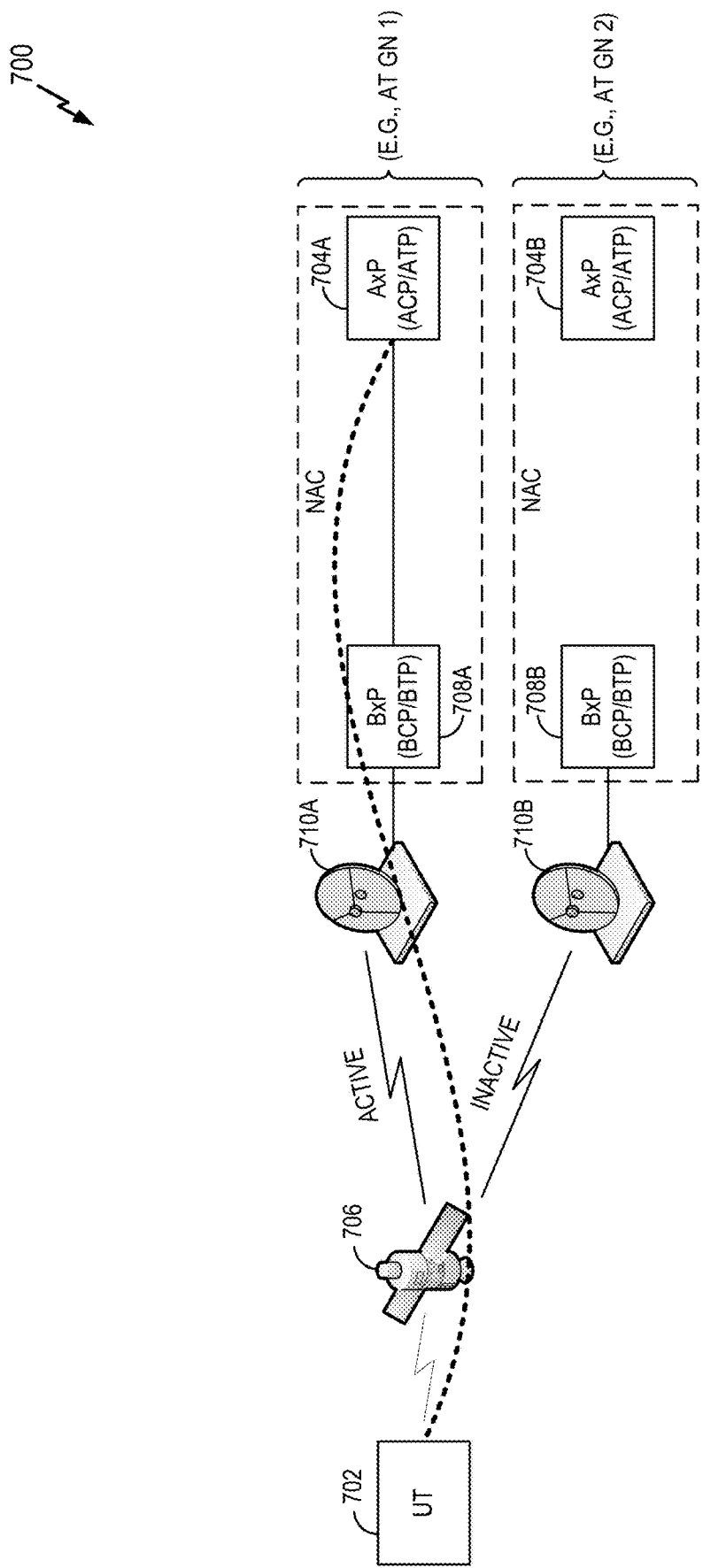
FIG. 7 is a block diagram of another example communication system in accordance with some aspects of the disclosure.

Referring to FIG. 7, at a given point in time, a UT 702 communicates with one of the AxPs (e.g., the AxP 704A) via a satellite 706 and one of the BxPs (e.g., a BxP 708A), where each BxP includes or is associated with a satellite RF subsystem (e.g., a subsystem 710A).

In the above scenario, a UT in connected mode may undergo two types of handoff: BxP handoff or AxP handoff. For example, as satellites move in a non-GSO satellite system, the cells/beams (and, hence, the circuits and antennas associated with those cells/beams) used to serve a given UT will change over time. Thus, in some aspects, a BxP handoff may correspond to a handoff to a different cell/beam (or antenna, etc.). As another example, rain fade on a particular cell/beam operating on a first band may necessitate a switch to a different band for that cell/beam. Thus, in some aspects, a BxP handoff may correspond to a handoff to a different band for a given cell/beam. An AxP handoff corresponds to handoff to a different anchor point. For example, a UT may move to a different administrative region (AR), thereby necessitating a change in the serving AxP. A BxP handoff might or might not be associated with an AxP handoff.

III. Paging, Location, and Forbidden Area Procedures and Connection Signaling The disclosure relates in some aspects to providing paging area (PA) information to a user terminal (UT), communicating UL location information, handing forbidden areas, and associated connection signaling. To this end, a GN and/or a UT may perform paging-related operations, location-related operations, connection-related operations. For example, referring again to FIG. 6, the GN 604 may maintain paging area information 622 and location information 624, and the UT 602 may maintain paging area information 626 and location information 628. In addition, the UT 602 and the GN 604 may generate, control, send, and receive paging area information 630, location information 632, and connection signaling 634 exchanged via messages relayed by the satellite 606.

These paging-related operations may relate in some aspects to defining a reserved value for a Paging Area Code (PAC) that a UT can use if the UT has not yet been assigned a PAC. The reserved PAC is known to the UT and an associated Anchor Control/Traffic Processor (AxP), but might not be used over-the-air. For example, control plane procedures of the UT may use the reserved PAC when invoking signaling operations.

The paging-related operations may also relate in some aspects to providing PAC information to a UT. In some aspects, an ACP may send a Radio Connection Reconfiguration message (including a new PAC, and an indication of when to apply the change) to a UT to pass PAC information to the UT. A corresponding Radio Connection Release message may include a Duration parameter and a Restricted Area Definition. In some aspects, a network may send a special PAC to a UT is the UT is in or near a forbidden area.

The connection-related operations may relate in some aspects to signaling for communicating new PACs and old PACS. For example, a Radio Connection Reject message (e.g., including a wait time value, and a PAC) may be sent to assign a new PAC for a UT (e.g., for a first PAC assignment, a PAC re-assignment due to load balancing, or some other type of PAC assignment). As another example, a Radio Connection Reject message (e.g., including a wait time value, a new PAC, a flag that requests sending of old PAC information in a connection request) may be sent to assign a new PAC for a UT. A UT may send a Radio Connection Request message (e.g., including old PAC for the UT) when the UT requests a connection with a new PAC.

The connection-related operations may relate in some aspects to connection release signaling. For example, a Location Indication (e.g., including a flag requesting release of a connection) may be sent to release a Core Network Interface (CNI) connection and/or a Radio Connection when a UT is done sending location information and is going to go back to idle mode. As another example, a UT may send a Radio Connection Release Request to an Anchor Control/ Traffic Processor (AxP) to release a CNI connection and/or a Radio Connection when a UT is done sending location information, when a UT is done downloading a satellite transition table, or in response to a trigger based on any other use-case, and where the UT wants to go back to idle mode.

The location-related operations may relate in some aspects to location reporting. For example, a gateway may send a Radio Connection Reconfiguration message (e.g., including location thresholds for idle mode and/or connected mode) to a UT. This message may be used for fine tuning UT Location Reporting in border areas near forbidden regions. As another example, an AxP may send a Location Request message to a UT to request the UT's latest location (e.g., GPS location).

The above operations may relate in some aspects to forcing a UT to invoke an update procedure. For example, the network may send to the UT a Radio Connection Release message that includes information such as: a duration indication, a Restricted Area definition, an indication to Force Initiation of a Core Network Control Layer (CNCL) update procedure, or any combination thereof. A UT may start an update procedure using an invalid value for the PAC. The ACP replaces the invalid PAC value with a forbidden PAC value that is then sent to the Core Network Control Plane (CNCP). In response, the CNCP performs a reject update procedure.

These and other aspects of the disclosure will be treated in more detail in conjunction with FIGS. 8-30 that follow. For purposes of explanation, these details will be described in the context of a satellite system that includes one or more of CNCPs, AxPs, and BxPs, among other components and uses paging areas and other relates constructs. It should be

IV. Paging Details

A satellite system may use Administrative Regions (ARs) to identify geographic areas that require specific business or legal treatment of the UTs, such as differentiated pricing or different legal rules. The ARs may be aligned with country boundaries. In some cases, the ARs might not be communicated to UTs. For example, ARs could exist only as part of network planning and may be available to the GN nodes. Each AR may contain multiple Paging Areas (PAs).

Each PA may be identified by a Paging Area Code (PAC). A UT may move within an AR freely without needing to update its PAC. The core network and charging infrastructure may maintain a mapping of which PAC maps to which Administrative Region.

The PA might not provide any further refinement of geographic location than what is provided by the AR. That means there might not be a fixed mapping between a PA and a Cell ID (e.g., to a geographical area) and a cell might not broadcast any specific PAC in its Broadcast Information Blocks (BIBs).

From the core network perspective, a PAC may uniquely identify an Anchor Control Processor (ACP). A Core Network Control Plane (CNCP) may use the last PAC reported by the UT to identify the ACP to deliver a page for the UT. The ACP may use the location of the UT to refine the satellites and the beams that may be used to page the UT.

In some aspects, the network may change the PAC for a UT under one or more conditions. In a first example condition, when a UT moves between ARs, the UT may be provided a new PAC that belongs to the new AR. In a second example condition, when the network decides to serve a UT from a different ACP, the UT may be provided a new PAC that belongs to the new ACP. PAC reallocation may be done for various reasons. For example, the ACP might not be able to serve the UT due to backhaul congestion, there may be load balancing across ACPs, or there may be hardware and/or software failures. These examples are indicative and not exhaustive. In a third example condition, when the network decides to deny service to a UT based on its geographic (GPS or some other positioning system) location, the network may use forbidden Paging Area (PA) procedures and assign PACs which are forbidden. The core network has awareness of forbidden PAs. The network changing the PAC for a UT may, in turn, trigger a Paging Area Update (PAU) procedure initiated by the UT.

In some aspects, a satellite system may map a geographic area based on the country, the AR, the PA, the Cell/Beam, or any combination thereof. A country may include one AR or multiple ARs. In some cases, a single AR may cover multiple countries. An AR may contain multiple Paging Areas. A Paging Area might not specify any well-defined geographic area. A Cell/Beam may cover a relatively large geographic area and may cover, for example, part of an AR, one AR, multiple ARs, or any combination of thereof.

In a satellite system, a cell/beam may cover a relatively large geographic area including both a service area and a forbidden area (e.g., an area where a given UT is not authorized to receive service) at the same time. Moreover, a satellite system may use the precise location (e.g., the GPS location) of the UT to identify the cell/beam in which to page the UT. Hence, it may be desirable to base a service availability/denial decision on a GPS location of the UT as opposed to, for example, a Cell ID or a PA ID.

A satellite system may use PA IDs to identify Anchor Nodes (ACPs) in the GN that handle the radio connection for a specific UT. Here, a PAC may be assigned to a UT via a unicast messages (e.g., via a connection reject) as opposed to via a broadcast of system information.

IV-A. Example Issues

The disclosure relates in some aspects to the use of Radio Connection Layer (RCL) protocols and Core Network Control Layer (CNCL) protocols for connection management between a UT and a CNCP. Several issues associated with mobility may arise with respect to the use of these or other protocols in a satellite system.

A first example issue (also referred to as Issue #1) is that System Information of a cell (e.g., sent in a BIB such as BIB1) might not contain paging area information. For example, PAC information might not be available after camping. Since CNCL mobility procedures may be based on the PA, a CNCL protocol might not work in this case.

A second example issue (also referred to as Issue #2) involves PAC relocation due to a change in the serving ACP. For example, a CNCL procedure might not expect a change of PAC except for idle mode selection/reselection or connected mode handoff. Thus, one should ensure that a change of a PAC during an ongoing data/signaling procedure will be handled effectively. For example, a new PAC assignment may be made during a Radio signaling establishment procedure.

A third example issue (also referred to as Issue #3) is that PAC information might not give any information about geographic area. However, precise UT GPS location may be desirable to provide/deny service to a UT.

A fourth example issue (also referred to as Issue #4) is that a UT may be expected to report its GPS location to the ACP whenever the UT moves beyond a significant distance (e.g., defined by the network) from the UT's last reported location. However, UTs in IDLE mode might not have a signaling connection with the ACP to send location information. The UT and the ACP might not be able to establish a secured radio connection and data bearers on their own when there is no actual user data. For example, they may need the network to provide relevant keys to secure a radio connection. Also, the air interface might not support efficient connection management.

A fifth example issue (also referred to as Issue #5) is that there is no provision to reconfigure a location reporting threshold during connected mode.

A sixth example issue (also referred to as Issue #6) is that there is no provision to request a UT's latest location.

IV-B. Example Design Options

Several design options that may address these and other issues are presented herein. Each design option is described in conjunction with at least one corresponding message flow diagram. FIGS. 8-14 describe several of these design options at a relatively high level. FIGS. 15A-30 describe several of these design options using more detailed examples.

Symbolic values for some signaling parameters may be used in the message flow diagrams for clarity. For example, a "default PAC" parameter (PACdefault) may represent a value reserved (e.g., for UT internal use in some cases) from the valid range of PACs. The ACP does not assign this reserved value to any specific UTs (e.g., the default PAC does not correspond to a particular PA). Parameters such as PACa/PACb may represent a value from the valid range of PACs that the ACP treats as allowed. A "forbidden PAC" parameter (PACf) may represent a value from the valid range of PACs that the ACP treats as forbidden. An "invalid PAC" parameter (PACinv) may represent a value outside the valid range of PACs. A Forbidden PA Set may be defined and provisioned between the ACP and the CNCP. New Information Fields (IFs) added to the air interface may be indicated in the message diagrams. In addition, behavioral impacts on the UT, a Beam Control/Traffic Processor (BxP), or an Anchor Control/Traffic Processor (AxP) may be indicated in the message diagrams.

V. High Level Examples

FIGS. 8-14 describe example processes for management of paging, forbidden areas, connection signaling, and location reporting in accordance with the teachings herein. Each of these figures describes operations at a first device (e.g., a UT), operations at a second device (e.g., a GN), and signaling between the first and second device.

Figure 8:
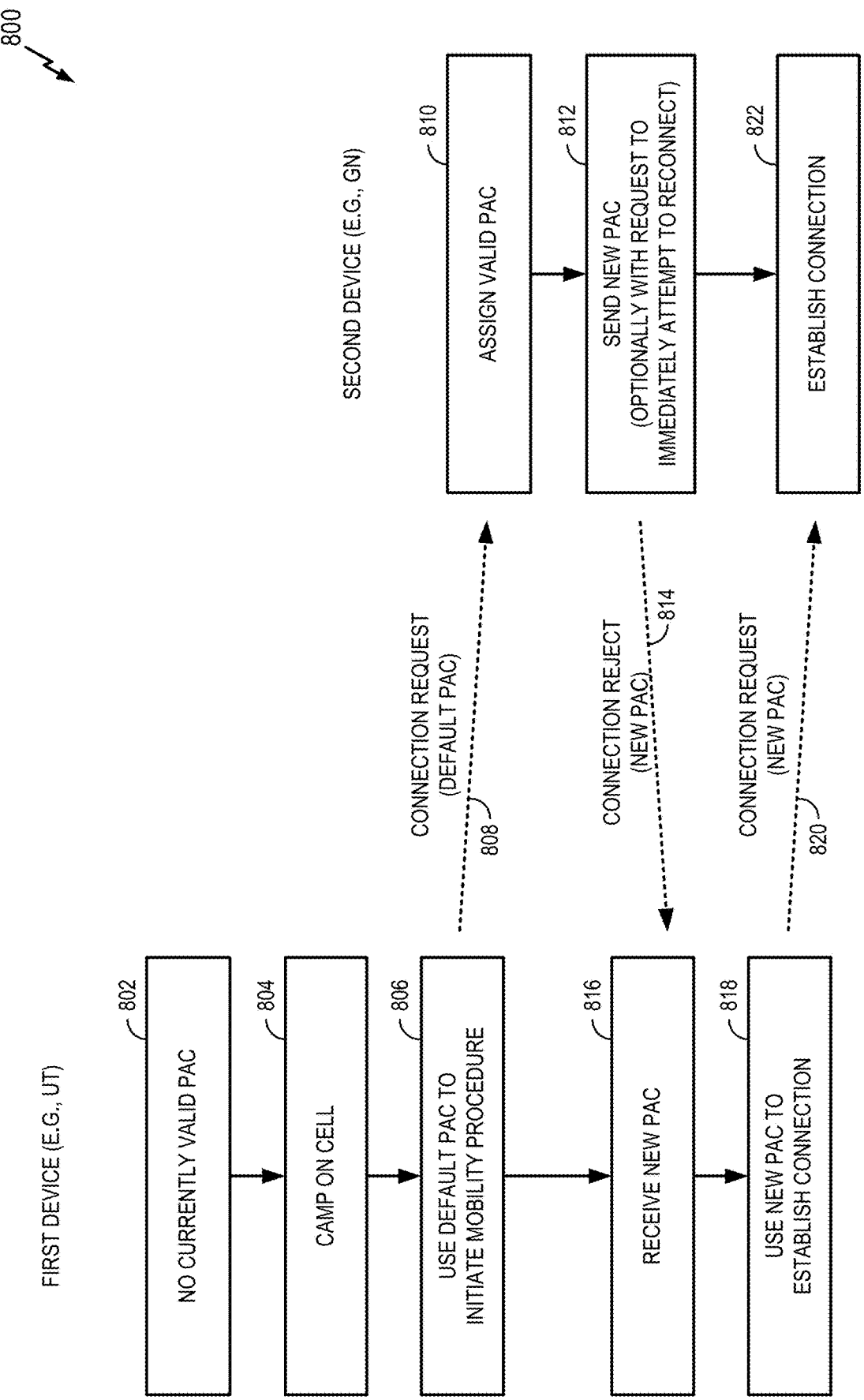
FIG. 8 is a flow diagram of an example of a process for using a default paging area code (PAC) in accordance with some aspects of the disclosure.

FIG. 8 illustrates a process 800 that involves using a default PAC to obtain a new PAC. In some aspects, the process 800 may address Issue #1 discussed above. At block 802, the first device determines that is not current assigned a valid PAC. For example, the first device might not have attached to a network after powering on. At block 804, at some point in time, the first device camps on a cell. At block 806, the first device uses a default PAC (e.g., a special PAC that is dedicated for this purpose) to initiate a mobility procedure (e.g., a CNCL mobility procedure). To this end, the first device sends a connection request 808 that includes the default PAC to the second device. At block 810, upon receiving the connection request 808, the second device assigns a valid PAC to the first device. Thus, at block 812, the second device sends a new PAC ("new" from the perspective of the first device) to the first device. To this end, the second device sends a connection reject 814 that includes the new PAC to the first device. In some scenarios, the new PAC may be sent with a request for the first device to "immediately" (e.g., without waiting for some other connection trigger) attempt to reconnect to the network. The first device receives the connection reject 814 with the new PAC at block 816. At block 818, the first device uses the new PAC to establish a connection. For example, the first device may send a connection request 820 that includes the new PAC to the second device. This connection establishment process may be performed "immediately" if the new PAC was sent with a request to immediately attempt to reconnection. Upon receiving the connection request 820 at block 822, the second device may establish a connection with the first device.

Figure 9:
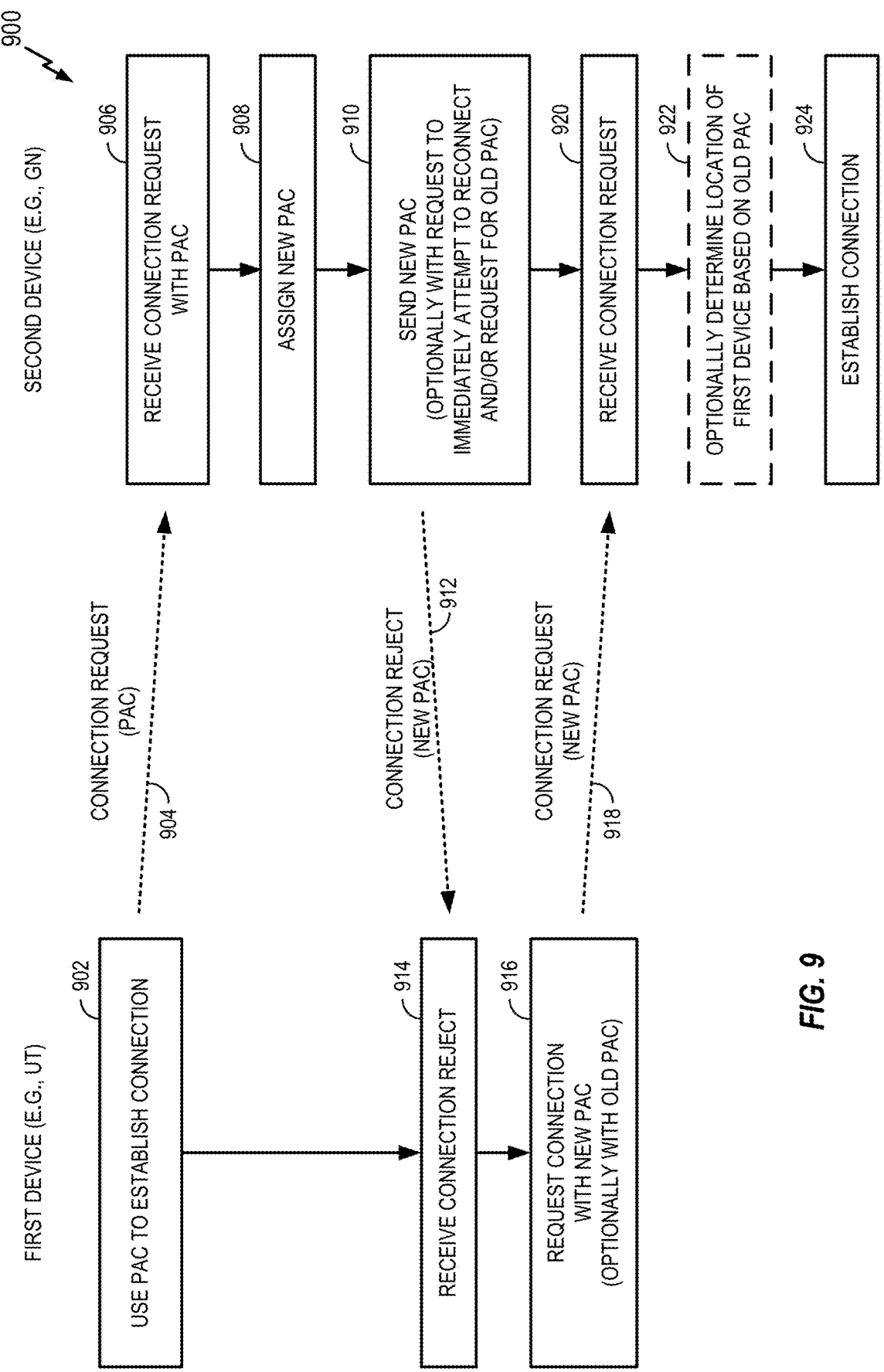
FIG. 9 is a flow diagram of an example process for obtaining a new PAC in accordance with some aspects of the disclosure.

FIG. 9 illustrates a process 900 that involves reassigning a PAC. In some aspects, the process 900 may address Issue #2 discussed above. At block 902, at some point in time, the first device uses its currently assigned PAC to establish a connection with a network. To this end, the first device sends a connection request 904 that includes the PAC to the second device. The second device receives the connection request 904 at block 906. At block 908, the second device assigns a new PAC to the first device (e.g., due to a handoff of the UT to a different AxP or some other event). At block 910, the second device sends this new PAC to the first device. To this end, the second device sends a connection reject 912 that includes the new PAC. In some scenarios, the new PAC may be sent with a request for the first device to "immediately" attempt to reconnect to the network. Alternatively, or in addition, the new PAC may be sent with a request for the first device to send its old PAC (e.g., the PAC that the first device previously used at block 902) when requesting a connection. The first device receives the connection reject at block 914. At block 916, the first device uses the new PAC to request a connection. For example, the first device may send a connection request 918 that includes the new PAC to the second device. The connection request 918 may include the first device's old PAC if the connection reject 912 included a request for the old PAC. The second device receives the connection request 918 at block 906. At block 922, the second device may determine the location of the first device based on the old PAC. At block 924, the second device may establish a connection with the first device.

Figure 10:
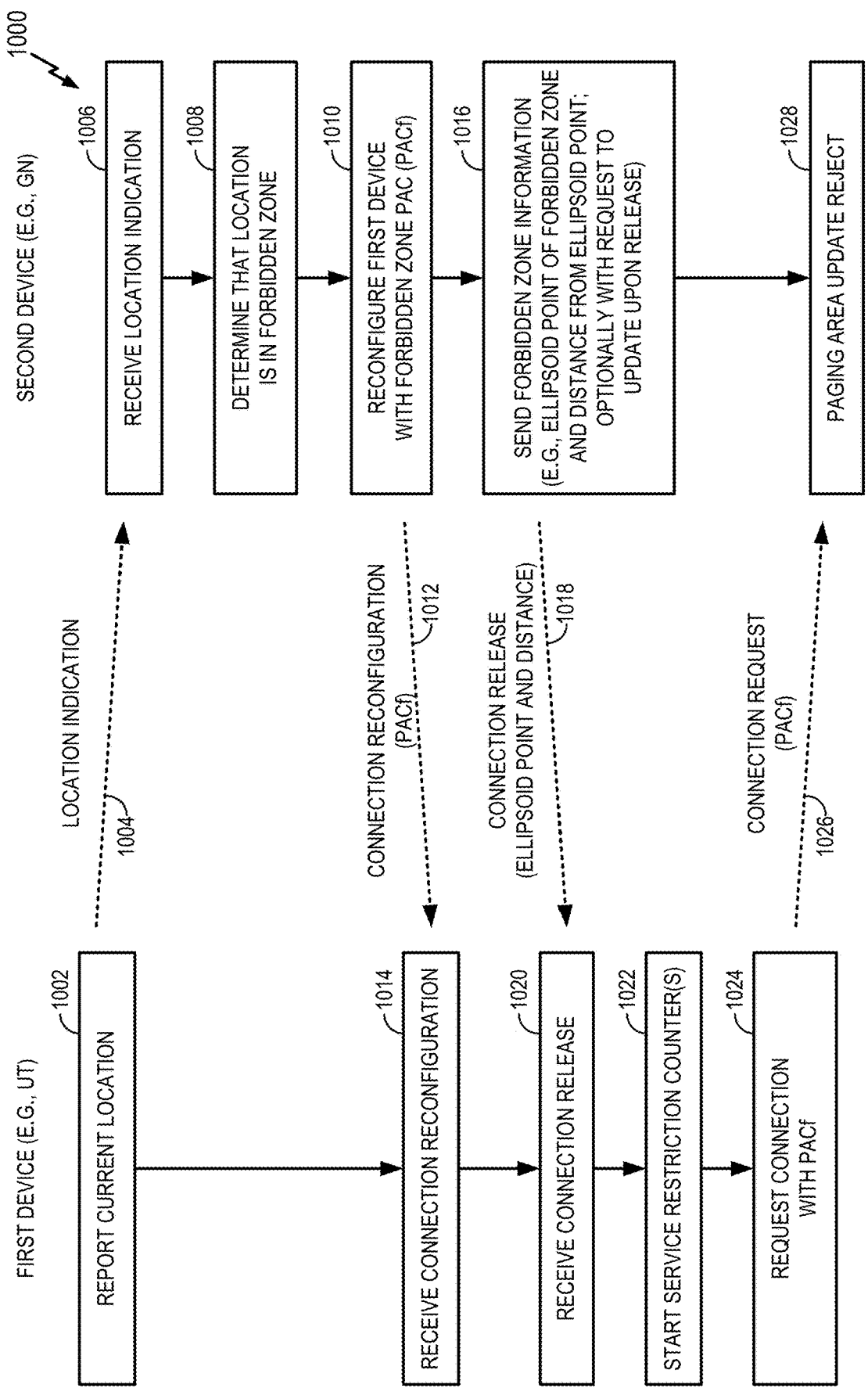
FIG. 10 is a flow diagram of an example process for assigning a forbidden PAC to a UT in accordance with some aspects of the disclosure.

FIG. 10 illustrates a process 1000 that involves forbidden area management (e.g., a device enters a forbidden area). In some aspects, the process 1000 may address Issue #3 discussed above. At block 1002, the first device reports its current location. For example, the first device may send a location indication 1004 to the second device. The second device receives the location indication 1004 at block 1006. At block 1008, the second device may determine that the reported location is in a forbidden area. As a result, at block 1010, the second device reconfigures the first device with a PAC associated with a forbidden area (designated PACf). For example, the second device may send a connection reconfiguration 1012 that includes PACf to the second device. The first device receives the connection reconfiguration 1012 with the PACf at block 1014. At block 1016 the second device sends information about the area of the forbidden area to the first device. In some scenarios, this information may include an ellipsoid point (e.g., a center point) and a distance from the ellipsoid point (e.g., a radius) of the forbidden area. In the example of FIG. 10, the second device sends a connection release 1018 that includes the forbidden area information. The connection release 1018 may also include a request to the first device to update its configuration upon release. The first device receives the connection release 1018 with the forbidden area information at block 1020. In response, the first device starts one or more service restriction counters at block 1022. For example, the first device may be configured to wait for a designated period of time before attempting to reconnect. At block 1024, the first device uses the PACf to request a connection. For example, the first device may send a connection request 1026 that includes the PACf to the second device. As a result of receiving the connection request 1026 with the PACf at block 1028, the second device rejects the paging area update. As discussed below, the first device may then add PACf to its list of forbidden PACs.

Figure 11:
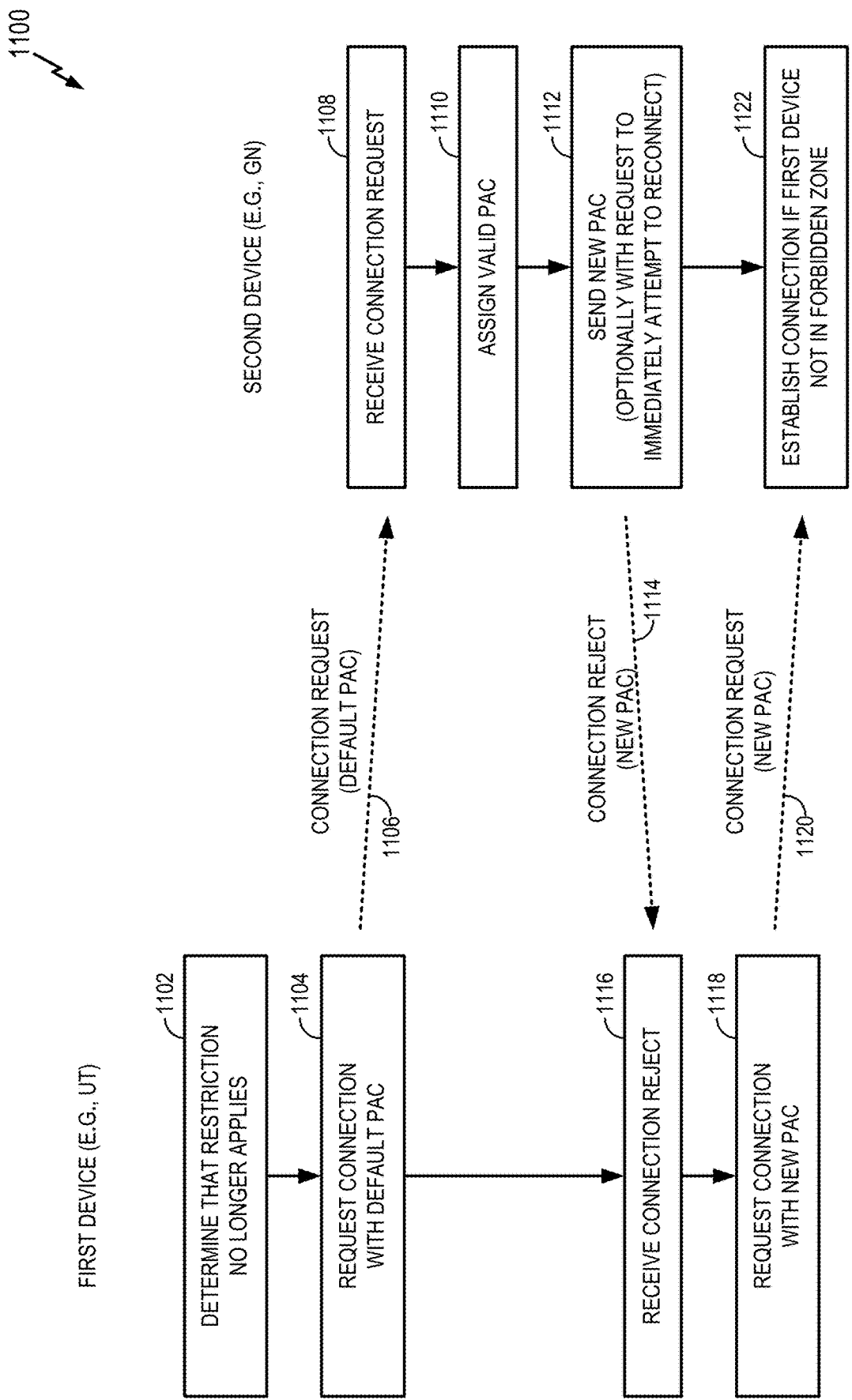
FIG. 11 is a flow diagram of an example a process for where a UT attempts to establish a connection after a service restriction no longer applies in accordance with some aspects of the disclosure.

FIG. 11 illustrates a process 1100 that involves forbidden area management (e.g., a device leaves a forbidden area). In some aspects, the process 1100 may address Issue #3 discussed above. At block 1102, the first device determines that a service restriction no longer applies. For example, the first device may determine, based on the forbidden area information, that it is no longer in a forbidden area. At block 1104, the first device uses the default PAC to request a connection. For example, the first device may send a connection request 1106 that includes the default PAC to the second device. The second device receives the connection request 1106 with the default PAC at block 1108. At block 1110, the second device assigns a valid PAC to the first device. Thus, at block 1112, the second device sends a new PAC to the first device. For example, the second device may send a connection reject 1114 that includes the new PAC to the first device. In some scenarios, the new PAC may be sent with a request for the first device to "immediately" (e.g., without waiting for some other connection trigger) attempt to reconnect to the network. The first device receives the connection reject 1114 with the new PAC at block 1116. At block 1118, the first device uses the new PAC to request a connection. For example, the first device may send a connection request 820 that includes the new PAC to the second device. This connection establishment process may be performed "immediately" if the new PAC was sent with a request to immediately attempt to reconnection. Upon receiving the connection request 1120 at block 1122, the second device may establish a connection with the first device upon determining that the first device is not in the forbidden area. The second device may make this determination, for example, based on the location of the first device as maintained in a database or as received in a location indication from the first device.

Figure 12:
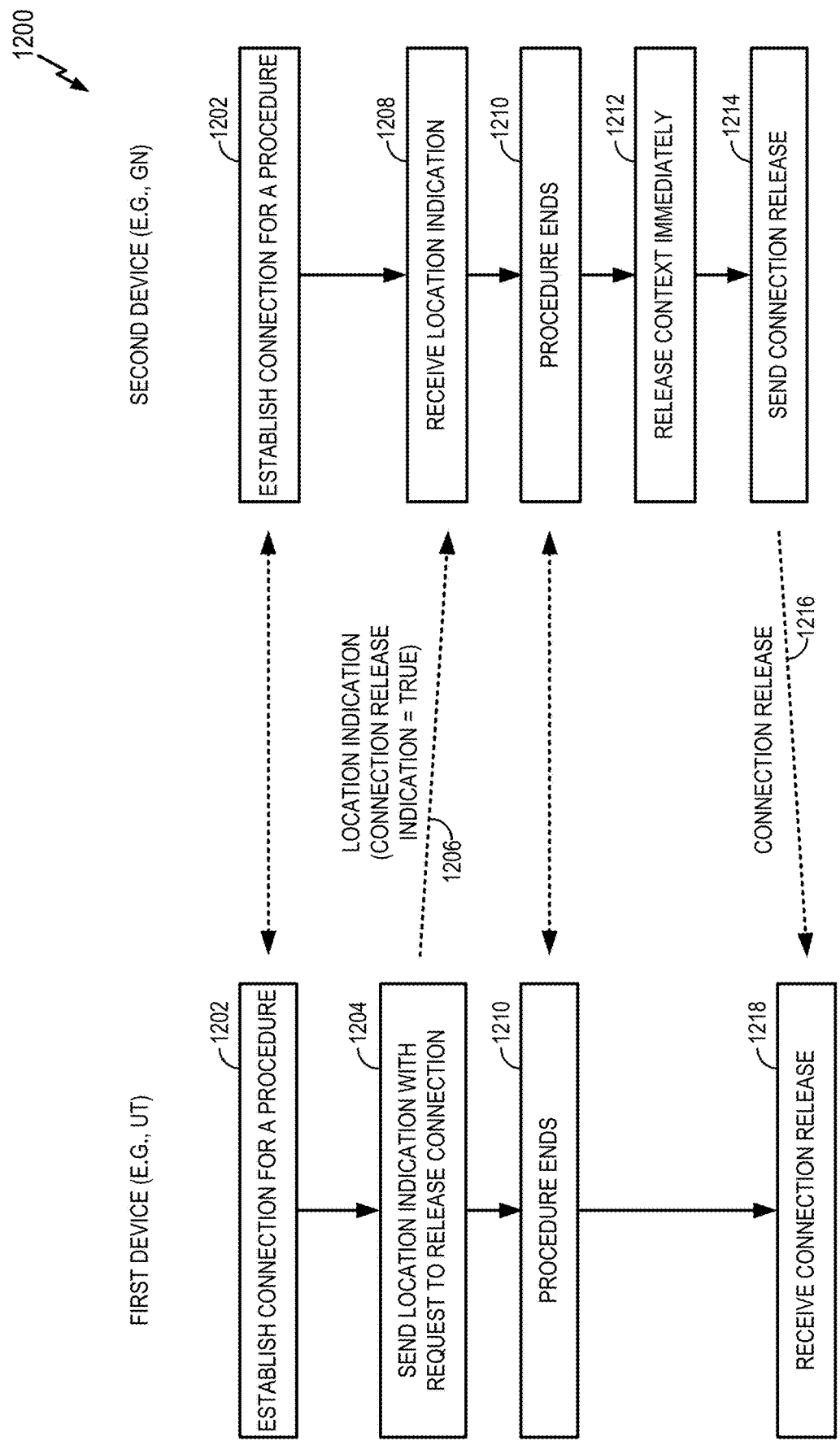
FIG. 12 is a flow diagram of an example process where a UT sends a connection release indication in a location report in accordance with some aspects of the disclosure.

FIG. 12 illustrates a process 1200 that involves an efficient connection release procedure (e.g., a UT sends location information with a release request). In some aspects, the process 1200 may address Issue #4 discussed above. At block 1202, the first device and the second device establish a connection for a particular procedure. At block 1204, the first device sends a location indication 1206 that includes a request to release the connection once the procedure ends to the second device. For example, the location indication 1206 may include a connection release indication that is set to a value of TRUE. The second device receives the location indication 1206 at block 1208. At block 1210, the procedure of block 1202 ends. In response, and as a result of receiving the connection release indication, the second device immediately releases the context for the connection at block 1212. At block 1214, the second device sends a connection release 1216 to the first device. The first device thus receives the connection release 1216 at block 1218.

Figure 13:
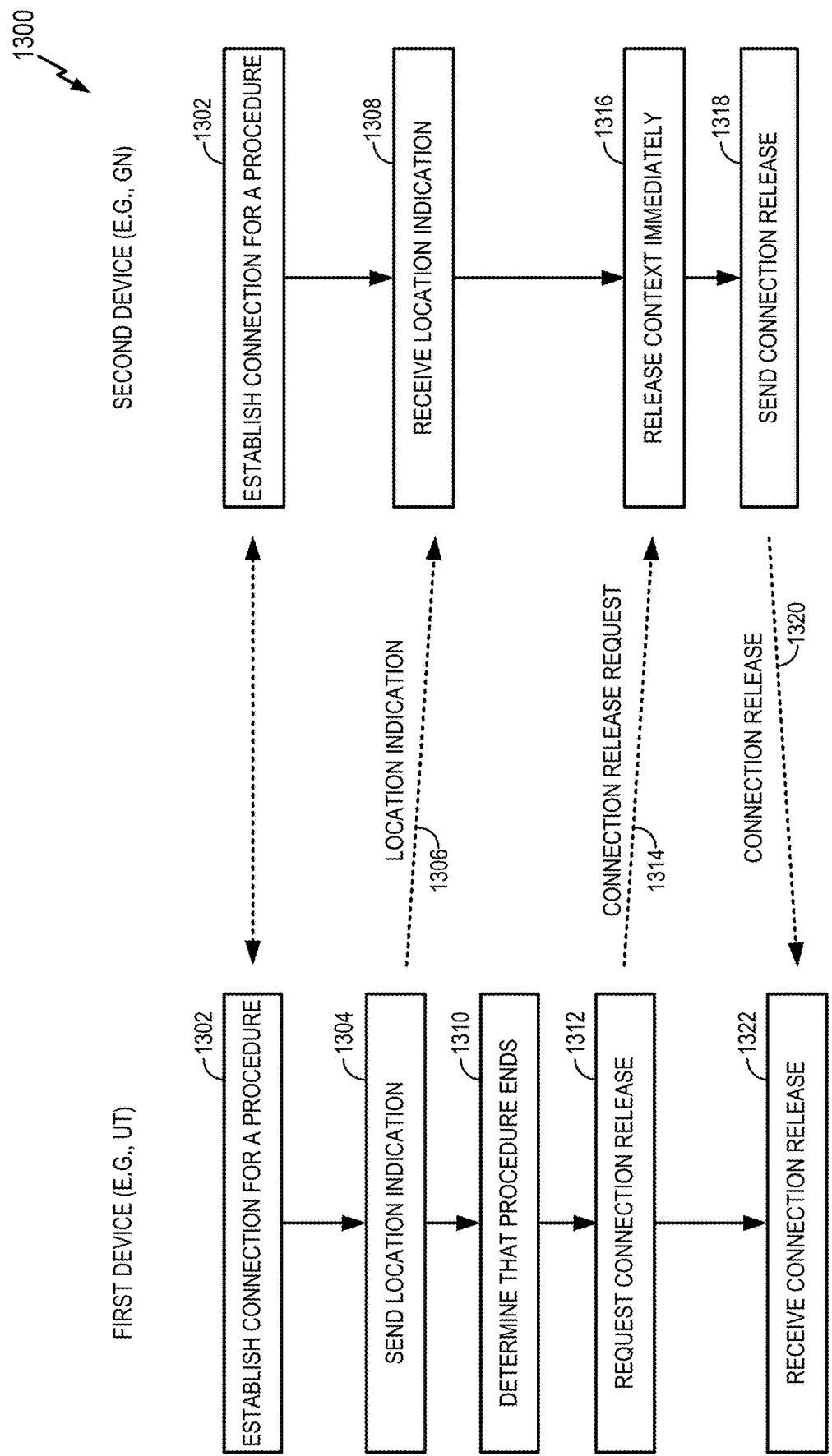
FIG. 13 is a flow diagram of an example process where a UT requests a connection release in accordance with some aspects of the disclosure.

FIG. 13 illustrates a process 1300 that involves efficient connection release procedures (e.g., a UT sends a request for immediate release). In some aspects, the process 1300 may address Issue #4 discussed above. At block 1302, the first device and the second device establish a connection for a particular procedure. At block 1304, the first device sends a location indication 1306 to the second device. The second device receives the location indication 1306 at block 1308. At block 1310, the first device determines that the procedure of block 1302 ends. In response, the first device requests that the connection be release at block 1312. For example, the first device may send a connection release request 1314 to the second device. As a result of receiving the connection release request 1314, the second device immediately releases the context for the connection at block 1316. At block 1318, the second device sends a connection release 1320 to the first device. The first device thereby receives the connection release 1320 at block 1322.

Figure 14:
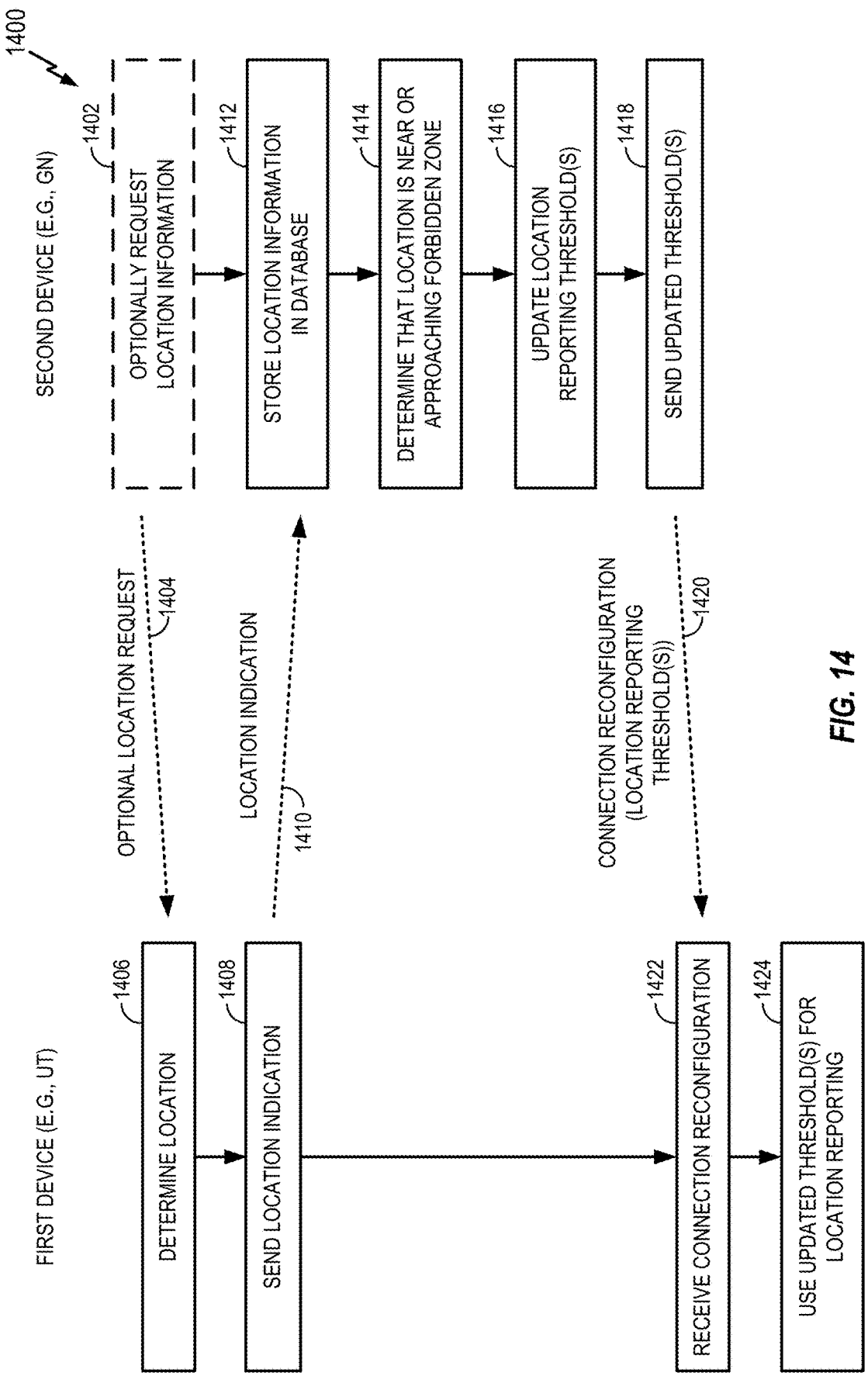
FIG. 14 is a flow diagram of an example process for updating a location reporting threshold in accordance with some aspects of the disclosure.

FIG. 14 illustrates a process 1400 that involves requesting UT location information and reconfiguring a location reporting threshold. In some aspects, the process 1400 may address Issues #5 and #6 discussed above. At block 1402, in some scenarios, the second device may request that the first device report its location. For example, the second device may send a location request 1404 to the first device. Either in response to the location request 1404 or based on some other trigger (e.g., a trigger based on a location reporting threshold), the first device determines its location at block 1406. At block 1408, the first device sends a location indication 1410 to the second device. At block 1412, the second device stores the location information for the first device in a database. At block 1414, the second device determines that the location of the first device is near or approaching a forbidden area. As a result of this determination, at block 1416, the second device updates one or more location reporting thresholds for the first device. At block 1418, the second device sends the updated location reporting threshold(s) to the first device. For example, the second device may send a connection reconfiguration 1420 that includes the updated location reporting threshold(s). The first device receives the connection reconfiguration 1420 at block 1422. At block 1424, the first device uses the updated location reporting threshold(s) to determine when to report the first device's location.

VI. Detailed Example for Default PAC

The disclosure relates in some aspects to defining a reserved value for a Paging Area Code (herein referred to as PACdefault) to be used, for example, in cases where a UT does not yet have a network assigned PAC. In some aspects, PACdefault may be used to address Issue #1 discussed above (no PA information in Broadcast Information B lock).

A PACdefault may be known to a UT and an ACP, and used internally between a Radio Connection Layer (RCL) and a Core Network Control Layer (CNCL) within the UT. In addition, the ACP might not assign this special PAC value to any specific UT. Once a UT is camped on a cell, if no prior PAC information is available to the UT, the UT may use PACdefault for the UT's Core Network Control Layer (CNCL) procedures until a new PAC is assigned by the ACP.

A PACdefault may or may not be sent over the air. For example, in some implementations, a UT may send a PACdefault in a Radio Connection Request message over the air (e.g., after an initial attach to a network). For example, the UT may send a PACdefault to the ACP to trigger allocation of a valid PAC as discussed below. In other implementations, a UT may simply use the PACdefault value internally such that the UT/ACP do not send PACdefault in any signaling message over the air.

Once a UT has camped on a cell, and if no prior PAC information is available in the UT, the UT may use PACdefault for all of its NAS procedures. For example, a Radio Connection may be requested using PACdefault. An ACP will then assigns a new PAC for the UT and rejects the Radio Connection by sending a Radio Connection Reject message with a new PAC value and a wait time for reconnection set as zero. Upon receiving the Radio Connection Reject message, the UT aborts the connection establishment procedure and forwards the assigned PAC to the NAS. The NAS then re-initiates the pending procedure. These operations will now be described in detail in conjunction with FIGS. 15A and 15B.

VI-A. Power ON/Initial Attach

Figure 15A:
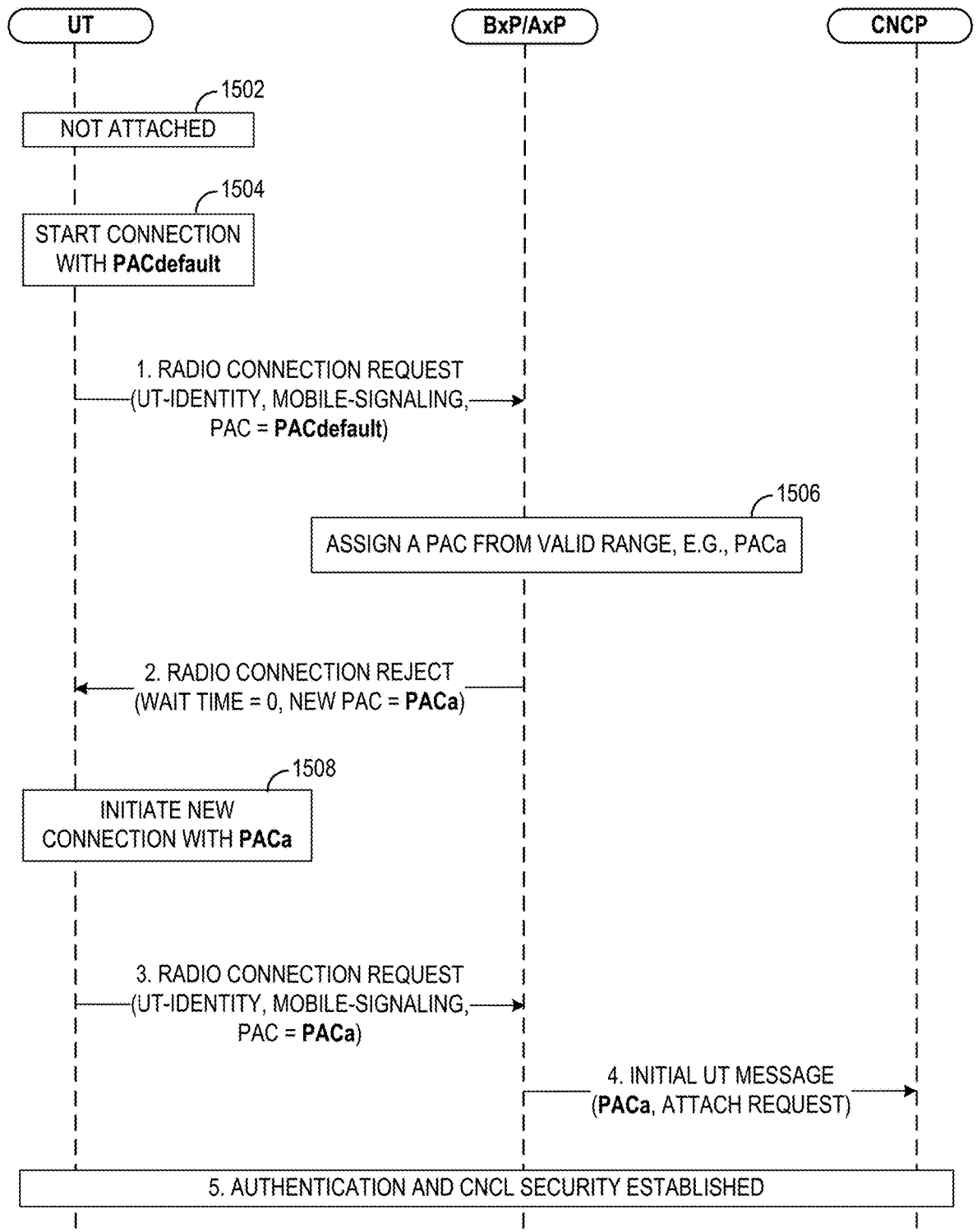
FIGS. 15A and 15B (collectively referred to as FIG. 15) are a flow diagram of an example initial attach process in accordance with some aspects of the disclosure.
Figure 15B:
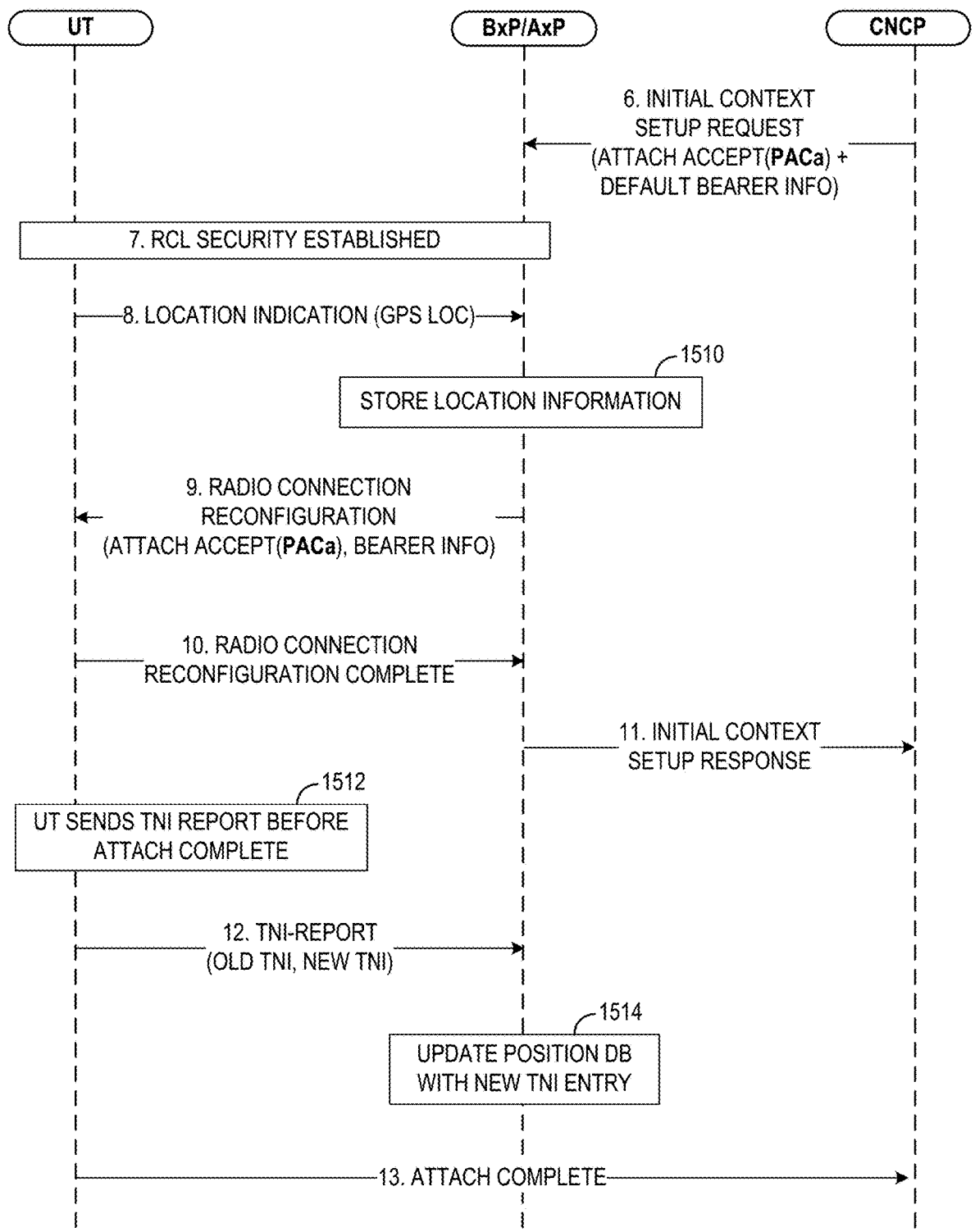

FIGS. 15A and 15B illustrate a message flow diagram for an initial attach operation (e.g., at UT power ON) in accordance with some aspects of the disclosure. The message flow will be discussed in the context of a satellite communication system that includes a UT, a BxP/AxP, and a CNCP.

In this example, the UT is initially not attached to a network (block 1502 of FIG. 15A). In accordance with the teachings herein, the UT uses PACdefault to start a connection after camping on a cell (block 1504).

In a first operation (1), the UT uses PACdefault to initiate CNCL mobility procedures. Specifically, the UT initiates an Attach procedure and initiates a Radio connection with PACdefault. The corresponding Radio Connection Request also includes an identifier of the UT (UT-ID) and indication that the Radio Connection Request originates at a mobile device (Mobile-Signaling).

Upon receiving the Radio Connection Request, at block 1506, the ACP serving the UT assigns a PAC from the valid range of PACs (designated PACa in this example).

At a second operation (2), the assigned PAC is sent to the UT in a Radio Connection Reject. The PAC value is maintained in UT context. The Radio Connection Reject also includes a wait time variable set to zero, thereby requesting that the UT "immediately" attempt to reconnect.

A new connection is initiated with the assigned PAC (block 1508). At a third operation (3), the UT sends a Radio Connection Request that includes the assigned PAC.

At a fourth operation (4), the ACP sends an Initial UT Message to the Core Network Control Plane (CNCP) for a Core Network Interface logical connection establishment with the received Attach Request and the assigned PAC value.

In a fifth operation (5) through a seventh operation (7), UT context is established between the ACP and the CNCP. CNCL Security is activated in the fifth operation (5). The CNCP sends an Initial Context Setup Request including the Attach Accept to the ACP in the sixth operation (6). The Attach Accept includes the same PAC (the PAC received in the Initial UT Message). In the seventh operation (7), the ACP activates Radio Connection Layer (RCL) security.

The ACP then waits for UT's geographic location (e.g., running a guard timer). In an eighth operation (8), the UT sends Location Indication (including the UT's GPS location) soon after RCL security activation. The ACP stores the received UT location information (block 1510).

In a ninth operation (9), if the ACP determines that the UT location does not fall under any forbidden area, a connection reconfiguration may be initiated setting up Radio Signaling Paths (e.g., RSP2) and Radio Data Paths (RDPs). The Attach Accept may be piggy-backed in the corresponding Radio Connection Reconfiguration message. In a tenth operation (10), the UT sends a Radio Connection Reconfiguration Complete to the ACP.

In an eleventh operation (11), the ACP sends an Initial Context Setup Response to the CNCP. The UT's CNCL gets the PAI information in the Attach Accept. The CNCL stores the received PAC and compares it against the last PAC (in this case PACdefault) to determine the next action. The CNCL may use the following Table 1 for this purpose.

TABLE 1

UT Action on receiving a new PAC value

| Old PAC value | Received PAC value | Action |
|---|---|---|
| PACdefault | PAC other than PACdefault | No update procedure |
| PAC other than PACdefault (e.g., PACa) | PAC other than PACdefault and different from the old PAC value (e.g., PACb) | Start update procedure |
| PACdefault | PACdefault | No update procedure |
| PAC other than PACdefault | PACdefault | Start update procedure |

The UT sends a Temporary Network Identifier (TNI) report before sending an Attach Complete message (block 1512). Thus, in a twelfth operation (12), the UT sends a TNI-Report including the old TNI and the new TNI to the ACP. Upon reception of this information, the ACP updates the UT location information in a Position Database with a new Temporary Network Identifier (block 1514). At a thirteenth operation (13), the UT sends the Attach Complete to the CNCP and the procedure ends.

From this point onwards, the UT uses this PAC for subsequent procedures, until a new PAC is assigned by network or the PAC value is reset to PACdefault. A new PAC may be assigned to the UT, for example, via downlink messages such as Radio Connection Reject, Radio Connection Reconfiguration, or Radio Connection Release.

VII. Detailed Example for PAC Reassignment

The disclosure relates in some aspects to reassigned a PAC. In some aspects, PAC reassignment may be used to address Issue #2 discussed above. Several PAC reassignment design options are described below depending upon the UT location database design inside the ACP.

Figure 16A:
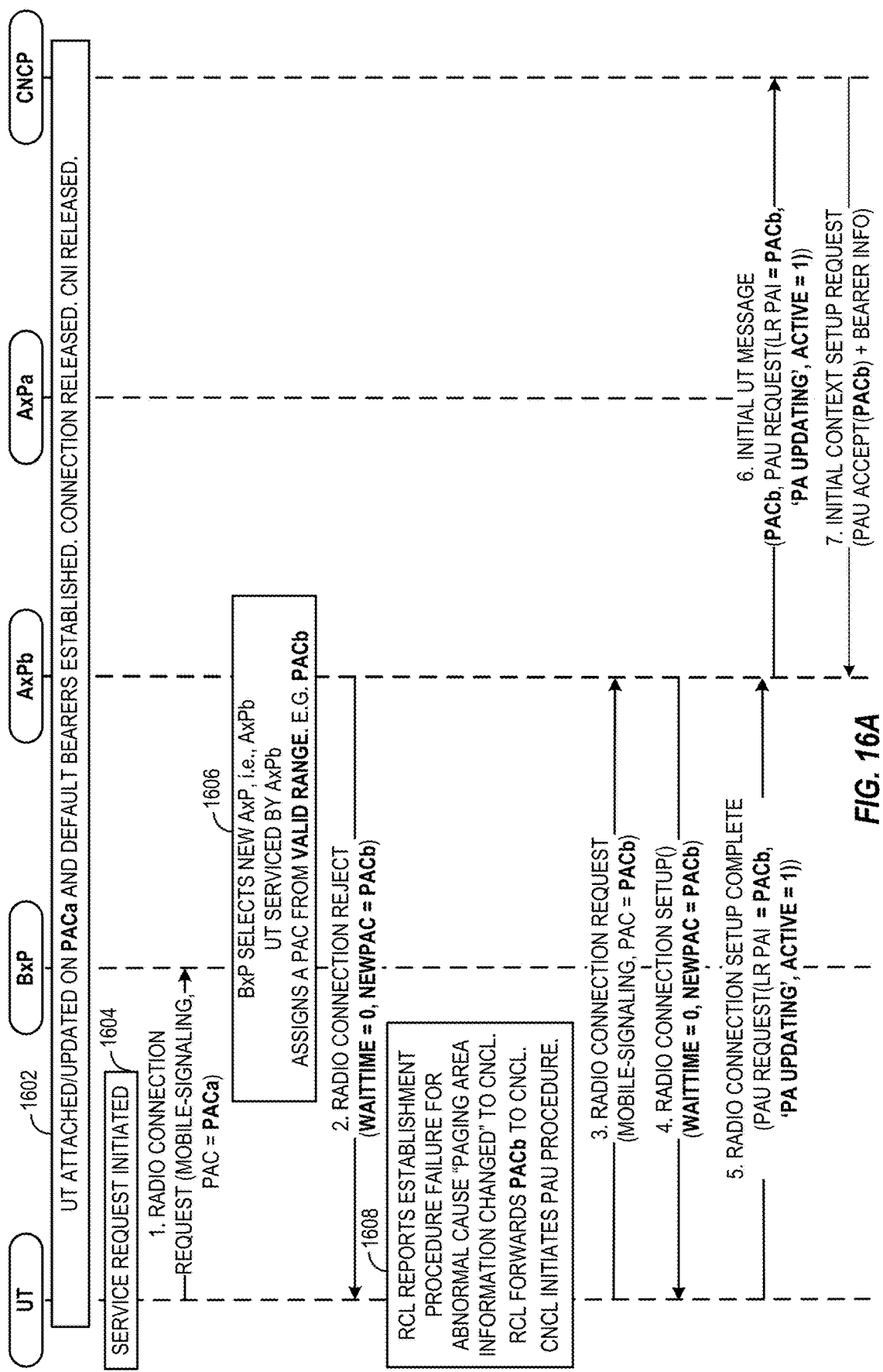
FIGS. 16A and 16B (collectively referred to as FIG. 16) are a flow diagram of an example of a PAC reassignment process for a UT in accordance with some aspects of the disclosure.
Figure 16B:
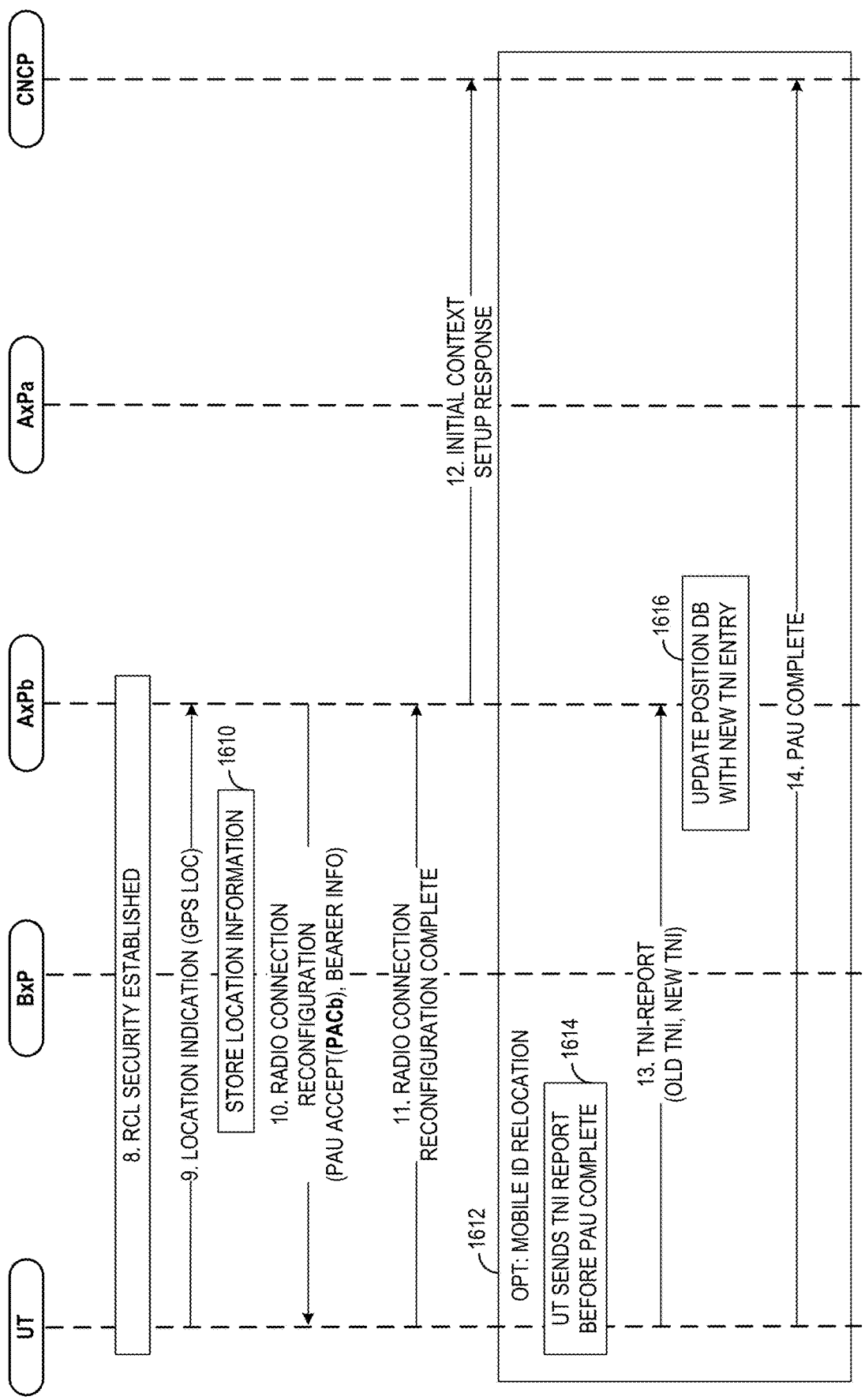

VII-A. New ACP does not Require UT Assistance in Retrieving UT Location Information FIGS. 16A and 16B illustrate a message flow diagram for a PAC reassignment operation where a UT is served by a new ACP, and where the new ACP does not require UT assistance in retrieving UT location information. The message flow will be discussed in the context of a satellite communication system that includes a UT, a BxP, a first AxPa, a second AxPb, and a CNCP.

Initially (block 1602), the UT is attach or updated with PACa. In addition, default bearers (paths) are established. The UT is in Connection Management (CM) state IDLE and the CNI is released. At some point in time, the UT initiates a Service Request (block 1604). In a first operation (1), the UT sends a Radio Connection Request with the last registered/updated PAC.

In this example, the network (e.g., the BxP) assigns a new AxP (e.g., a new ACP) for handling this UT (block 1606). For example, the AxP may be changed from AxPa to AxPb. The new ACP assigns a new PAC (e.g., PACb) for the UT. In a second operation (2), the ACP rejects the Radio Connection by sending a Radio Connection Reject that includes a wait time set to zero and the new PAC value.

Optionally, if the network does not have a centralized UT location information database (which may be accessible from all ACP nodes with a Temporary Network Identifier (TNI) as a key), then the ACP may attempt to retrieve UT location information using the UT's old PAC value and Temporary Network Identifier before sending the connection reject.

The Service Request procedure is aborted due to the change in PA information (block 1608). The UT's RCL reports the failure of the connection establishment procedure to the UT's CNCL. The failure being indicated as result of a cause "PA information changed." The RCL also forwards the new PAC value (PACb) to the CNCL. The UT then initiates a Paging Area Update (PAU) procedure with bearer re-establishment.

In a third operation (3), the UT sends a Radio Connection Request with the new PAC value to the ACP. In a fourth operation (4), the ACP sends a Radio Connection Setup with the new PAC value to the UT. In a fifth operation (5), the UT sends a Radio Connection Setup Complete with a Paging Area Update Request to the ACP. In a sixth operation (6), the ACP sends an Initial UT Message to the CNCP with the received PAU Request and the PAC value. In a seventh operation (7), the CNCP sends an Initial Context Setup Request including a PAU Accept to the ACP. In an eighth operation (8), the ACP activates Radio Connection Layer (RCL) security.

In a ninth operation (9), the UT sends a Location Indication to the ACP. The ACP stores the received UT location information (block 1610).

In a tenth operation (10), if the ACP determines that the UT location does not fall under any forbidden area, the ACP sends a Radio Connection Reconfiguration with a PAU Accept to the UT. In an eleventh operation (11), the UT sends a Radio Connection Reconfiguration Complete including the PAU accept to the ACP. In a twelfth operation (12), the ACP sends an Initial Context Setup Response to the CNCP.

In an optional mobile temporary identifier relocation operation (block 1612), the UT sends a Temporary Network Identifier (TNI) report before sending a PAU Complete message (block 1614). Thus, in a thirteenth operation (13), the UT sends a TNI-Report including the old TNI and the new TNI to the ACP. Upon reception of this information, the ACP updates the UT location information in a Position Database with a new Temporary Network Identifier (block 1616). Here, if a previous TNI is received, the existing entry for the UT is updated. Otherwise, a new entry with TNI is created. At a fourteenth operation (14), the UT sends the PAU Complete to the CNCP and the procedure ends.

If the network has a centralized UT location information database (which is accessible from all ACP nodes with a Temporary Network Identifier as a key), then the ACP may attempt to retrieve the UT location information using only a Temporary Network Identifier Connection establishment and a PAU procedure completion using CNCL/RCL protocols.

VII-B. New ACP Requires UT Assistance in Retrieving UT Location Information (Old PAC Value is not ACP Controlled)

FIGS. 17A and 17B illustrate a message flow diagram for a PAC reassignment operation where a UT is served by a new ACP, and the new ACP uses UT assistance in retrieving UT location information. In this case, the reporting of the old PAC value in a Radio Connection Request is not ACP controlled. For example, the UT may send both the new PAC and the old PAC on every PAC change. The message flow will be discussed in the context of a satellite communication system that includes a UT, a BxP, a first AxPa, a second AxPb, and a CNCP.

Figure 17:
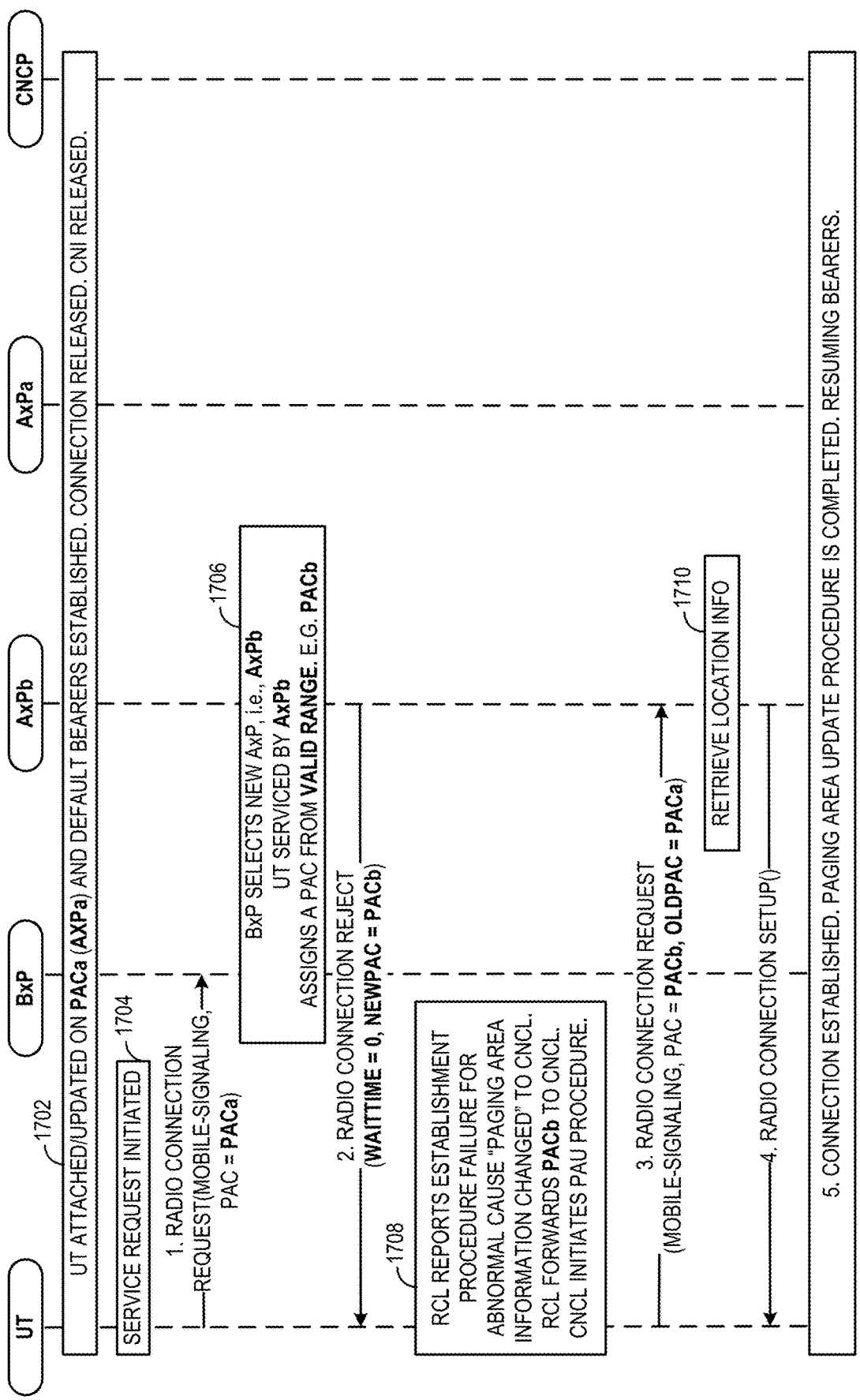
FIG. 17 is a flow diagram of another example of a PAC reassignment process for a UT in accordance with some aspects of the disclosure.

Blocks 1702, 1704, 1706, and 1708 of FIG. 17 correspond to blocks 1602, 1604, 1606, and 1608 of FIG. 16A discussed above. In addition, a first operation (1) and a second operation (2) of FIG. 17 correspond to the first operation (1) and the second operation (2) of FIG. 16A discussed above.

In a third operation (3), the UT sends a Radio Connection Request to the ACP. The Radio Connection Request may be sent with IFs for both the new PAC value (e.g., PACb) and the old PAC value (e.g., PACa). The ACP may then attempt to retrieve the UT location information using the old PAC and the Temporary Network Identifier (block 1710).

The connection establishment and the PAU procedure completion may then be done as follows. In a fourth operation (4), the ACP sends a Radio Connection Setup to the UT. In a fifth operation (5), the connection is established, the PAU procedure is completed, and bearers are resumed.

VII-C. New ACP Requires UT Assistance in Retrieving UT Location Information (Old PAC Value is ACP Controlled)

Figure 18A:
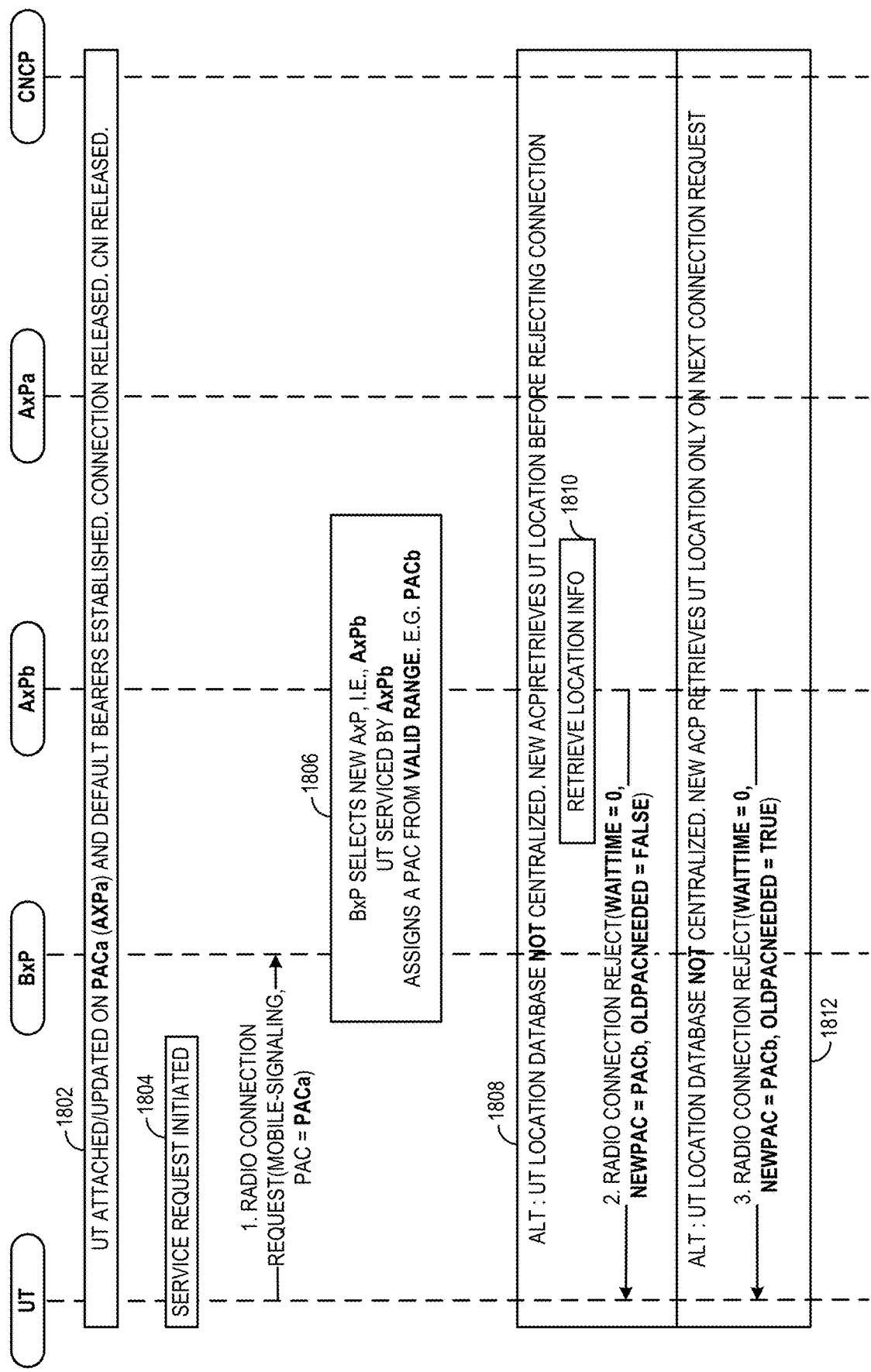
FIGS. 18A and 18B (collectively referred to as FIG. 18) are a flow diagram of another example of a PAC reassignment process for a UT in accordance with some aspects of the disclosure.
Figure 18B:
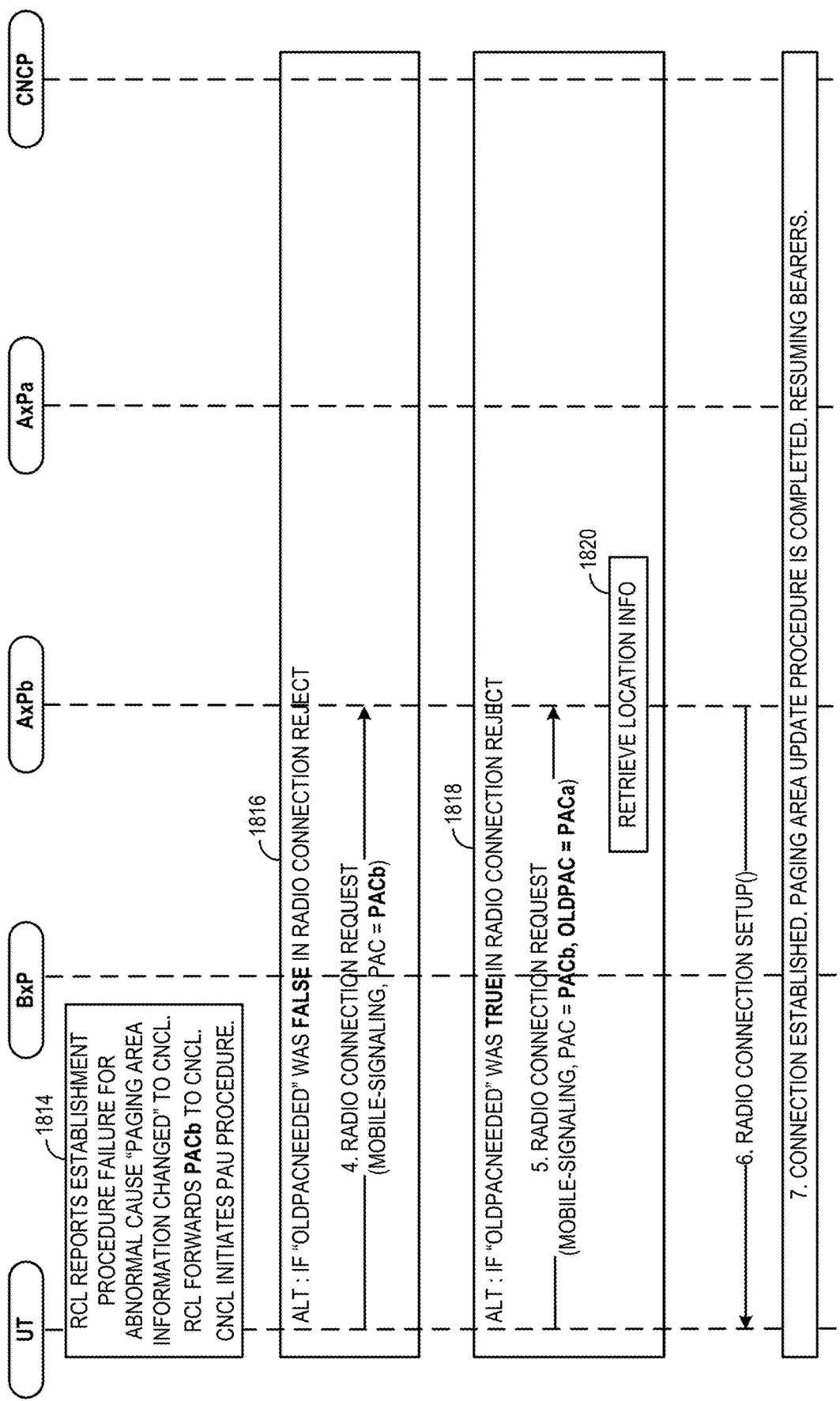

FIGS. 18A and 18B illustrate a message flow diagram for a PAC reassignment operation where a UT is served by a new ACP, and the new ACP uses UT assistance in retrieving UT location information. In this case, reporting of an old PAC value in a Radio Connection Request may be ACP controlled. For example, the UT may send both the new PAC and the old PAC in response to a request from the network. The message flow will be discussed in the context of a satellite communication system that includes a UT, a BxP, a first AxPa, a second AxPb, and a CNCP.

Blocks 1802, 1804, and 1806 of FIG. 18A correspond to blocks 1702, 1704, and 1706 of FIG. 17 discussed above. In addition, a first operation of FIG. 18A corresponds to the first operation (1) of FIG. 17 discussed above.

In a first alternative approach (block 1808) where the UT location database is not centralized, the new ACP retrieves the UT location before rejecting the connection. Thus, the ACP first retrieves the UT location information (block 1810) and then, in a second operation (2), the ACP sends a Radio Connection Reject to the UT. In this case, an OldPACneeded IF of the Radio Connection Reject indicates that the old PAC is not needed.

In a second alternative approach (block 1812) where the UT location database is not centralized, the new ACP retrieves the UT location at the next connection request. Thus, in a third operation (3), the ACP sends a Radio Connection Reject to the UT where the OldPACneeded IF of the Radio Connection Reject indicates that the old PAC is needed.

Block 1814 of FIG. 18B correspond to block 1708 of FIG. 17 discussed above.

In a first alternative approach (block 1816) where Old-PACneeded was FALSE, in a fourth operation (4), the UT sends a Radio Connection Request that includes the new PAC to the ACP.

In a second alternative approach (block 1818) where OldPACneeded was TRUE, in a fifth operation (5), the UT sends a Radio Connection Request that includes the new PAC and the old PAC to the ACP. The ACP may then attempt to retrieve the UT location information using the old PAC and the Temporary Network Identifier (block 1820).

The connection establishment and the PAU procedure completion may then be done as follows. In a sixth operation (6), the ACP sends a Radio Connection Setup to the UT. In a seventh operation (7), the connection is established, the PAU procedure is completed, and bearers are resumed.

In the sequence of FIGS. 18A and 18B, ACP can retrieve UT location information either at the second operation (2) or the fifth operation (5) depending on the network implementation of the location database. Reporting of the old PAC may be controlled by network as discussed above.

VII-D. Inter Administrative Region Connection Handoff

FIGS. 19A-19E illustrate a message flow diagram for an Inter-Administrative Region Connection Handoff in accordance with some aspects of the disclosure. Here, the UT is served by and the PAC is reassigned. The message flow will be discussed in the context of a satellite communication system that includes a UT, a source BxP, a target BxP, a source AxP, a target AxP, a source LxP, a target LxP, a CNCP, and a CNUP.

Figure 19A:
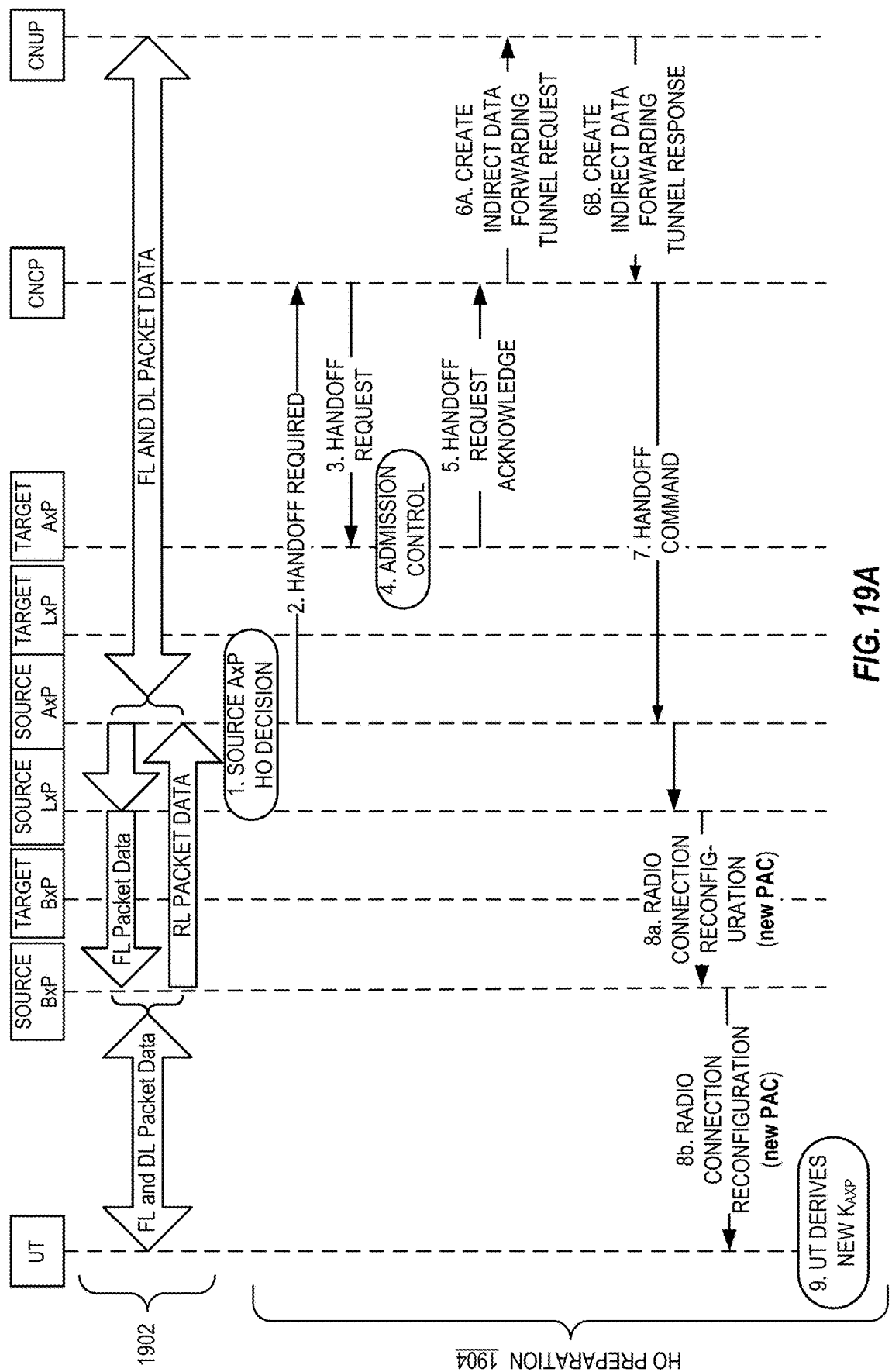
FIGS. 19A, 19B, 19C, 19D, and 19E (collectively referred to as FIG. 19) are a flow diagram of an example handoff process in accordance with some aspects of the disclosure.

With reference to FIG. 19A, initially, the UT is Attached or Updated and default bearers (paths) are established. The UT is in Connection Management state CONNECTED. Forward link (FL) and reverse link traffic are indicated by bracket 1902.

Bracket 1904 indicates handoff preparation operations at a first operation (1) through a ninth operation (9). The Network initiates a Connection Handoff relocating AxP. In the first operation (1) and the second operation (2), the source AxP make a handoff decision and sends a Handoff Required to the CNCP. In the third operation (3), the CNCP sends a Handoff Request to the target AxP. In the fourth operation (4) and the fifth operation (5), the target AxP, the target AxP performs admission control (e.g., target AxP derives a new $K_{AXP}$), and sends a Handoff Request Acknowledge to the CNCP. In some aspects, this may be only for indirect forwarding of data (i.e., via CNI). In the first part of the sixth operation (6A), the CNCP sends a Create Indirect Data Forwarding Tunnel Request to the CNUP. In the second part of the sixth operation (6B), the CNUP sends a Create Indirect Data Forwarding Tunnel Response to the CNCP. In the seventh operation (7), the CNCP sends a Handoff Command to the source AxP. A new PAC may be assigned to UT. In the first part of the eighth operation (8A), the source AxP sends a Radio Connection Reconfiguration including the new PAC to the source BxP. In the second part of the eighth operation (8B), the source BxP sends the Radio Connection Reconfiguration including the new PAC to the source UT. The UT thus derives the new $K_{AxP}$ at the ninth operation (9).

Figure 19B:
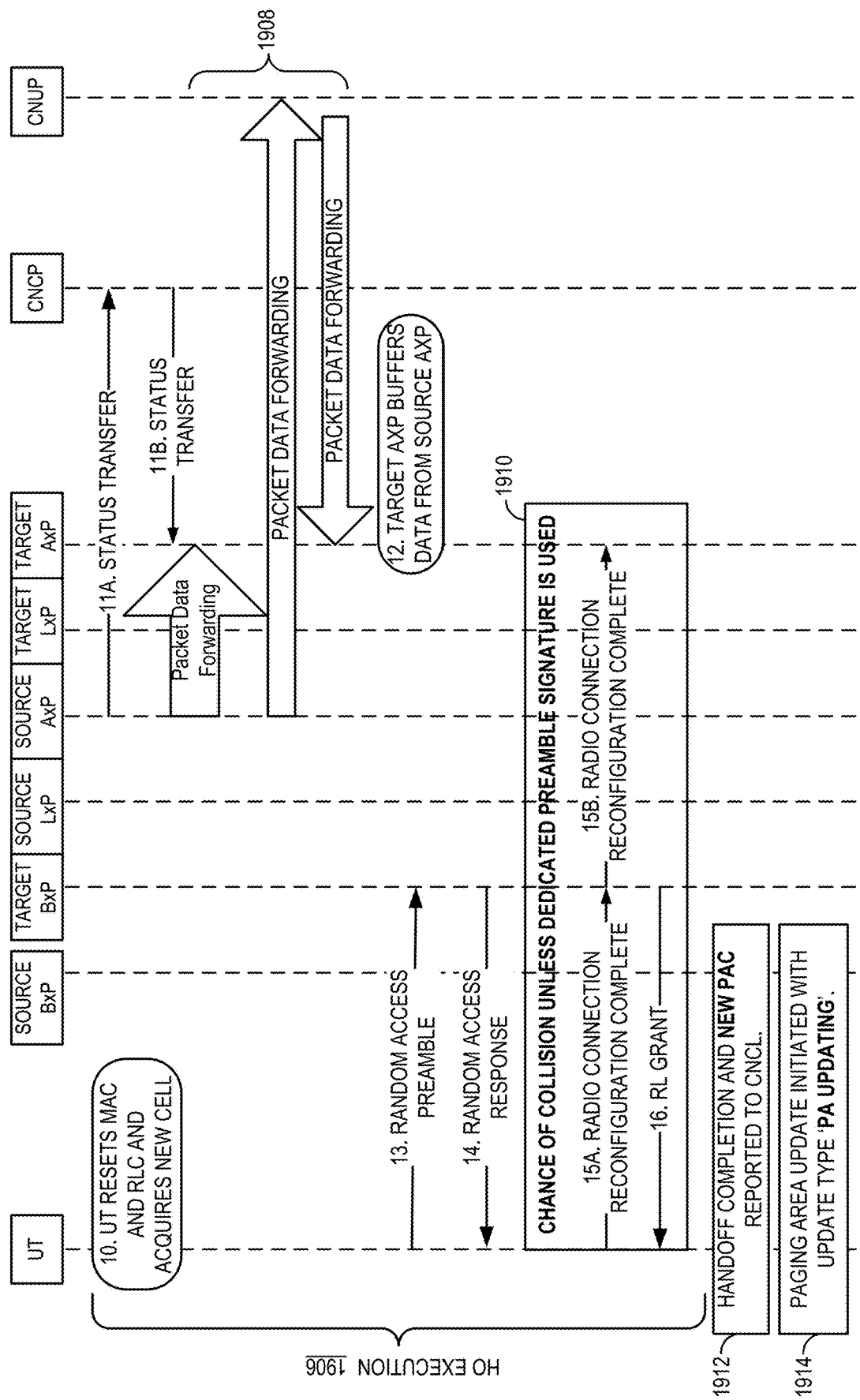

Referring to FIG. 19B, the bracket 1906 indicates handoff execution operations at a tenth operation (10) through a sixteenth operation (16). Here, the UT applies the handoff configuration and sends a Radio Reconfiguration Complete to the AxP. In the tenth operation (10), the UT reset its Media Access Control (MAC) and RLC and acquires a new cell. In the first part of the eleventh operation (11A), the source AxP sends a Status Transfer message to the CNCP. In the second part of the eleventh operation (11B), the CNCP sends a Status Transfer message to the target AxP. The bracket 1908 indicated packet data forwarding. In some aspects, the forwarding from the source AxP to the target AxP may be only for direct forwarding of data (i.e., via an appropriate interface). In some aspects, the forwarding from the source AxP to the CNUP may be only for direct forwarding of data (i.e., via the CNI). In the twelfth operation (12), the target AxP buffers data from the source AxP. In the thirteenth operation (13), the UT sends a Random Access Preamble (e.g., using a contention RACH preamble) to the target BxP. In the fourteenth operation (14), the target BxP sends a Random Access Response to the UT. This Response may include a contention RACH preamble ID, PA information, an RL Grant, and a temporary Radio Network Identifier.

As indicated by block 1910, there may be a chance of collision unless a dedicated preamble signature is used. In the first part of the fifteenth operation (15A), the UT sends a Radio Connection Reconfiguration Complete to the target BxP. This message may include a Radio Network Identifier MAC element. In some aspects, the target BxP may parse the Radio Network Identifier MAC element and forward the Radio message to the correct AxP. In the second part of the fifteenth operation (15B), the target BxP sends a Radio Connection Reconfiguration Complete to the target AxP. In some aspects, the target AxP may send a Handoff Notify message to the CNCP at this time (see the nineteenth operation). In the sixteenth operation (16), the target BxP sends an RL Grant to the UT.

The UT's CNCL then starts a Paging Area Update procedure for a new PAC. At block 1912, handoff completion and the new PAC are reported to the CNCL. At block 1914, a PAU is initiated with update type "PA Updating."

Figure 19C:
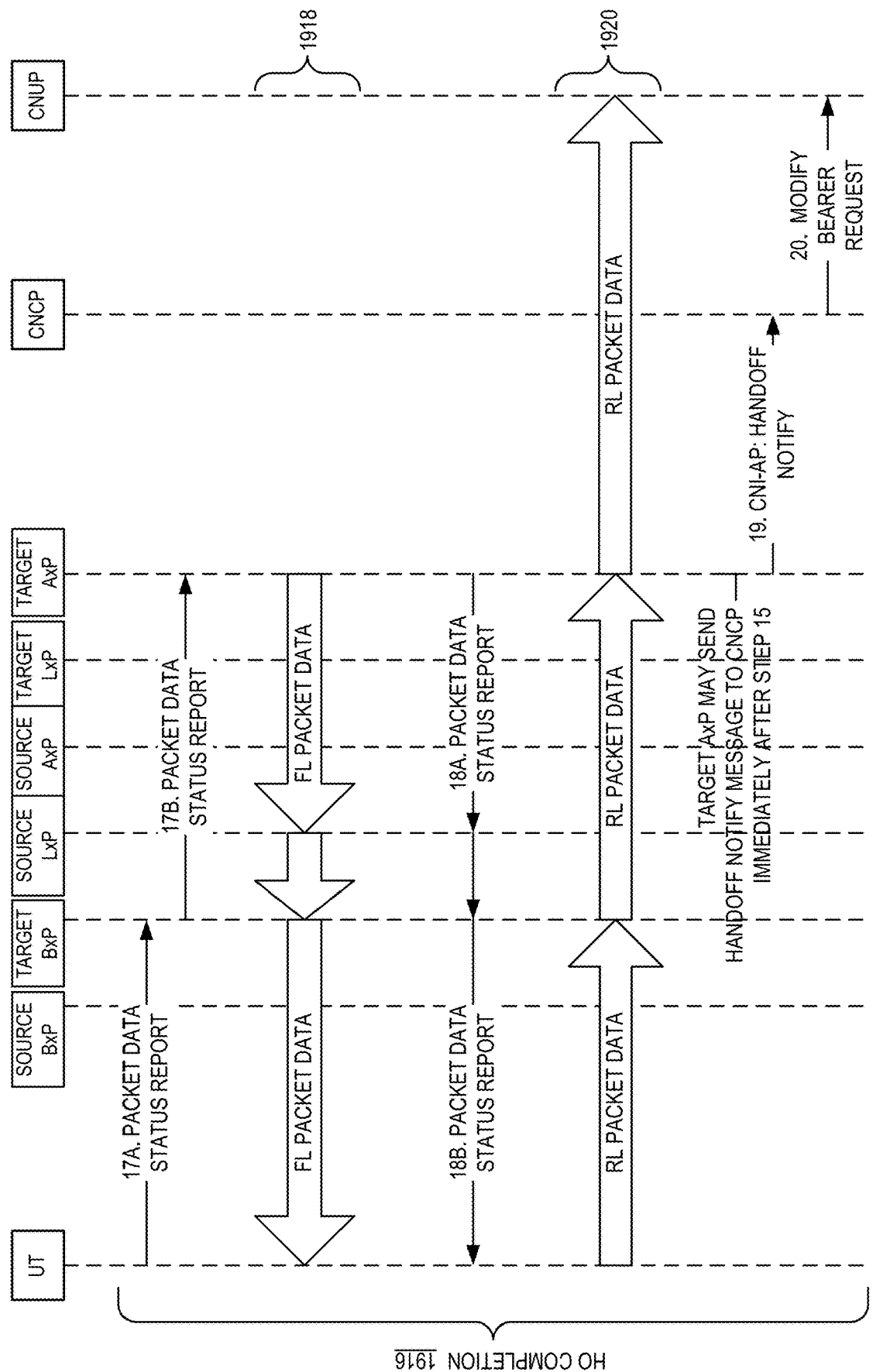
Figure 19D:
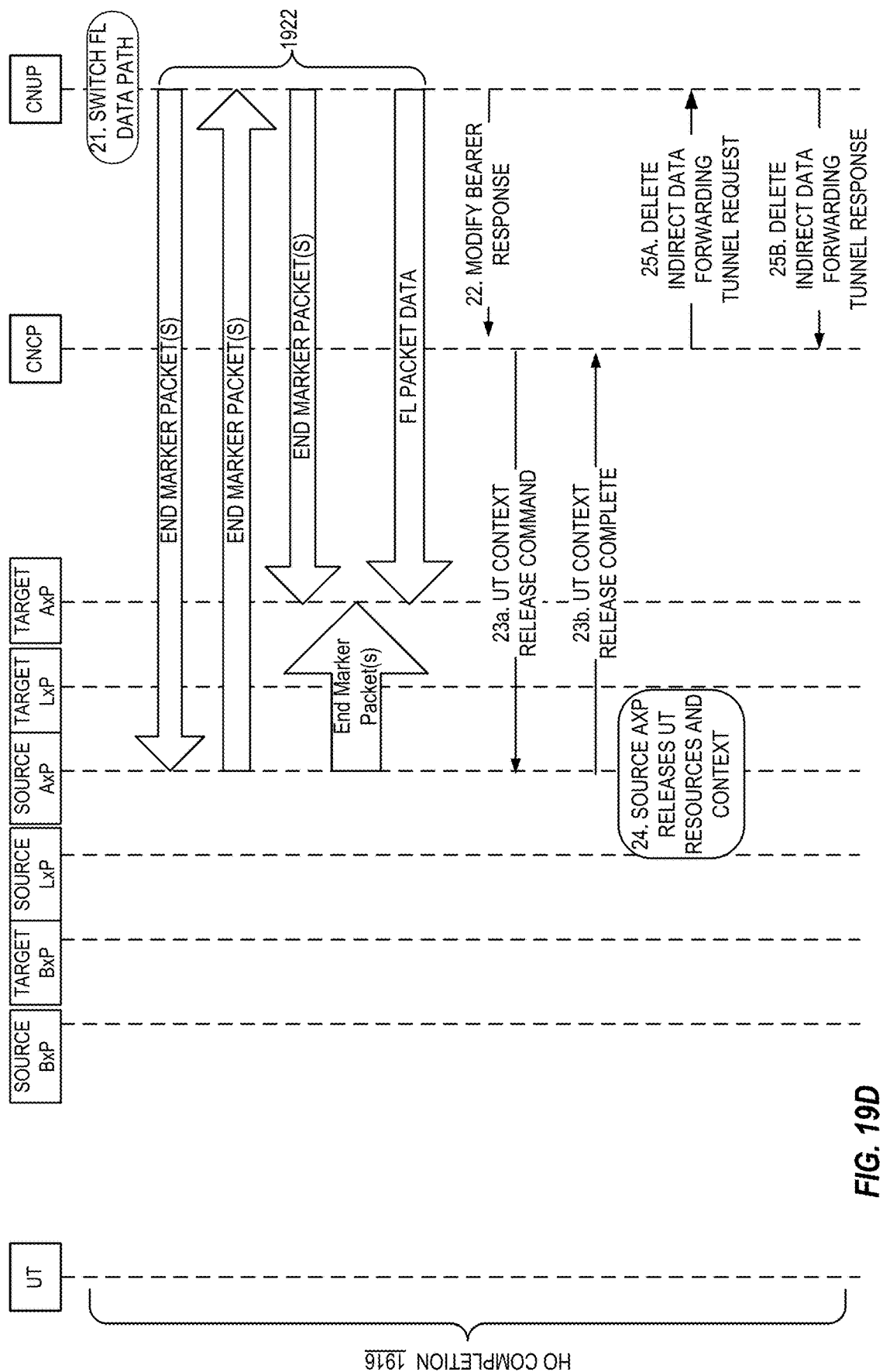

Referring to FIGS. 19C and 19D, the bracket 1916 indicates handoff completion operations at a seventeenth operation (17) through a twenty fifth operation (25B). Here, status description and data forwarding is performed between network nodes to complete handoff processing. The seventeenth operation (17) is optional. In the first part of the seventeenth operation (17A), the UT sends a Packet Data Status Report to the target BxP. This message may include a list of missing or received FL Packet Data protocol data units. In the second part of the seventeenth operation (17B), the target BxP sends a Packet Data Status Report to the target AxP. Bracket 1918 shows the FL packet data.

The eighteenth operation (18) is optional. In a first part of the eighteenth operation (18A), the target AxP sends a Packet Data Status Report to the target BxP. This message may include a list of missing or received RL Packet Data protocol data units. In a second part of the eighteenth operation (18B), the target BxP sends a Packet Data Status Report to the UT. Bracket 1920 shows the RL packet data. In the nineteenth operation (19), the target AxP sends a Handoff Notify to the CNCP. In the twentieth operation (20), the CNCP sends a Modify Bearer Request to the CNUP.

Referring to FIG. 19D, in the twenty first operation (21), the CNUP switches the FL data path. The bracket 1922 shown the end marker packet(s). In some aspects, the end marker packets from the source AxP to the CNUP may be only for indirect forwarding of data (i.e., via the CNI). In some aspects, the end marker packets from the source AxP to the target AxP may be only for indirect forwarding of data (i.e., via an appropriate interface). In the twenty second operation (22), the CNUP sends a Modify Bearer Response to the CNCP. In a first part of the twenty third operation (23A), the CNCP sends a UT Context Release Command to the source AxP. In a second part of the twenty third operation (23B), the source AxP sends a UT Context Release Complete to the CNCP. In the twenty fourth operation (24), the source AxP releases the UT resources and context. In a first part of the twenty fifth operation (25A), the CNCP sends a Delete Indirect Data Forwarding Tunnel Request to the CNUP. In a second part of the twenty fifth operation (25B), the CNUP sends a Delete Indirect Data Forwarding Tunnel Response to the CNCP.

Figure 19E:
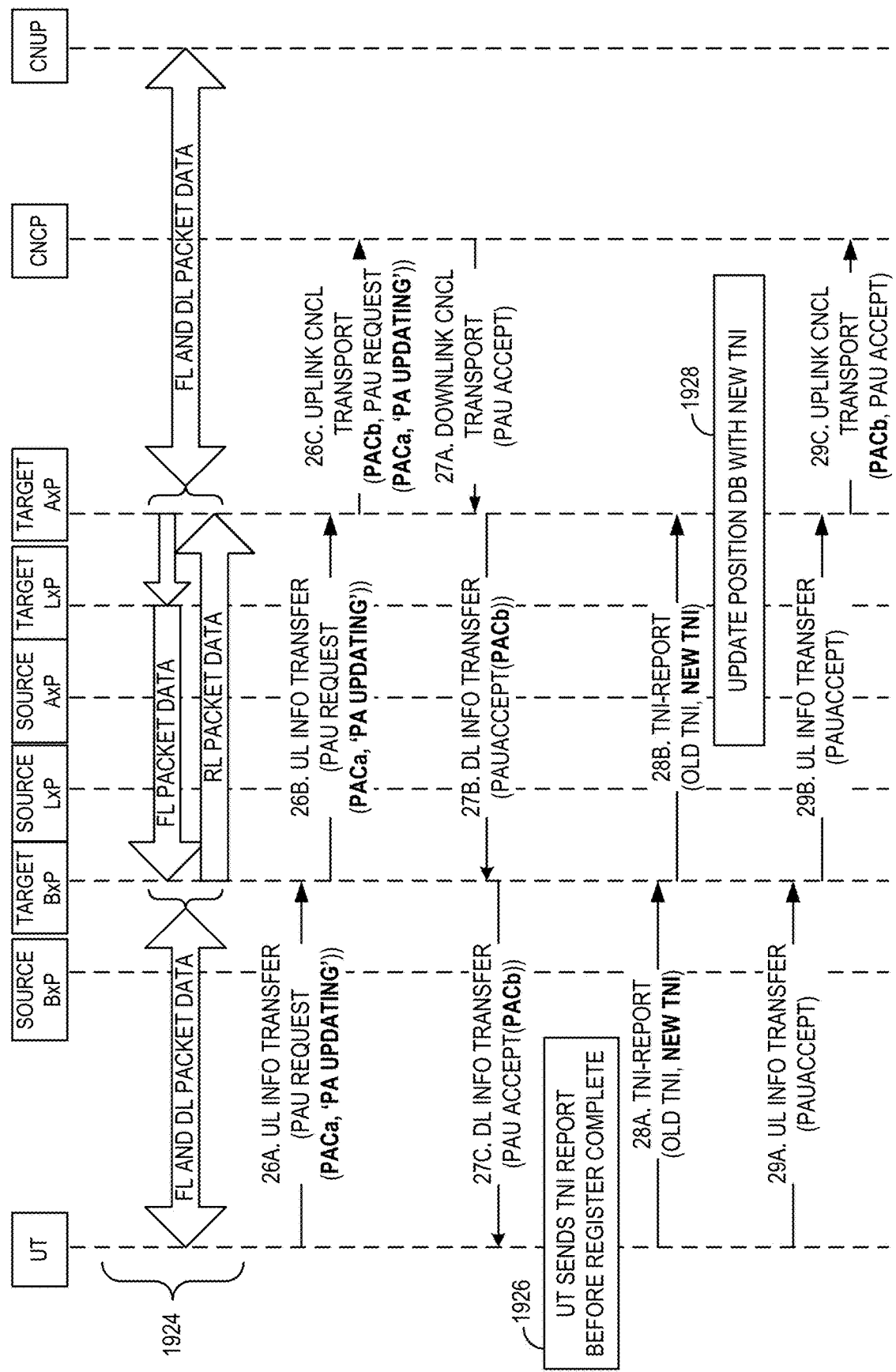

Referring to FIG. 19E, the bracket 1924 shown the FL packet data and the RL packet data after the handoff. In a twenty sixth operation (26A) through a twenty seventh operation (27C), Paging Area Update Request and Accept messages are carried in direct transfer messages between the UT and the CNCP. In a first part of the twenty sixth operation (26A), the UT sends an UL Information Transfer with a PAU Request to the target BxP. The PAU Request includes the PAC (PACa) and an indication of "PA Updating." In a second part of the twenty sixth operation (26B), the target BxP sends an UL Information Transfer with a PAU Request to the target AxP. In a third part of the twenty sixth operation (26C), the target AxP sends an UL CNCL Transport with a new PAC (PACb) and a PAU Request to the CNCP. In a first part of the twenty seventh operation (27A), the CNCP sends a DL Transport with a PAU Accept to the target AxP. In a second part of the twenty seventh operation (27B), the target AxP sends a DL Information Transfer with a PAU Accept and the new PAC (PACb) to the target BxP. In a third part of the twenty seventh operation (27C), the target BxP sends a DL Information Transfer with the PAU Accept and the new PAC to the UT.

At block 1926, if the UT received a new Global Temporary Network Identifier (GTNI) in a Paging Area Update Accept message, the UT sends a Temporary Network Identifier (TNI) report to the AxP before sending a Register Complete. In a first part of the twenty eighth operation (28A), the UT sends a TNI Report with the old TNI and the new TNI to the target BxP. In a second part of the twenty eighth operation (28B), the target BxP sends a TNI Report with the old TNI and the new TNI to the target AxP. The AxP then updates the UT location database with the new Temporary Network Identifier (block 1928). In a first part of the twenty ninth operation (29A), the UT sends an UL Information Transfer with a PAU Accept to the target BxP. In a second part of the twenty ninth operation (29B), the target BxP sends an UL Information Transfer with a PAU Accept to the target AxP. In a third part of the twenty ninth operation (29C), the target AxP sends an UL CNCL Transport with the new PAC (PACb) and the PAU Accept to the CNCP.

VIII. Detailed Examples for Forbidden Area Handling

The disclosure relates in some aspects to defining a set of PA values that are associated with one or more forbidden areas. These values may be referred to as forbidden PACs (PACf). In some aspects, PACdefault may be used to address Issue #3 discussed above.

The Core Network Control Plane (CNCP) is aware of the forbidden PA set. Whenever a UT's GPS location falls in any of the forbidden areas, the ACP assigns a PAC from the Forbidden PA Set to the UT and releases the connection. If a registered UT initiates a PAU Request due to a change in the PAC value, the CNCP rejects the PAU and releases the connection. If a deregistered UT initiates an Attach Request, the CNCP rejects the Attach and releases the connection.

Forbidden area handling issues may arise in various scenarios. For example, a UT may start an Attach procedure in a forbidden zone. As another example, a registered UT may move into a forbidden zone while the UT is in IDLE mode. As yet another example, a registered UT may move into a forbidden zone while the UT is in CONNECTED mode. Also, a UT may reattempt to obtain service after a lapse of a restriction (e.g., based on a time threshold and/or a distance threshold). Several options for connection release signaling (between a UT and the ACP) when a UT's GPS location falls in one of the forbidden zone will now be described.

VIII-A. Forbidden Area Handling Option 1

In a first forbidden area handling option (Option 1), a UT is assigned a new PAC from the set of forbidden PAs using a reconfiguration procedure followed by a connection release.

VIII-A-1. UT Starts Attach Procedure in Forbidden Area

Figure 20A:
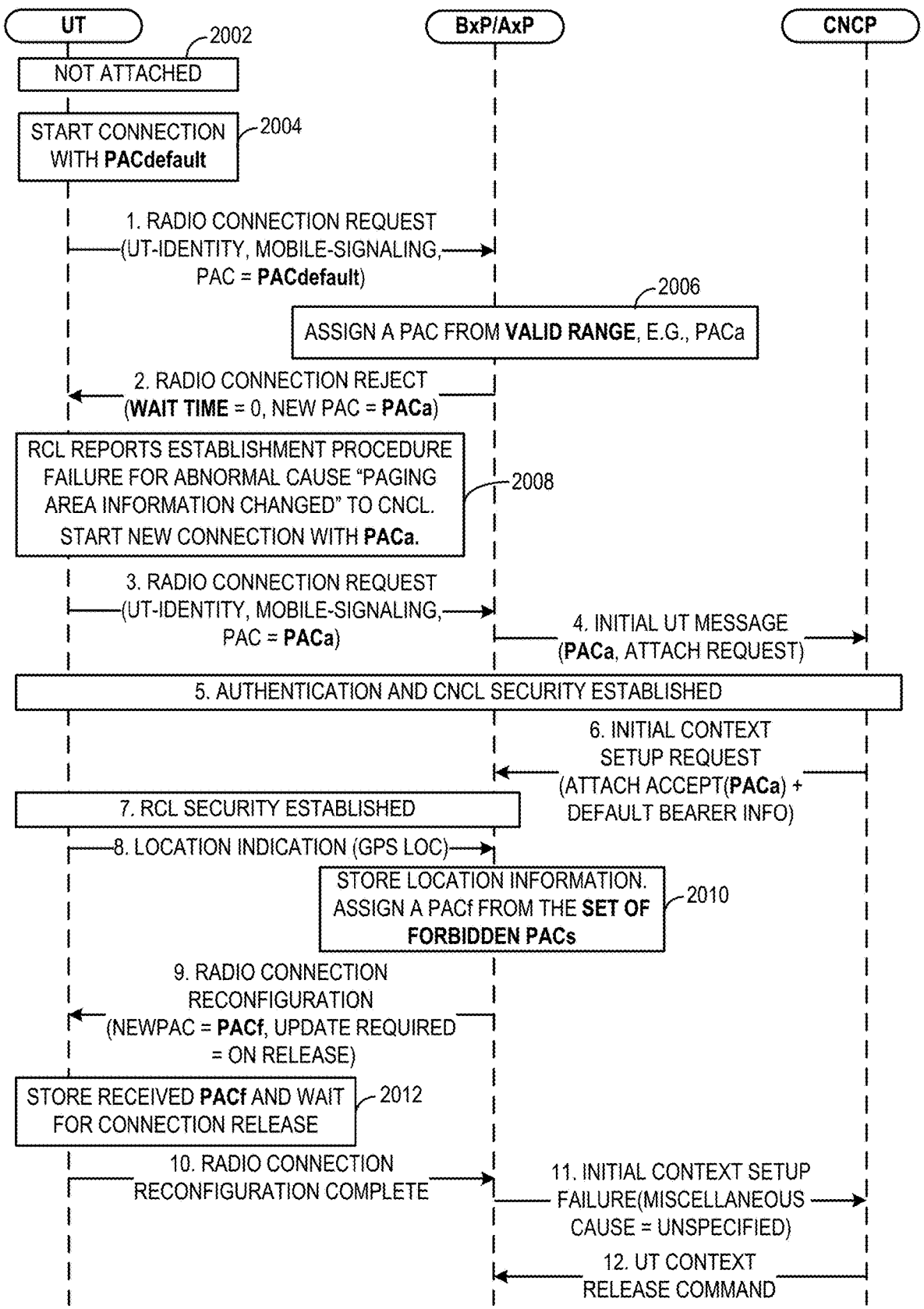
FIGS. 20A and 20B (collectively referred to as FIG. 20) are a flow diagram of an example initial attach process in a forbidden area in accordance with some aspects of the disclosure.
Figure 20B:
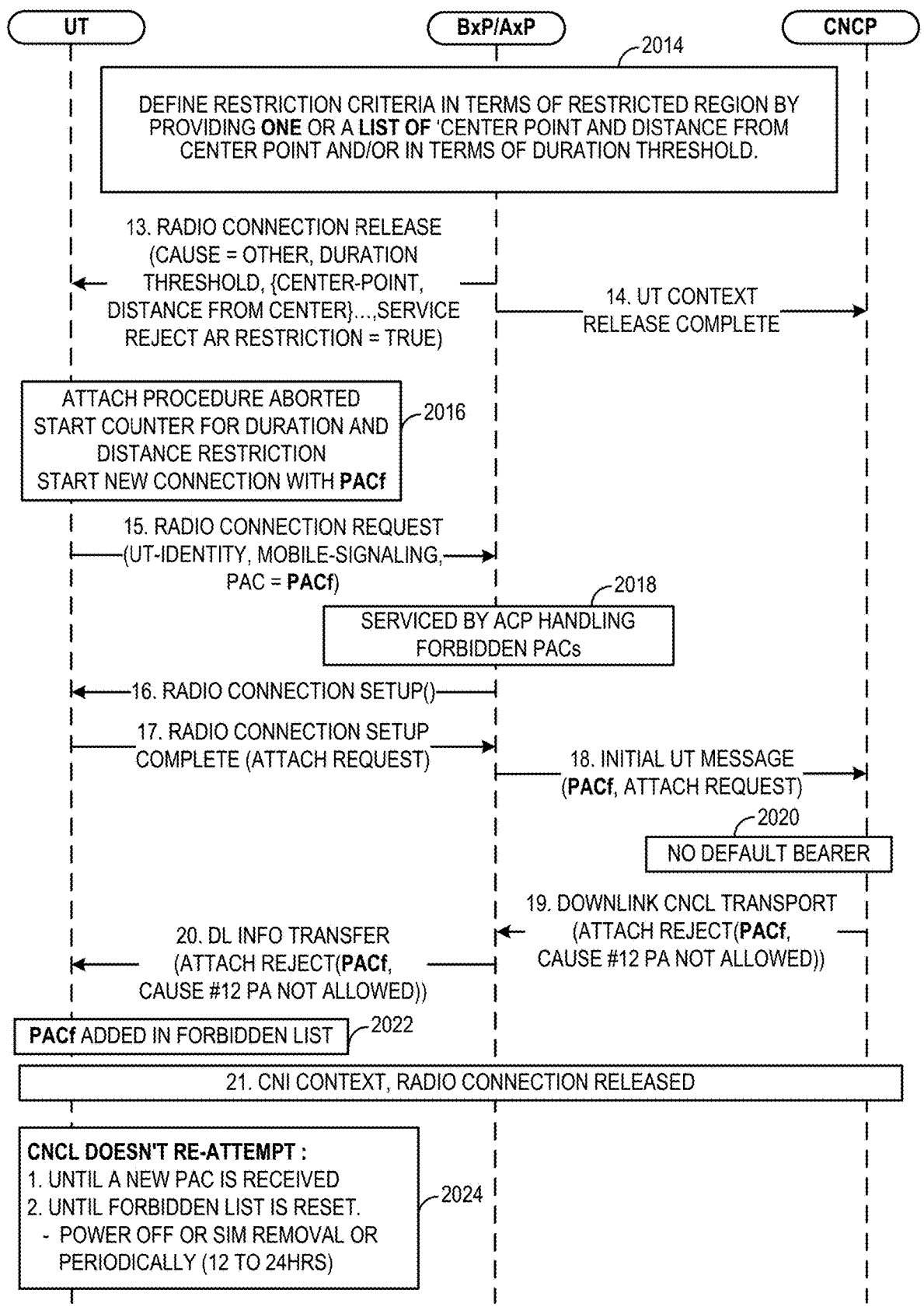

FIGS. 20A and 20B illustrate a message flow diagram for an initial attach (e.g., a power ON attach) procedure in a forbidden area where a forbidden PAC is assigned to a UT in accordance with some aspects of the disclosure. The message flow will be discussed in the context of a satellite communication system that includes a UT, a BxP, an AxP, and a CNCP.

Referring to FIG. 20A, the UT is initially not attached to a network (block 2002). As discussed herein, the UT uses PACdefault to start a connection (block 2004).

In a first operation (1), after camping on a cell, the UT uses PACdefault to initiate CNCL mobility procedures. Specifically, the UT initiates an Attach procedure and initiates a Radio connection by sending a Radio Connection Request including PACdefault to the BxP/AxP.

Upon receiving the Radio Connection Request, at block 2006, the ACP serving the UT assigns a PAC from the valid range of PACs (designated PACa in this example).

At a second operation (2), the assigned PAC is sent to the UT in a Radio Connection Reject. The PAC value is maintained in UT context. The Radio Connection Reject includes a wait time variable set to zero, thereby requesting that the UT "immediately" attempt to reconnect.

The Attach procedure is aborted due to the change in PA information (block 2008). The UT's RCL reports the failure of the connection establishment procedure to the UT's CNCL. The failure being indicated as result of a cause "PA information changed." A new Radio connection is initiated with the assigned PAC. At a third operation (3), the UT sends a Radio Connection Request that includes the assigned PAC.

At a fourth operation (4), the ACP sends an Initial UT Message to the Core Network Control Plane (CNCP) for a Core Network Interface logical connection establishment with the received Attach Request and the assigned PAC value.

In a fifth operation (5) through a seventh operation (7), UT context is established between the ACP and the CNCP. CNCL Security is activated in the fifth operation (5). The CNCP sends an Initial Context Setup Request including the Attach Accept to the ACP in the sixth operation (6). The Attach Accept includes the same PAC (the PAC received in the Initial UT Message). In the seventh operation (7), the ACP activates Radio Connection Layer (RCL) security.

The ACP then waits for the UT's geographic location. In an eighth operation (8), the UT sends Location Indication (including the UT's GPS location) following the RCL security activation. The ACP stores the received UT location information (block 2010). The ACP determines that the UT location falls under any forbidden area and assigns a PAC from the Forbidden PA Set and sends new PAC using a reconfiguration procedure. In addition, the ACP indicates when the UT is to start using the new PAC. To this end, in a ninth operation (9), the ACP sends a Radio Connection Reconfiguration to the UT. The Radio Connection Reconfiguration includes PACf and an indication to commence an update procedure once the UT is released.

The UT stores the received PACf and waits for a trigger (e.g., a connection release) to start using the stored PAC (block 2012). In a tenth operation (10), the UT sends a Radio Connection Reconfiguration Complete to the ACP.

In an eleventh operation (11), the ACP sends an Initial Context Setup Failure to the CNCP. The Initial Context Setup Failure includes a Miscellaneous Cause value of "Unspecified." The CNCP initiates a connection release upon receiving this message with the mentioned cause value. Accordingly, in a twelfth operation (12), the CNCP sends a UT Context Release Command to the ACP.

The ACP defines restriction criteria in terms of a restricted region (block 2014). For example, a restriction criterion may be defined by one or a list of an ellipsoid point (e.g., a center point) and a distance (e.g., a radius) from the ellipsoid point. Alternatively, or in addition, a restriction criterion may be defined in terms of a duration threshold (e.g., a period of time after detection of a UT in a restricted area). Use of a restricted area list is intended to be indicative, not exhaustive, of a manner in which a geographical area can be defined. Thus, other techniques could be used to send area (zone) information in a Radio message (e.g., a Radio Connection Release message).

The ACP performs a connection release with information for a subsequent Update procedure towards mobility management. In a thirteenth operation (13) and a fourteenth operation (14), the ACP sends a Radio Connection Release to the UT and a UT Context Release Complete to the CNCP.

The Radio Connection Release may include one or more of: service restriction information (e.g., a flag indicating service is restricted); an optional time duration-based restriction threshold, or an optional restricted area definition. The Restricted Area may be defined as a tuple {GPS coordinate, distance from that coordinate}. As mentioned above, the ACP can provide a list of at least one restricted area having at least one area definition.

A UT checks its GPS location against the defined restricted region. If the UT's location falls within any of the restricted areas, the UT should deem the service restriction to be active. If the UT's location does not fall within any restricted area, the UT may deem that the service restriction has lapsed and therefore initiate an Attach procedure.

Upon receiving the Radio Connection Release, the UT aborts the Attach procedure, starts a counter for the duration and distance restriction, and starts a new connection with PACf (block 2016). In other words, once the connection release is completed, the UT starts using PACf and triggers an Attach procedure.

In a fifteenth operation (15), the UT sends a Radio Connection Request with PACf to the ACP. The Request is serviced by the ACP that handles forbidden PACs (block 2018). In a sixteenth operation (16), the ACP sends a Radio Connection Setup to the UT. In a seventeenth operation (17), the UT sends a Radio Connection Setup Complete with an Attach Request to the ACP. In an eighteenth operation (18), the ACP sends an Initial UT Message for CNI logical connection establishment to the CNCP with the received Attach Request and the PACf. There is no default bearer in this case (block 2020). In a nineteenth operation (19), the CNCP sends a DL CNCL Transport including an Attach Reject to the ACP. The Attach Reject includes the PACf and an indication of the cause ("cause #12, PA not allowed"). In a twentieth operation (20), the ACP sends a DL Information Transfer including the Attach Reject to the UT. The UT adds PACf to its forbidden list and the procedure ends (block 2022). In a twenty first operation (21), the connection is released.

The UT's CNCL does not attempt to reconnect until a designated event (trigger) occurs (block 2024). For example, the CNCL may wait until a new PAC is received. As another example, the CNCL may wait until the forbidden list is reset (e.g., when the UT is powered off, when the UT's subscriber information module is removed, or periodically).

VIII-A-2. Registered UT Moves into a Forbidden Area During IDLE

Figure 21A:
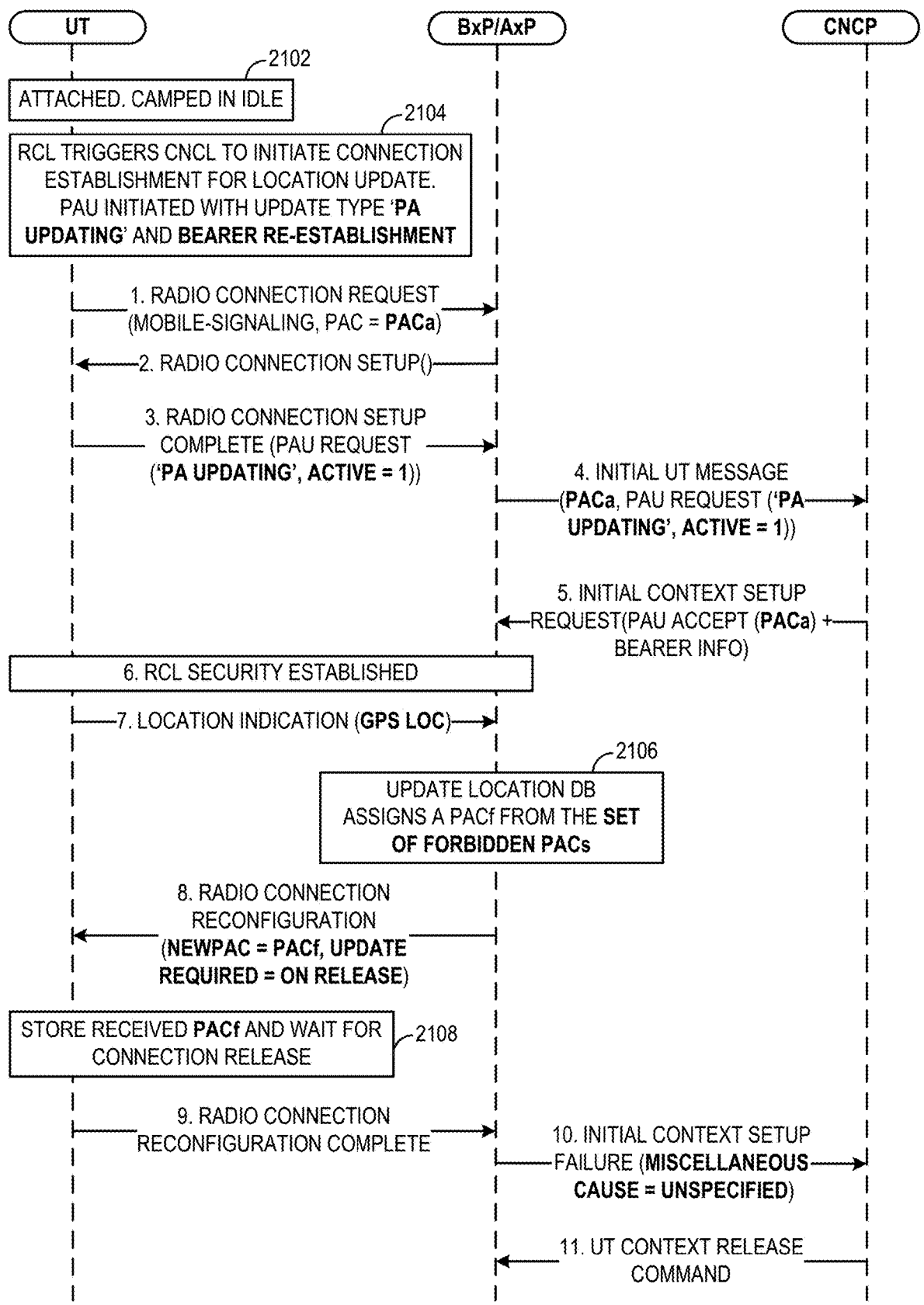
FIGS. 21A and 21B (collectively referred to as FIG. 21) are a flow diagram of an example process where a UT in idle mode moves into a forbidden area in accordance with some aspects of the disclosure.
Figure 21B:
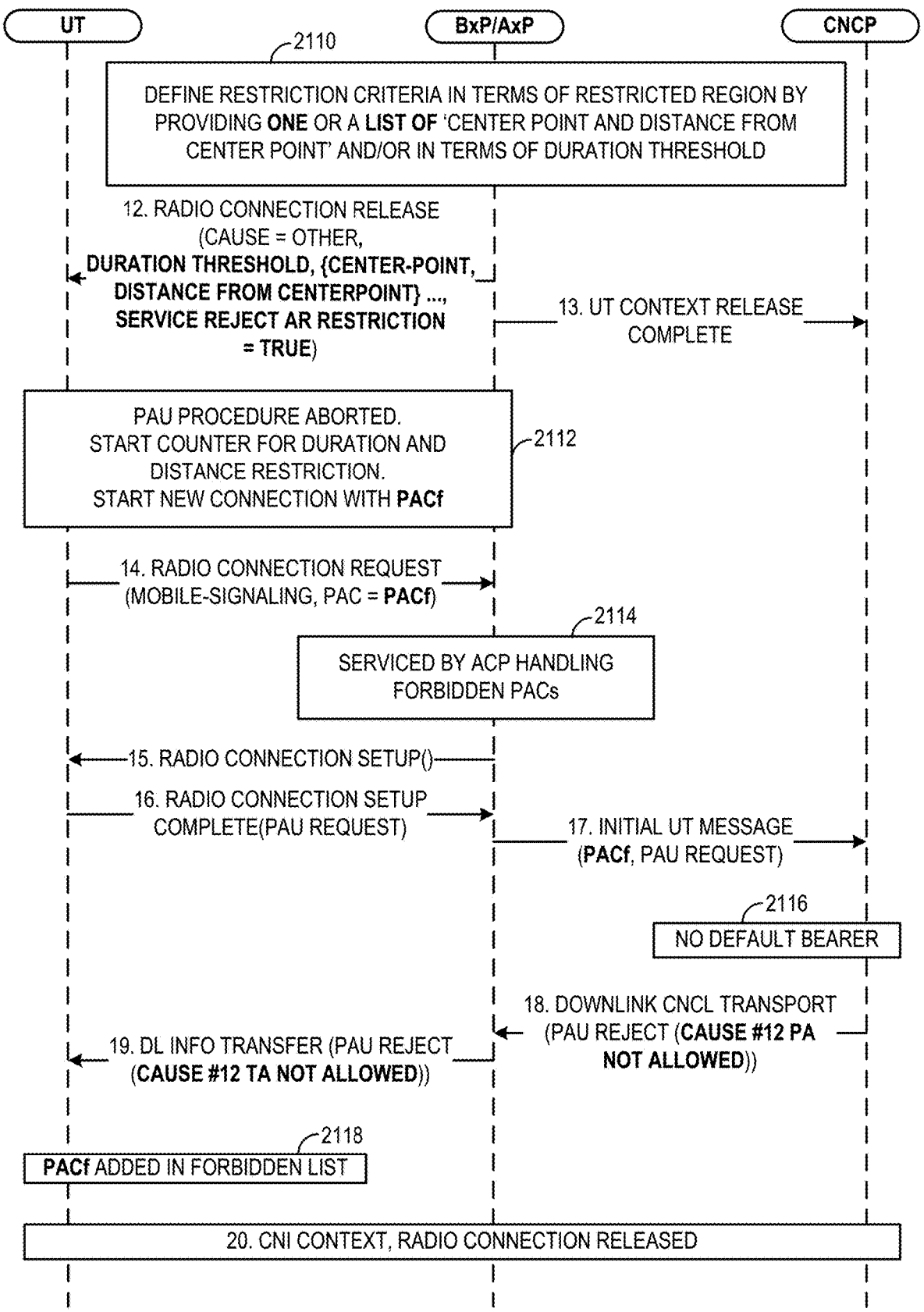

FIGS. 21A and 21B illustrate a message flow diagram for a procedure where a UT moves from a normal service area to a forbidden area while in IDLE mode and where a forbidden PAC is assigned to a UT in accordance with some aspects of the disclosure. The message flow will be discussed in the context of a satellite communication system that includes a UT, a BxP, an AxP, and a CNCP.

Referring initially to FIG. 21A, a UT in Connection Management state IDLE is Attached/Updated and default bearers are established (block 2102). When the UT requires a connection for sending a UT location report, the UT's RCL send a new trigger to the UT's CNCL to initiate connection establishment for a location update (block 2104). The CNCL initiates a PAU Request with type "PA Updating" and an Active flag set as '1.' The message is integrity protected using the current security context in the CNCL (message contains MAC-CNCL).

In a first operation (1), the UT sends a Radio Connection Request that includes the assigned PAC (PACa) to the ACP. In a second operation (2), the ACP sends a Radio Connection Setup to the UT. In a third operation (3), the UT sends a Radio Connection Setup Complete with the PAU Request to the ACP. In a fourth operation (4), the ACP sends an Initial UT Message to the CNCP with the received PAU Request and the PAC value.

The CNCP does an integrity check on PAU Request message. If the integrity check passes, this means that CNCL-CNCP security is ON. The CNCP therefore requests an Initial Context Setup in the AxP. Thus, in a fifth operation (5), the CNCP sends an Initial Context Setup Request including a PAU Accept to the ACP. In a sixth operation (6), the ACP activates Radio Connection Layer (RCL) security. The AxP waits for the UT's location information after activating RCL security.

In a seventh operation (7), the UT sends a Location Indication to the ACP after RCL security activation. The ACP updates a location database with the received UT location information (block 2106). Upon determining that the UT location falls under a forbidden area, the ACP assigns a PAC from the Forbidden PA Set for the UT. Consequently, the ACP sends a new PAC to the UT using a reconfiguration procedure, indicating when the UT is to start using the new PAC. To this end, in an eighth operation (8), the ACP sends a Radio Connection Reconfiguration to the UT. The Radio Connection Reconfiguration includes PACf and an indication to commence an update procedure once the UT is released.

The UT stores the received PACf and waits for a trigger (e.g., a connection release) to start using the stored PAC (block 2108). In a ninth operation (9), the UT sends a Radio Connection Reconfiguration Complete to the ACP.

In a tenth operation (10), the ACP sends an Initial Context Setup Failure to the CNCP. The Initial Context Setup Failure includes a Miscellaneous Cause value of "Unspecified." The CNCP initiates a connection release upon receiving this message with the mentioned cause value. Accordingly, in an eleventh operation (11), the CNCP sends a UT Context Release Command to the ACP.

The ACP defines a restriction criteria in terms of a restricted region as discussed above (block 2110). The ACP performs a connection release with information for a subsequent Update procedure towards mobility management. In a twelfth operation (12) and a thirteenth operation (13), the ACP sends a Radio Connection Release to the UT and a UT Context Release Complete to the CNCP.

The Radio Connection Release may include one or more of: service restriction information (e.g., a flag indicating service is restricted); an optional time duration-based restriction threshold, or an optional restricted area definition as discussed above. A UT can thereby check its GPS location against the defined restricted region.

Upon receiving the Radio Connection Release, the UT aborts the PAU procedure, starts a counter for the duration and distance restriction, and starts a new connection with PACf (block 2112). In other words, once the connection release is completed, the UT starts using PACf and triggers a PAU procedure.

In a fourteenth operation (14), the UT sends a Radio Connection Request with PACf to the ACP. The Request is serviced by the ACP that handles forbidden PACs (block 2114). In a fifteenth operation (15), the ACP sends a Radio Connection Setup to the UT. In a sixteenth operation (16), the UT sends a Radio Connection Setup Complete with a PAU Request to the ACP. In a seventeenth operation (17), the ACP sends an Initial UT Message for CNI logical connection establishment to the CNCP with the received PAU Request and the PACf. There is no default bearer in this case (block 2116). In an eighteenth operation (18), the CNCP sends a DL CNCL Transport including an Attach Reject to the ACP. The Attach Reject includes the PACf and an indication of the cause ("cause #12, PA not allowed"). In a nineteenth operation (19), the ACP sends a DL Information Transfer including the PAU Reject to the UT. The UT adds PACf to its forbidden list and the procedure ends (block 2118). In a twentieth operation (20), the connection is released.

VIII-A-3. Registered UT Moves into a Forbidden Area During CONNECTED

Figure 22A:
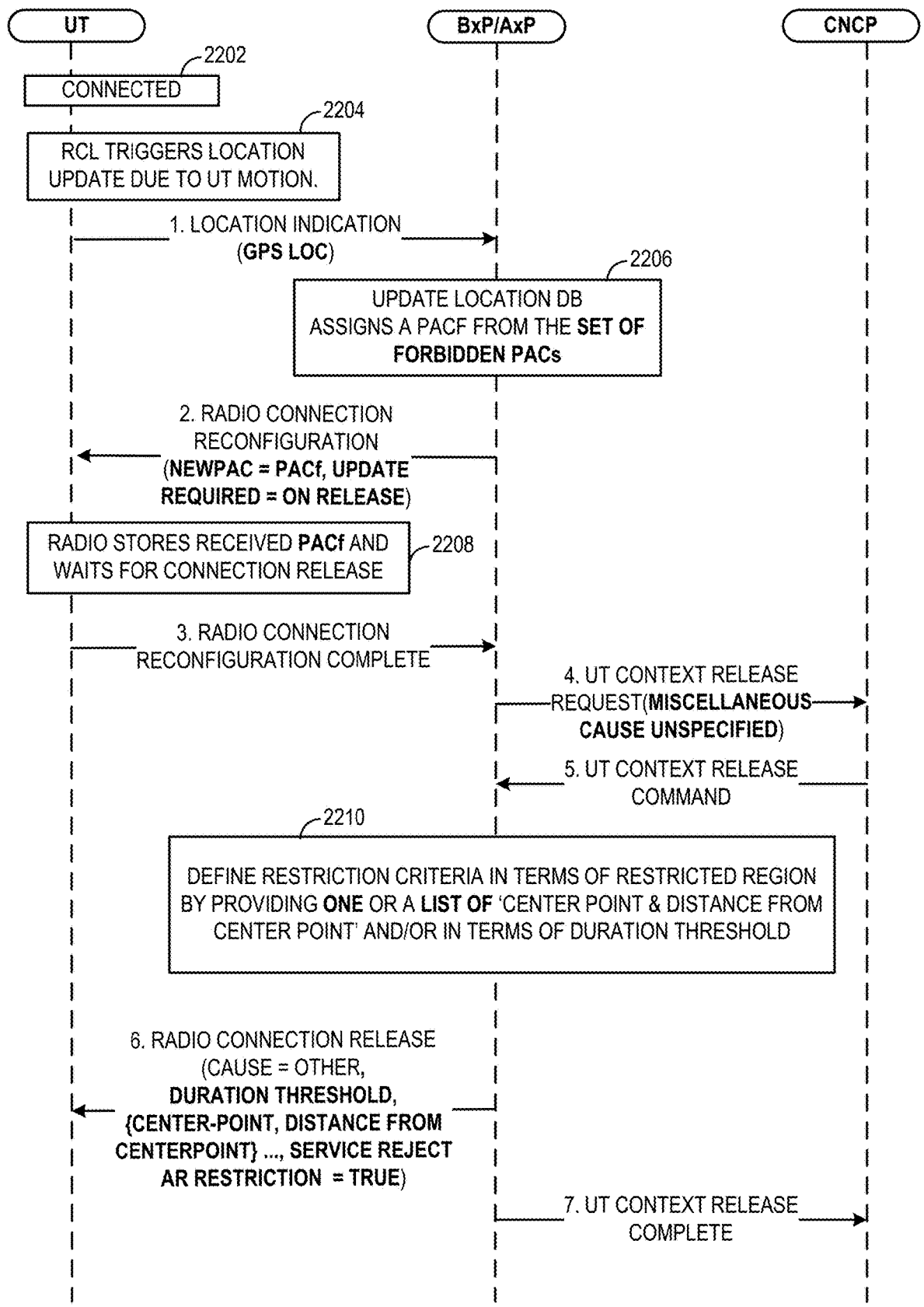
FIGS. 22A and 22B (collectively referred to as FIG. 22) are a flow diagram of an example process where a UT in connected mode moves into a forbidden area in accordance with some aspects of the disclosure.
Figure 22B:
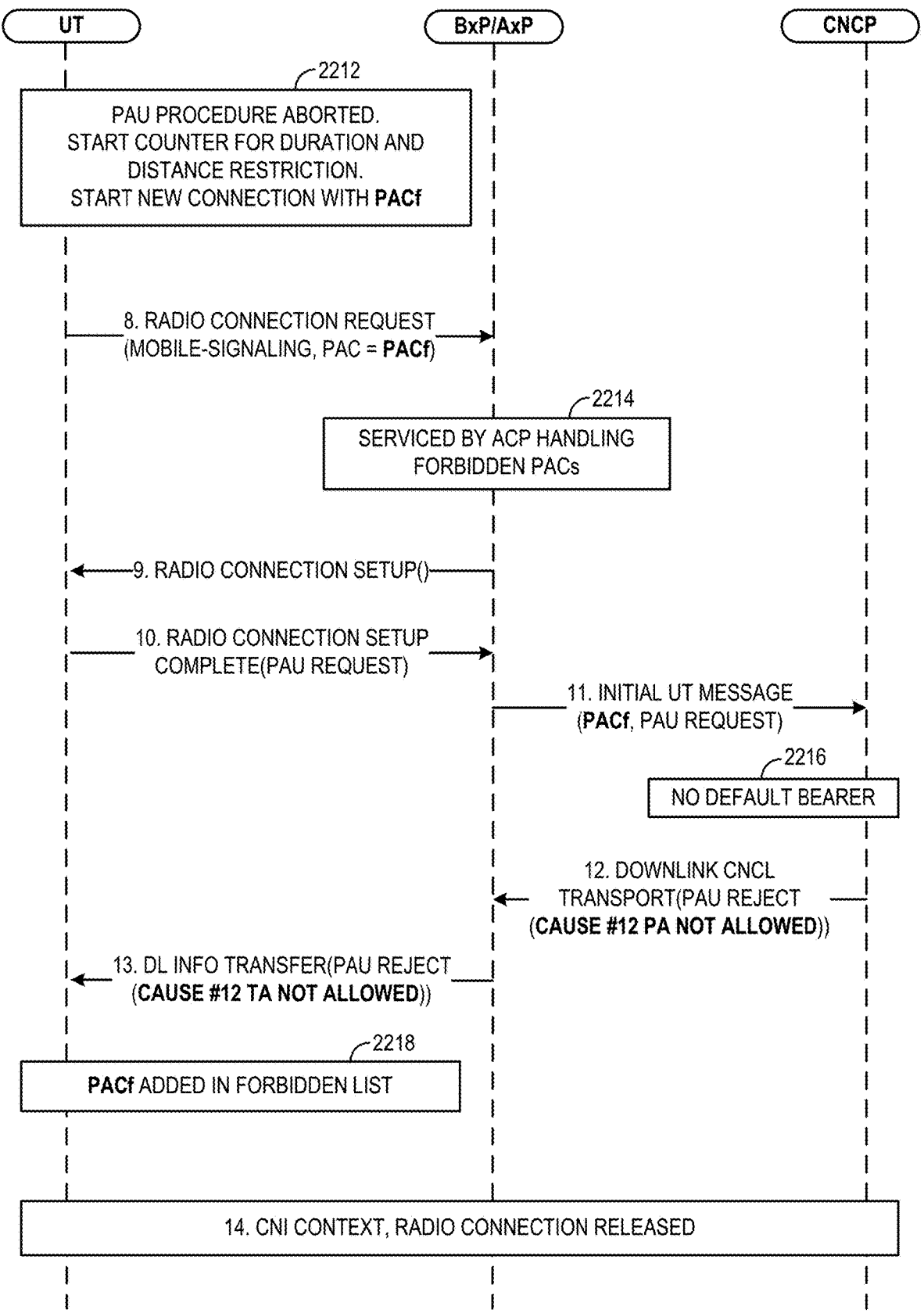

FIGS. 22A and 22B illustrate a message flow diagram for a procedure where a UT moves from a normal service area to a forbidden area while in CONNECTED mode and where a forbidden PAC is assigned to a UT in accordance with some aspects of the disclosure. The message flow will be discussed in the context of a satellite communication system that includes a UT, a BxP, an AxP, and a CNCP.

Referring initially to FIG. 22A, the UT is in Connection Management state CONNECTED with active data bearers (block 2202). The UT reports location information based on a Location Change Threshold defined at the time of Radio Connection setup. Thus, at some point in time, the UT's RCL triggers a location update due to motion of the UT (block 2204). Accordingly, in a first operation (1), the UT sends a Location Indication to the ACP.

The remaining operations of FIGS. 22A and 22B are similar to corresponding operations of FIGS. 21A and 21B discussed above. Specifically, blocks 2206, 2208, 2210, 2212, 2214, 2216, and 2218 correspond to blocks 2106, 2108, 2110, 2112, 2114, 2116, and 2118, respectively. In addition, the second though fourteenth operations of FIGS. 22A and 22B correspond to the eighth through twentieth operations of FIGS. 21A and 21B, respectively.

VIII-B. Forbidden Handling Option 2

In a second forbidden area handling option (Option 2), a UT is initially assigned an invalid (e.g., a default) PAC. The UT is forced to invalidate the assigned PAC on connection release and do an Attach or PAU procedure after connection release.

VII-B-1. UT Starts Attach Procedure in Forbidden Area

Figure 23A:
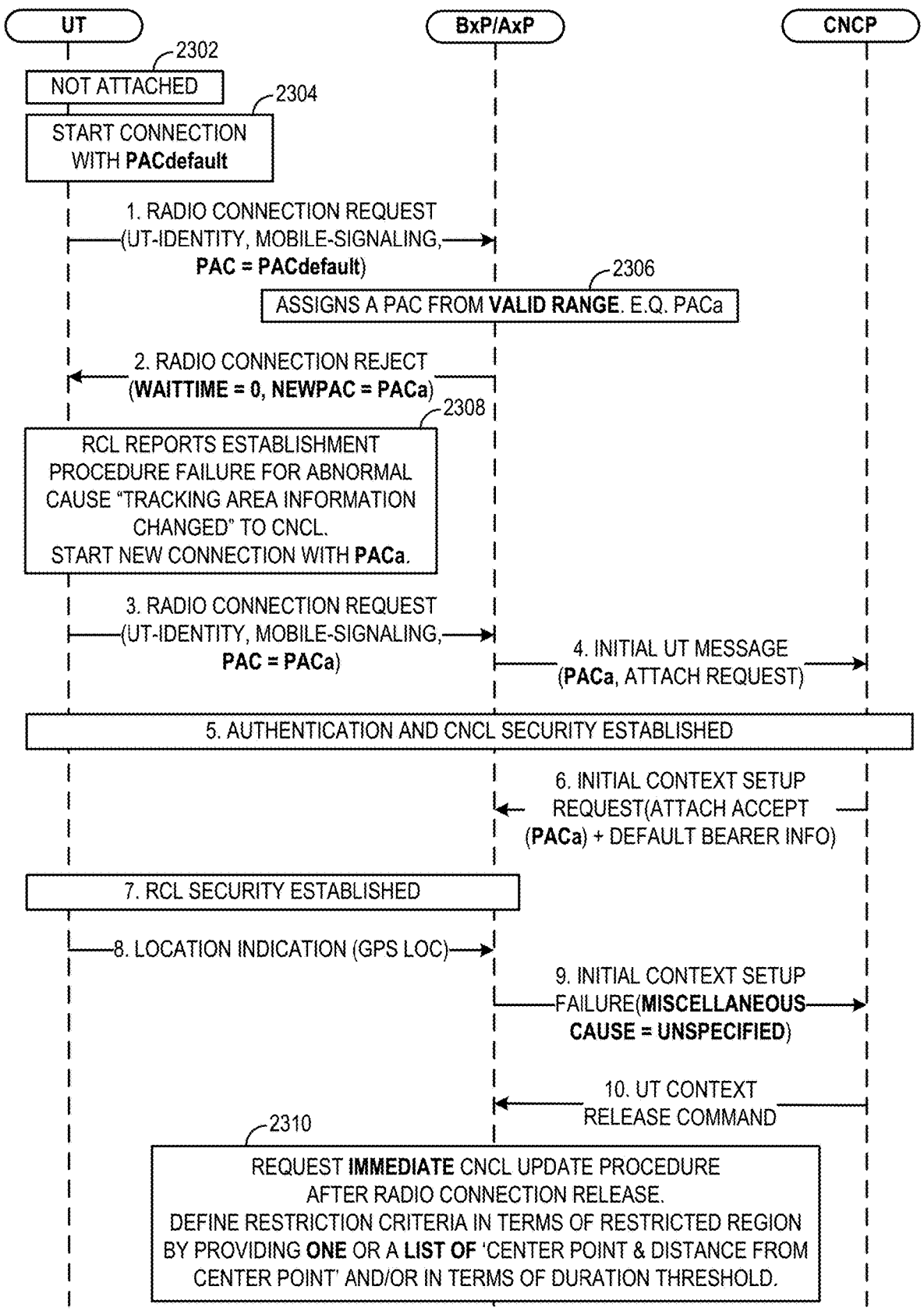
FIGS. 23A and 23B (collectively referred to as FIG. 23) are a flow diagram of an example process where a UT in idle mode moves into a forbidden area in accordance with some aspects of the disclosure.
Figure 23B:
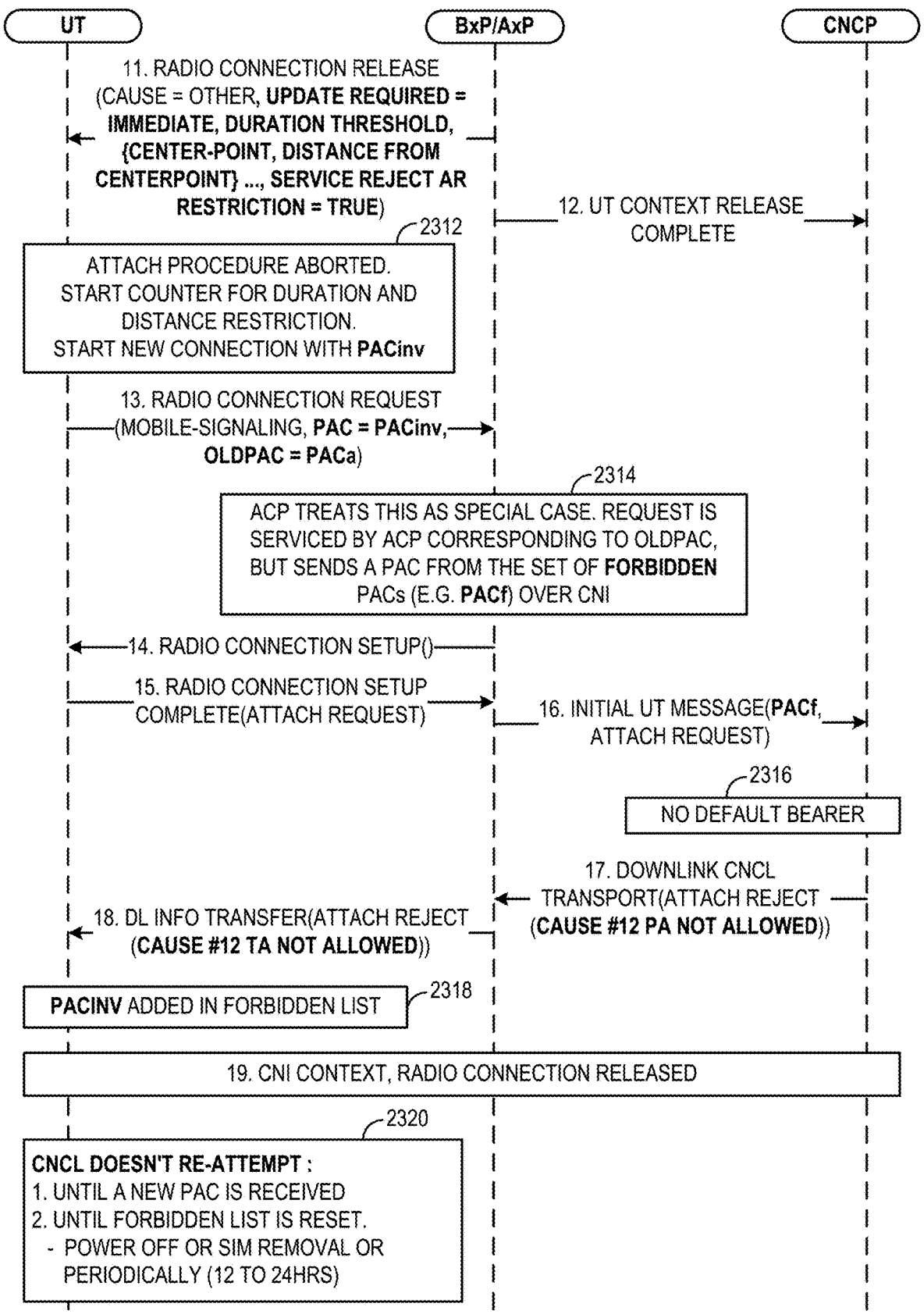

FIGS. 23A and 23B illustrate a message flow diagram for an initial attach (e.g., a power ON attach) procedure in a forbidden area where an invalid PAC is initially assigned to a UT in accordance with some aspects of the disclosure. The message flow will be discussed in the context of a satellite communication system that includes a UT, a BxP, an AxP, and a CNCP.

Referring to FIG. 23A, the UT is initially not attached to a network (block 2302). As discussed herein, the UT uses PACdefault to start a connection (block 2304).

In a first operation (1), after camping on a cell, the UT uses PACdefault to initiate CNCL mobility procedures. Specifically, the UT initiates an Attach procedure and initiates a Radio connection by sending a Radio Connection Request including PACdefault to the BxP/AxP.

Upon receiving the Radio Connection Request, at block 2306, the ACP serving the UT assigns a PAC from the valid range of PACs (designated PACa in this example).

At a second operation (2), the assigned PAC is sent to the UT in a Radio Connection Reject. The PAC value is maintained in UT context. The Radio Connection Reject includes a wait time variable set to zero, thereby requesting that the UT "immediately" attempt to reconnect.

The Attach procedure is aborted due to the change in PA information (block 2308). The UT's RCL reports the failure of the connection establishment procedure to the UT's CNCL. The failure being indicated as result of a cause "PA information changed." A new Radio connection is initiated with the assigned PAC. At a third operation (3), the UT sends a Radio Connection Request that includes the assigned PAC.

At a fourth operation (4), the ACP sends an Initial UT Message to the Core Network Control Plane (CNCP) for a Core Network Interface logical connection establishment with the received Attach Request and the assigned PAC value.

In a fifth operation (5) through a seventh operation (7), UT context is established between the ACP and the CNCP. CNCL Security is activated in the fifth operation (5). The CNCP sends an Initial Context Setup Request including an Attach Accept to the ACP in the sixth operation (6). The Attach Accept includes the same PAC (the PAC received in the Initial UT Message). In the seventh operation (7), the ACP activates Radio Connection Layer (RCL) security.

The ACP then waits for the UT's geographic location. In an eighth operation (8), the UT sends Location Indication (including the UT's GPS location) following the RCL security activation. In a ninth operation (9), the ACP determines that the UT location falls under a forbidden area and sends an Initial Context Setup Failure to the CNCP. The Initial Context Setup Failure includes a Miscellaneous Cause value of "Unspecified." The CNCP initiates a connection release upon receiving this message with the mentioned cause value. Accordingly, in a tenth operation (10), the CNCP sends a UT Context Release Command to the ACP.

The ACP initiates a connection release forcing the UT to invalidate its assigned PAC (block 2310). As discussed above, the ACP defines restriction criteria in terms of a restricted region. In an eleventh operation (11) and a twelfth operation (12), the ACP sends a Radio Connection Release to the UT and a UT Context Release Complete to the CNCP. The UT is thus forced to do an Attach procedure after the connection release. As discussed above, the Radio Connection Release may include one or more of: service restriction information (e.g., a flag indicating service is restricted); an optional time duration-based restriction threshold, or an optional restricted area definition.

Upon receiving the Radio Connection Release, the UT aborts the Attach procedure, starts a counter for the duration and distance restriction, and starts a new connection with an invalid PAC (block 2312). In other words, once the connection release is completed, the UT starts using the invalid PAC (PACinv) and triggers an Attach procedure.

In a thirteenth operation (13) through a fifteenth operation (15), a Radio connection is initiated with PAC information including the old PAC (PACa) and the new PAC (PACinv). The ACP may do specific handling for the scenario where the oldPAC=the last updated PAC and the PAC=PACinv. For example, the UT may be serviced by the ACP that handled the oldPAC. In the thirteenth operation (13), the UT sends a Radio Connection Request with PACinv and PACa to the ACP.

The Request is serviced by the ACP corresponding to the old PAC (block 2314). However, a PAC from the set of forbidden PACs (e.g., PACf) is sent over the CNI. In a fourteenth operation (14), the ACP sends a Radio Connection Setup to the UT. In a fifteenth operation (15), the UT sends a Radio Connection Setup Complete with an Attach Request to the ACP. In a sixteenth operation (16), the ACP sends an Initial UT Message for CNI logical connection establishment to the CNCP with the received Attach Request and the PACf. There is no default bearer in this case (block 2316). In a seventeenth operation (17), the CNCP finds the received PAC to be part of the forbidden PA set and therefore sends a DL CNCL Transport including an Attach Reject to the ACP. The Attach Reject includes an indication of the cause ("cause #12, PA not allowed"). In an eighteenth operation (18), the ACP sends a DL Information Transfer including the Attach Reject to the UT. The UT adds PACinv to its list of forbidden tracking areas for regional provision of service, and the procedure ends (block 2318). In a nineteenth operation (19), the connection is released.

The UT's CNCL does not attempt to reconnect until a designated event (trigger) occurs (block 2320). For example, the CNCL may wait until a new PAC is received. As another example, the CNCL may wait until the forbidden list is reset (e.g., when the UT is powered off, when the UT's subscriber information module is removed, or periodically).

VIII-B-2. Registered UT Moves into a Forbidden Area During IDLE

Figure 24A:
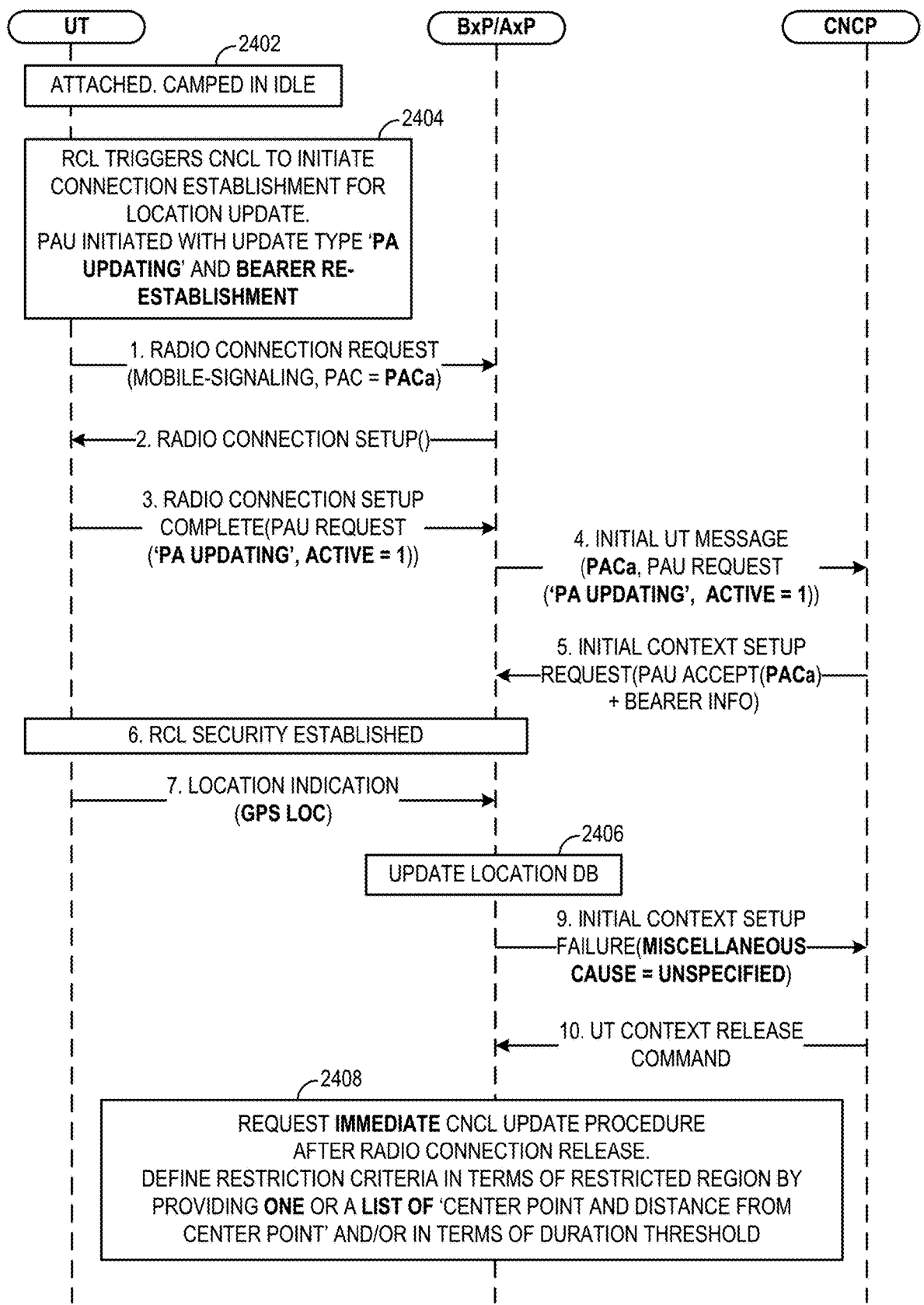
FIGS. 24A and 24B (collectively referred to as FIG. 24) are a flow diagram of a forbidden location handling process in accordance with some aspects of the disclosure.
Figure 24B:
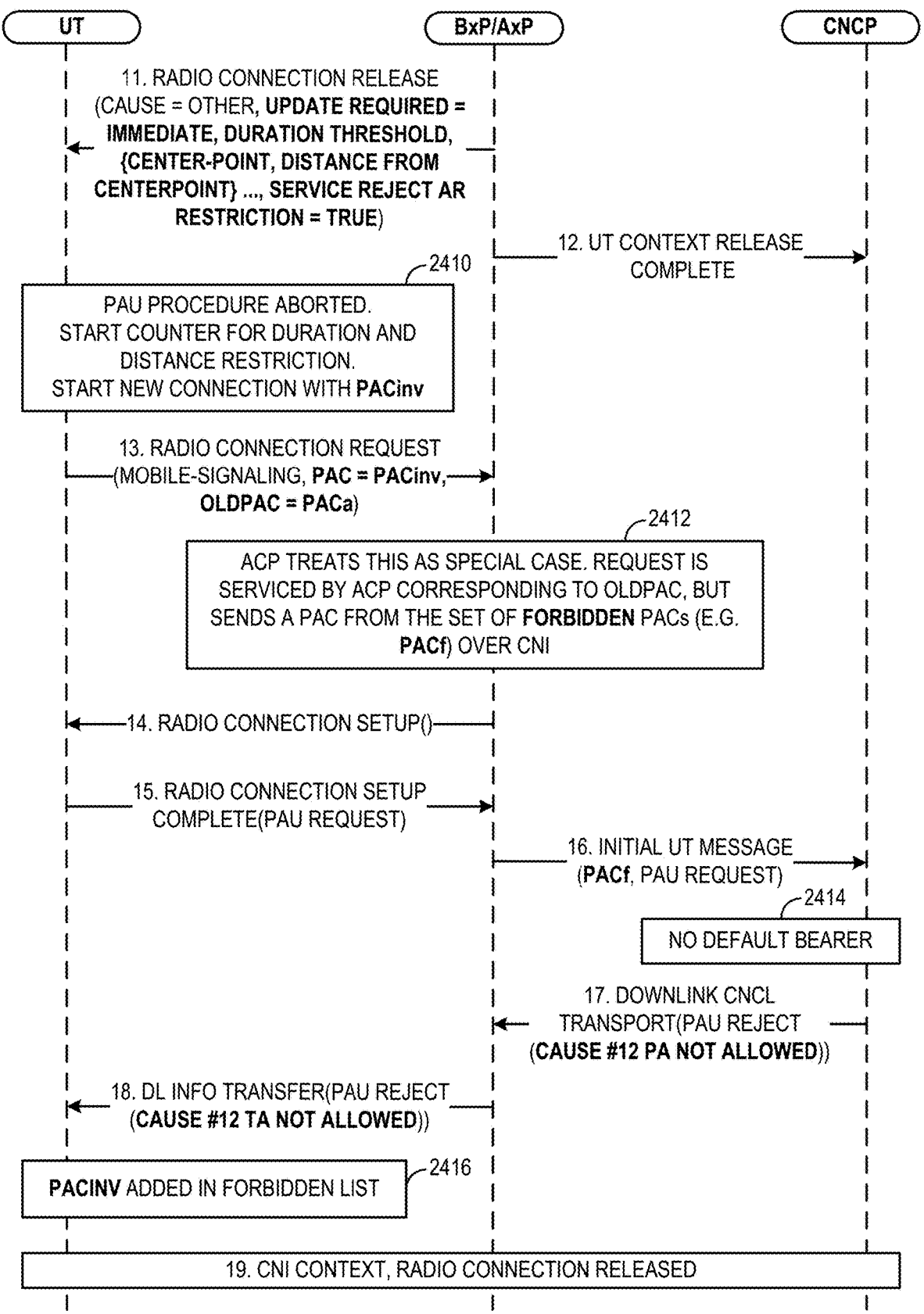

FIGS. 24A and 24B illustrate a message flow diagram for a procedure where a UT moves from a normal service area to a forbidden area while in IDLE mode and where an invalid PAC is used by a UT in accordance with some aspects of the disclosure. The message flow will be discussed in the context of a satellite communication system that includes a UT, a BxP, an AxP, and a CNCP.

Referring initially to FIG. 24A, a UT in Connection Management state IDLE is Attached/Updated and default bearers are established (block 2402). When the UT requires a connection for sending a UT location report, the UT's RCL send a new trigger to the UT's CNCL to initiate connection establishment for a location update (block 2404). The CNCL initiates a PAU Request with type "PA Updating" and an Active flag set as '1.' The message is integrity protected as discussed above.

In a first operation (1), the UT sends a Radio Connection Request that includes the assigned PAC (PACa) to the ACP. In a second operation (2), the ACP sends a Radio Connection Setup to the UT. In a third operation (3), the UT sends a Radio Connection Setup Complete with the PAU Request to the ACP. In a fourth operation (4), the ACP sends an Initial UT Message to the CNCP with the received PAU Request and the PAC value. The CNCP does an integrity check on the PAU Request as discussed above. In a fifth operation (5), the CNCP sends an Initial Context Setup Request including a PAU Accept to the AxP. In a sixth operation (6), the ACP activates Radio Connection Layer (RCL) security. The AxP waits for the UT's location information after activating RCL security.

In a seventh operation (7), the UT sends a Location Indication to the ACP after RCL security activation. The ACP updates a location database with the received UT location information (block 2406).

In a ninth operation (9), the ACP determines that the UT location falls under a forbidden area and sends an Initial Context Setup Failure to the CNCP. The Initial Context Setup Failure includes a Miscellaneous Cause value of "Unspecified." The CNCP initiates a connection release upon receiving this message with the mentioned cause value. Accordingly, in a tenth operation (10), the CNCP sends a UT Context Release Command to the ACP.

The ACP initiates a connection release forcing the UT to invalidate its assigned PAC and perform a PAU procedure after the connection release (block 2408). As discussed above, the ACP defines restriction criteria in terms of a restricted region. In an eleventh operation (11) and a twelfth operation (12), the ACP sends a Radio Connection Release to the UT and a UT Context Release Complete to the CNCP. As discussed above, the Radio Connection Release may include one or more of: service restriction information (e.g., a flag indicating service is restricted); an optional time duration-based restriction threshold, or an optional restricted area definition.

Upon receiving the Radio Connection Release, the UT aborts the PAU procedure, starts a counter for the duration and distance restriction, and starts a new connection with an invalid PAC (block 2410). In other words, once the connection release is completed, the UT starts using the invalid PAC (PACinv) and triggers a PAU procedure.

In a thirteenth operation (13) through a fifteenth operation (15), a Radio connection is initiated with PAC information including the old PAC (PACa) and the new PAC (PACinv). The ACP may do specific handling for the scenario where the oldPAC=the last updated PAC and the PAC=PACinv. For example, the UT may be serviced by the ACP that handled the oldPAC. In the thirteenth operation (13), the UT sends a Radio Connection Request with PACinv and PACa to the ACP.

The Request is serviced by the ACP corresponding to the old PAC (block 2412). However, a PAC from the set of forbidden PACs (e.g., PACf) is sent over the CNI. In a fourteenth operation (14), the ACP sends a Radio Connection Setup to the UT. In a fifteenth operation (15), the UT sends a Radio Connection Setup Complete with a PAU Request to the ACP. In a sixteenth operation (16), the ACP sends an Initial UT Message for CNI logical connection establishment to the CNCP with the received PAU Request and the PACf. There is no default bearer in this case (block 2414). In a seventeenth operation (17), the CNCP finds the received PAC to be part of the forbidden PA set and therefore sends a DL CNCL Transport including a PAU Reject to the ACP. The Attach Reject includes an indication of the cause ("cause #12, PA not allowed"). In an eighteenth operation (18), the ACP sends a DL Information Transfer including the PAU Reject to the UT. The UT adds PACinv to its list of forbidden tracking areas for regional provision of service, and the procedure ends (block 2416). In a nineteenth operation (19), the connection is released.

VIII-B-3. Registered UT Moves into a Forbidden Area During CONNECTED

Figure 25A:
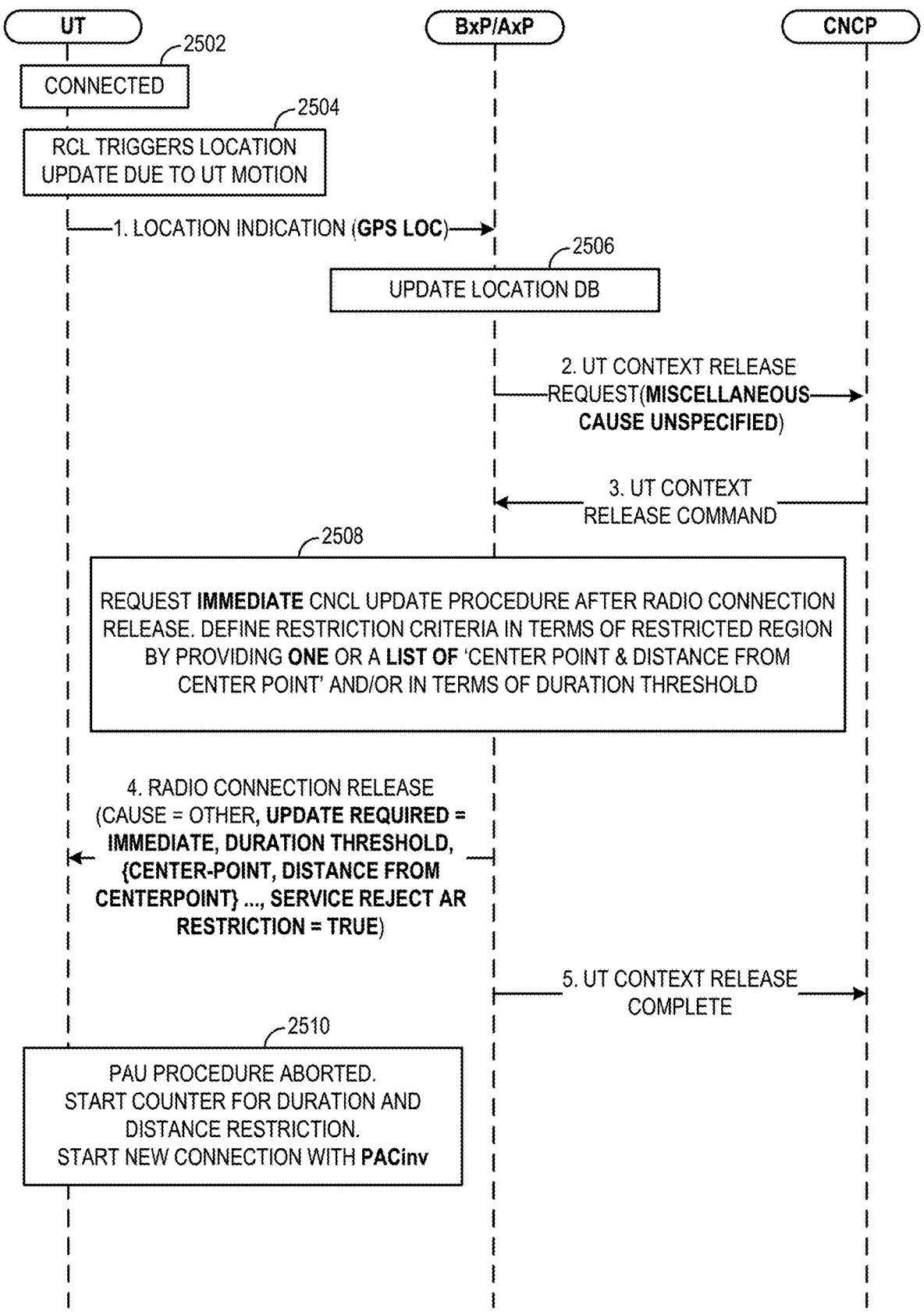
FIGS. 25A and 25B (collectively referred to as FIG. 25) are a flow diagram of an example process where a UT in connected mode moves into a forbidden area in accordance with some aspects of the disclosure.
Figure 25B:
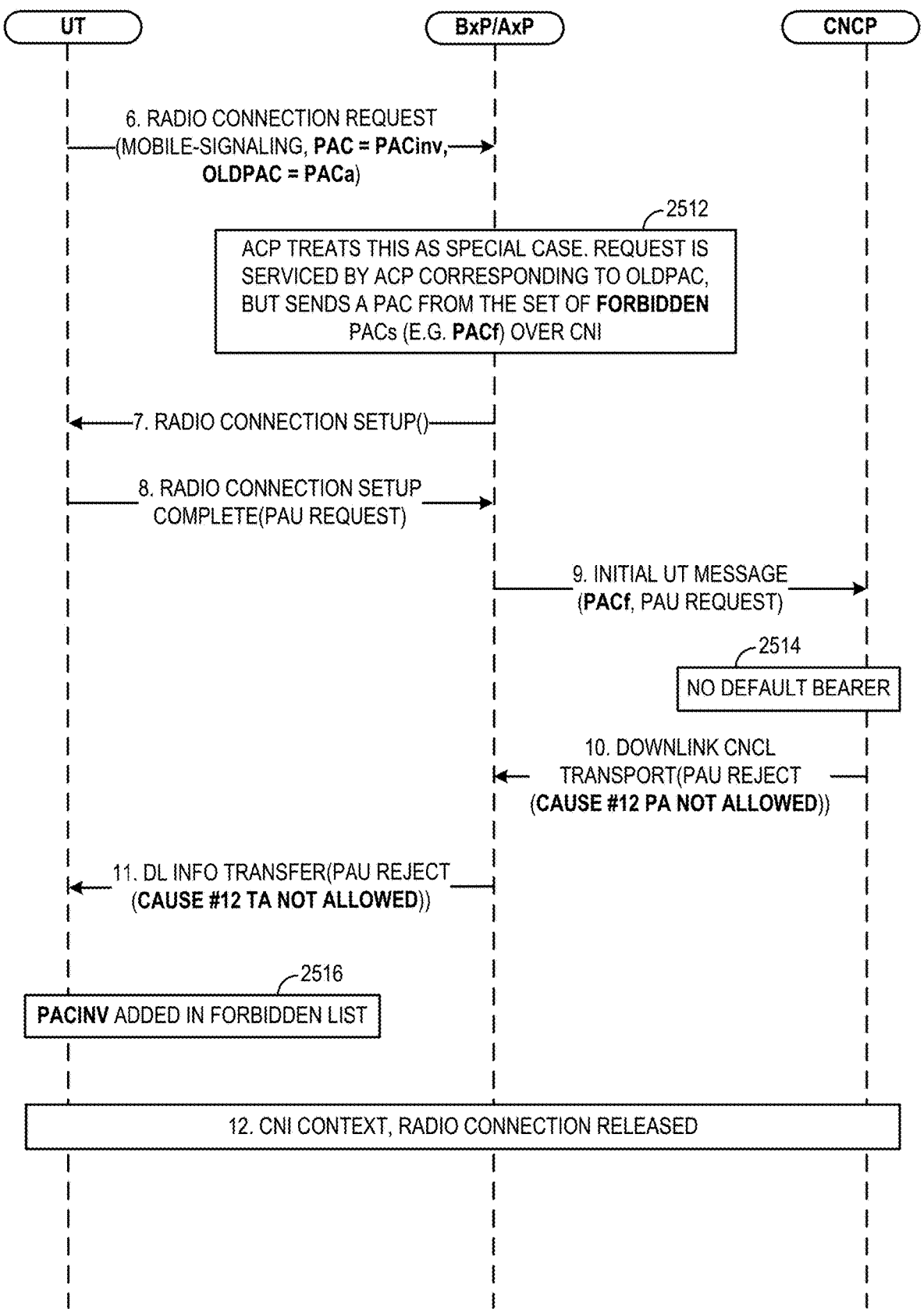

FIGS. 25A and 25B illustrate a message flow diagram for a procedure where a UT moves from a normal service area to a forbidden area while in CONNECTED mode and where a forbidden PAC is assigned to a UT in accordance with some aspects of the disclosure. The message flow will be discussed in the context of a satellite communication system that includes a UT, a BxP, an AxP, and a CNCP.

Referring initially to FIG. 25A, the UT is in Connection Management state CONNECTED with active data bearers (block 2502). The UT reports location information based on a Location Change Threshold defined at the time of Radio Connection setup. Thus, at some point in time, the UT's RCL triggers a location update due to motion of the UT (block 2504). Accordingly, in a first operation (1), the UT sends a Location Indication to the ACP.

The remaining operations of FIGS. 25A and 25B are similar to corresponding operations of FIGS. 24A and 24B discussed above. Specifically, blocks 2506, 2508, 2510, 2512, 2514, 2516, and 2518 correspond to blocks 2406, 2408, 2410, 2412, 2414, 2416, and 2418, respectively. In addition, the second though twelfth operations of FIGS. 25A and 25B correspond to the eighth through nineteenth operations of FIGS. 24A and 24B, respectively.

VIII-C. UT Service Recovery after Restriction Lapse

Figure 26A:
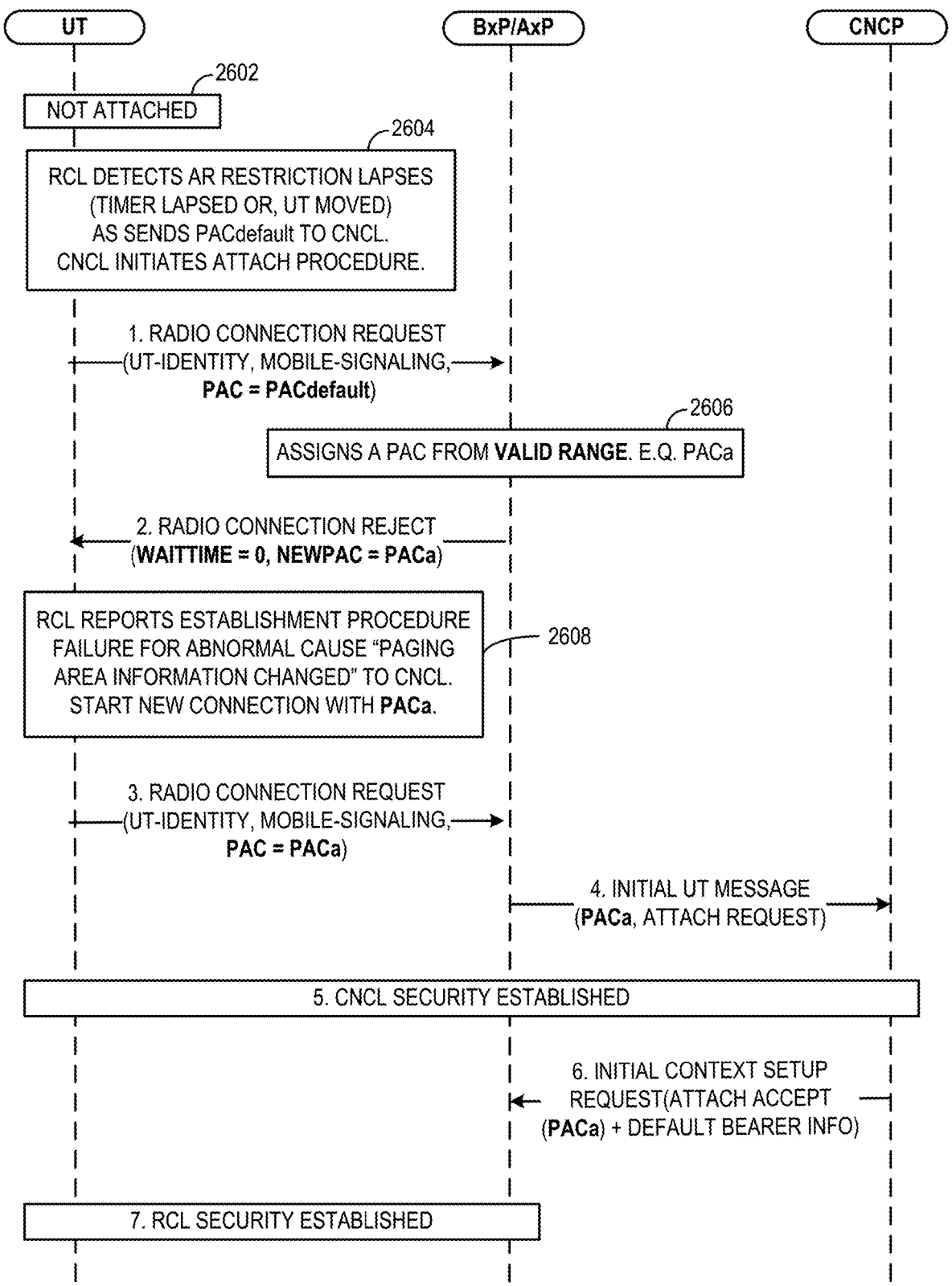
FIGS. 26A and 26B (collectively referred to as FIG. 26) are a flow diagram of an example process where a UT reattempts service after a lapse in restriction in accordance with some aspects of the disclosure.
Figure 26B:
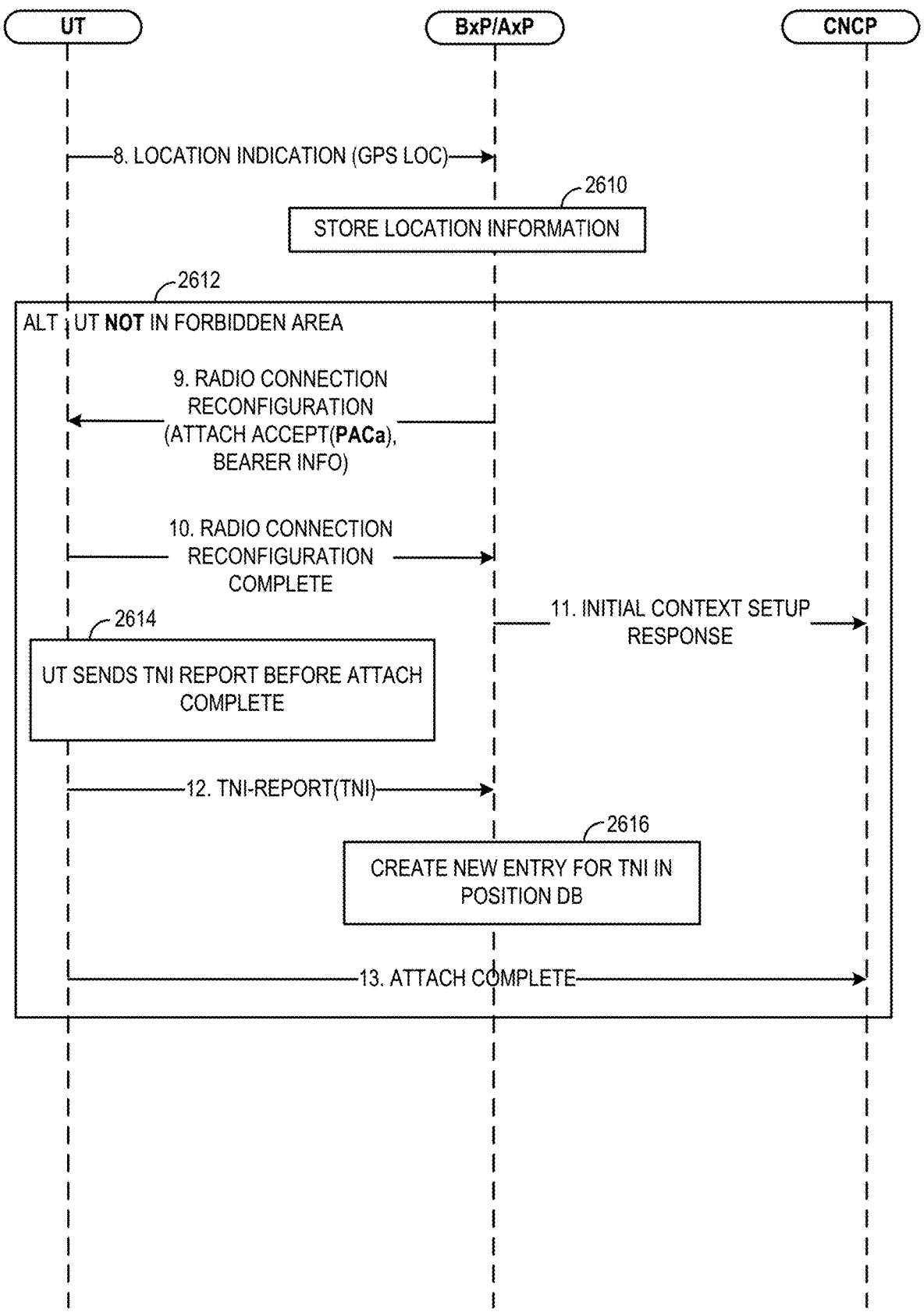

FIGS. 26A and 26B illustrate a message flow diagram for a procedure where a UT invokes a reattempt for service after a lapse of a restriction in accordance with some aspects of the disclosure. The message flow will be discussed in the context of a satellite communication system that includes a UT, a BxP, an AxP, and a CNCP.

With reference to FIGS. 26A and 26B, at a first operation (1), the UT is in idle mode and de-registered. In addition, a service restriction based on distance and/or duration is ongoing.

At some point in time, the UT's RCL determines whether the service restriction has lapsed. For example, a restriction timer may have lapsed or the UT may have moved. If the UT is camping on a cell and the service restriction has lapsed, the UT uses PACdefault to initiate CNCL mobility procedures (block 2604). In this case, the RCL sends PACdefault to the CNCL and the CNCL initiates an Attach procedure. Otherwise, if the "forbidden paging areas for regional provision of service" list is reset, the UT may perform a cell selection to look for suitable candidate cell/beam.

In a first operation (1), the UT uses PACdefault to initiate CNCL mobility procedures. Specifically, the UT initiates a Radio connection by sending a Radio Connection Request including PACdefault to the BxP/AxP. Upon receiving the Radio Connection Request, at block 2606, the ACP serving the UT assigns a PAC from the valid range of PACs (designated PACa in this example).

At a second operation (2), the ACP sends the assigned PAC to the UT in a Radio Connection Reject. The PAC value is maintained in UT context.

The Attach procedure is aborted due to the change in PA information (block 2608). The UT's RCL reports the failure of the connection establishment procedure to the UT's CNCL. The failure being indicated as result of a cause "PA information changed." A new Radio connection is initiated with the assigned PAC. At a third operation (3), the UT sends a Radio Connection Request that includes the assigned PAC.

At a fourth operation (4), the ACP sends an Initial UT Message to the Core Network Control Plane (CNCP) for a Core Network Interface logical connection establishment with the received Attach Request and the assigned PAC value. In a fifth operation (5) through a seventh operation (7), UT context is established between the ACP and the CNCP. CNCL Security is activated in the fifth operation (5). The CNCP sends an Initial Context Setup Request including an Attach Accept to the ACP in the sixth operation (6). The Attach Accept includes the same PAC (the PAC received in the Initial UT Message). In the seventh operation (7), the ACP activates Radio Connection Layer (RCL) security.

The ACP then waits for the UT's geographic location. In an eighth operation (8), the UT sends a Location Indication following the RCL security activation. The ACP stores the received UT location information (block 2610).

The ACP determines that the UT location does not fall under any forbidden area (block 2612). The ACP thus assigns a new PAC (PACa) for the UT and sends the new PAC using a reconfiguration procedure. To this end, in a ninth operation (9), the ACP sends a Radio Connection Reconfiguration to the UT. The Radio Connection Reconfiguration includes an Attach Accept with the assigned PAC.

In a ninth operation (9), if the ACP determines that the UT location does not fall under any forbidden area (block 2612), a connection reconfiguration may be initiated setting up Radio Signaling Paths (e.g., RSP2) and Radio Data Paths (RDPs). The Radio Connection Reconfiguration includes an Attach Accept with the assigned PAC. The UT's CNCL gets the PAI information in the Attach Accept. The CNCL stores the received PAC and compares it against the last PAC (in this case PACdefault) to determine the next action. The CNCL may use Table 1 for this purpose as discussed above. In a tenth operation (10), the UT sends a Radio Connection Reconfiguration Complete to the ACP. In an eleventh operation (11), the ACP sends an Initial Context Setup Response to the CNCP.

The UT sends a Temporary Network Identifier (TNI) report before sending an Attach Complete message (block 2614). Thus, in a twelfth operation (12), the UT sends a TNI-Report including the new TNI to the ACP. Upon receiving this information, the ACP creates a new entry for the TNI in a Position Database (block 2616). At a thirteenth operation (13), the UT sends an Attach Complete to the CNCP and the procedure ends.

If the UT location did fall under a forbidden area, the procedures discussed above in conjunction with FIG. 20 or FIG. 23 may be followed.

IX. Detailed Examples for Efficient Connection Release

The disclosure relates in some aspects to techniques that facilitate an efficient release of a connection. In some aspects, these techniques may be used to address Issue #4 discussed above.

Such a technique may be used for efficiently releasing a radio connection in scenarios where a connection and bearers are established for RCL-specific procedures and the UT does not have any user data to send (e.g., a UT location report, a unicast request, a unicast response, etc.). The UT may initiate release of a Radio connection by sending a notification (via a known message or a new message) to the ACP after the completion of the procedure for which a signaling connection was established.

Figure 27A:
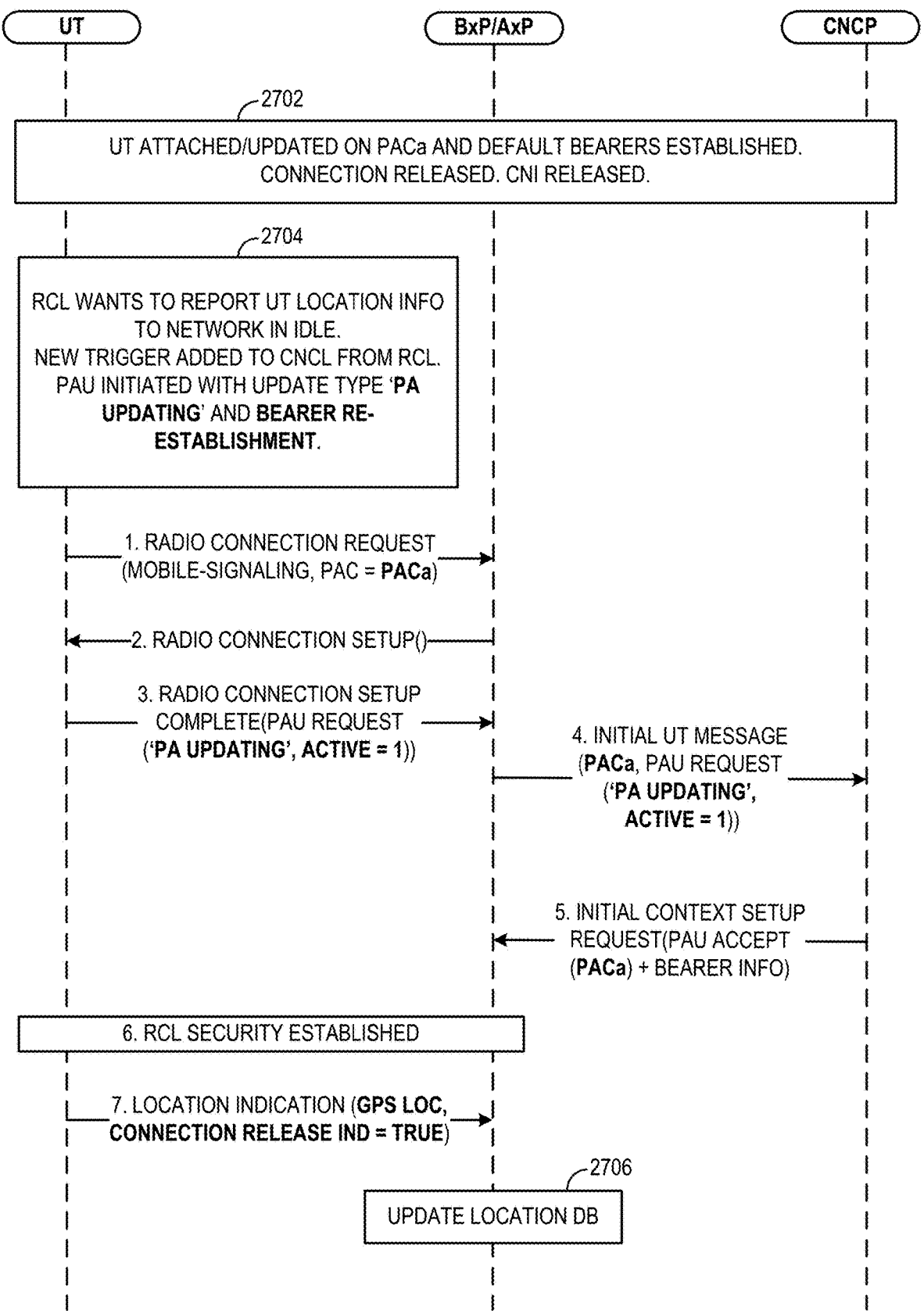
FIGS. 27A and 27B (collectively referred to as FIG. 27) are a flow diagram of an example connection establishment process in accordance with some aspects of the disclosure.
Figure 27B:
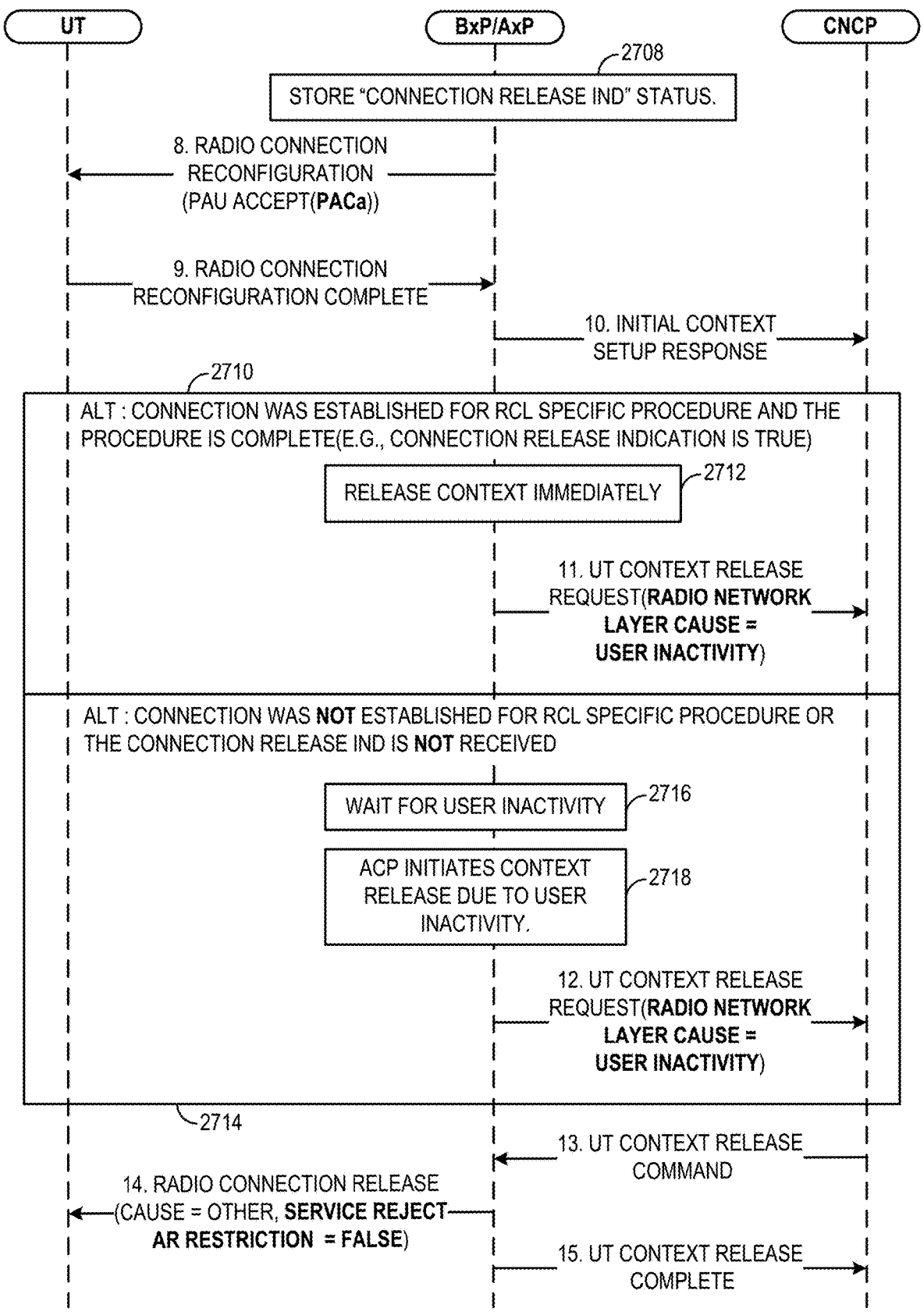

IX-A. UT Requests Connection Release with Additional Parameter in Last UL Signal FIGS. 27A and 27B illustrate a message flow diagram for a procedure where a UT sends a location indication message that includes a request for a connection release in accordance with some aspects of the disclosure. The message flow will be discussed in the context of a satellite communication system that includes a UT, a BxP, an AxP, and a CNCP.

Initially (block 2702), the UT is attach or updated with PACa. In addition, default bearers (paths) are established. The UT is in Connection Management (CM) state IDLE and the CNI is released. When the UT's RCL requires a connection for sending a UT location report, a unicast request, or a unicast response, the RCL sends a new trigger to the UT's CNCL (block 2702). The CNCL initiates a PAU Request with type 'PA Updating' and an Active flag set as '1'. The message is integrity protected as discussed herein.

In a first operation (1), the UT sends a Radio Connection Request that includes the assigned PAC (PACa) to the ACP. In a second operation (2), the ACP sends a Radio Connection Setup to the UT. In a third operation (3), the UT sends a Radio Connection Setup Complete with a PAU Request to the ACP. In a fourth operation (4), the ACP sends an Initial UT Message to the CNCP with the PAU Request and the PAC value. The CNCP does an integrity check on the PAU Request as discussed above. In a fifth operation (5), the CNCP sends an Initial Context Setup Request including a PAU Accept to the AxP. In a sixth operation (6), the ACP activates Radio Connection Layer (RCL) security. The AxP waits for the UT's location information after activating RCL security.

In a seventh operation (7), the UT sends a Location Indication to the ACP after RCL security activation. The Location Indication includes a Connection Release Indication set to TRUE, thereby indicating that the UT is to be released from the connection once the procedure for which the connection was established has ended.

The ACP updates a location database with the received UT location information (block 2706). In addition, the ACP stores the Connection Release Indication status (block 2708).

If the ACP determines that the UT location does not fall under any forbidden area, the ACP completes the Initial Context Setup procedure. In an eighth operation (8), the ACP sends a Radio Connection Reconfiguration with a PAU Accept to the UT. In a ninth operation (9), the UT sends a Radio Connection Reconfiguration Complete to the ACP. In a tenth operation (10), the ACP sends an Initial Context Setup Response to the CNCP.

If, at block 2710, the connection was established for an RCL-specific procedure and the procedure has completed (e.g., the Connection Release Indication is set as TRUE), the AxP initiates a context release request to CNCP immediately after the tenth operation (block 2712). Accordingly, at an eleventh operation (11), the ACP sends a UT Context Release Request to the CNCP. The UT Context Release Request include a Radio Network Layer cause of "User Inactivity."

Otherwise, if the connection was not established for an RCL-specific procedure or the procedure has not completed (e.g., the Connection Release Indication is not set as TRUE or was not received), the AxP may track user activity and when criteria for user inactivity is met, the AxP may request the CNCP to initiate a context release (block 2714). Accordingly, the ACP may wait for user inactivity (block 2716) and then initiates a context release due to user inactivity (block 2718). Accordingly, at a twelfth operation (12), the ACP sends a UT Context Release Request to the CNCP, including a Radio Network Layer cause of "User Inactivity."

The CNCP may follow up with UT Context Release Command to break Radio connection. At a thirteenth operation (13), the CNCP sends a UT Context Release Command to the ACP. At a fourteenth operation (14) and a fifteenth operation (15), the ACP sends a Radio Connection Release to the UT and a UT Context Release Complete to the CNCP. The above operations thus release a Radio connection when the purpose of signaling establishment is met.

IX-B. UT Requests Connection Release with a New Radio Signal

Figure 28A:
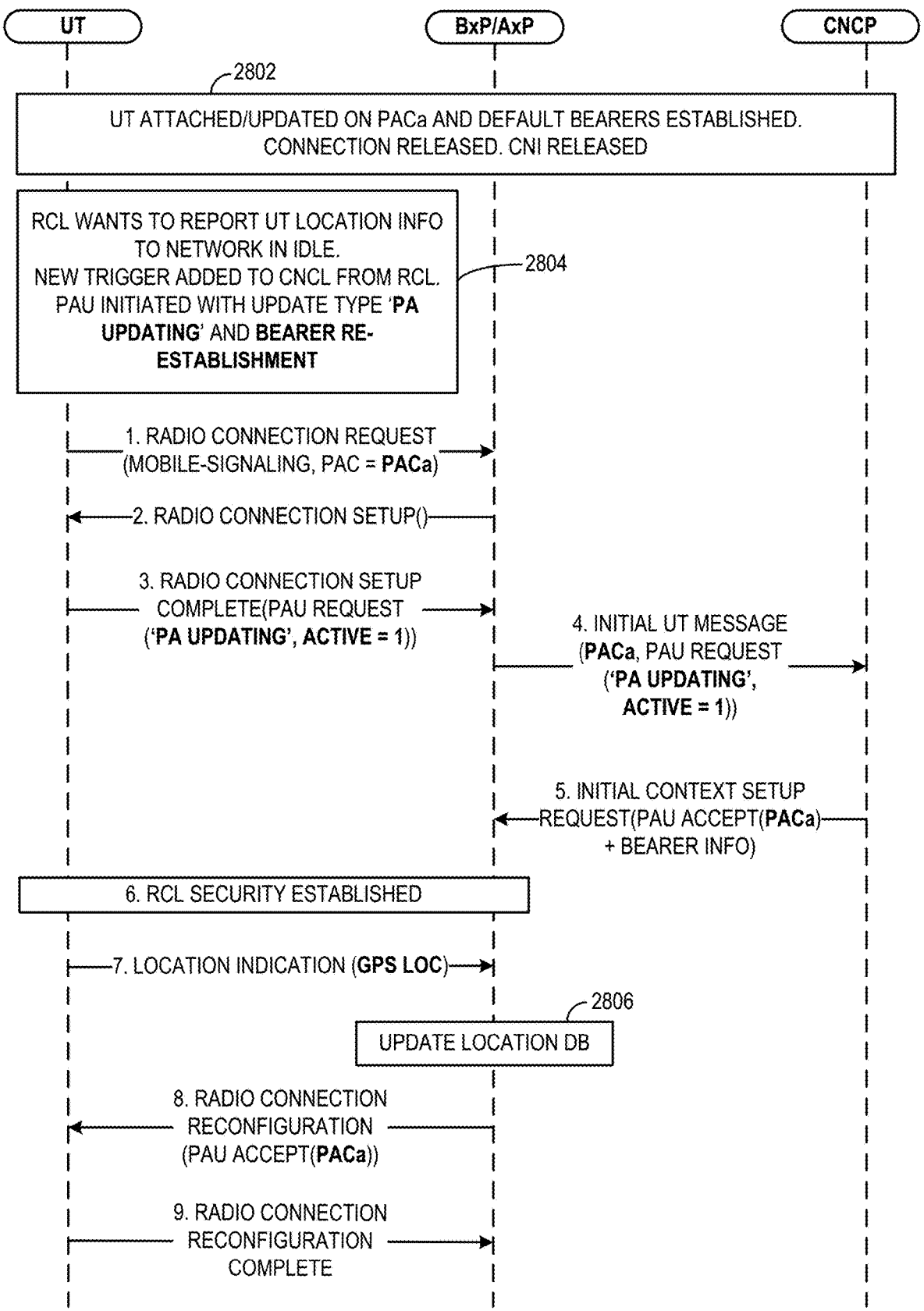
FIGS. 28A and 28B (collectively referred to as FIG. 28) are a flow diagram of an example connection establishment process in accordance with some aspects of the disclosure.
Figure 28B:
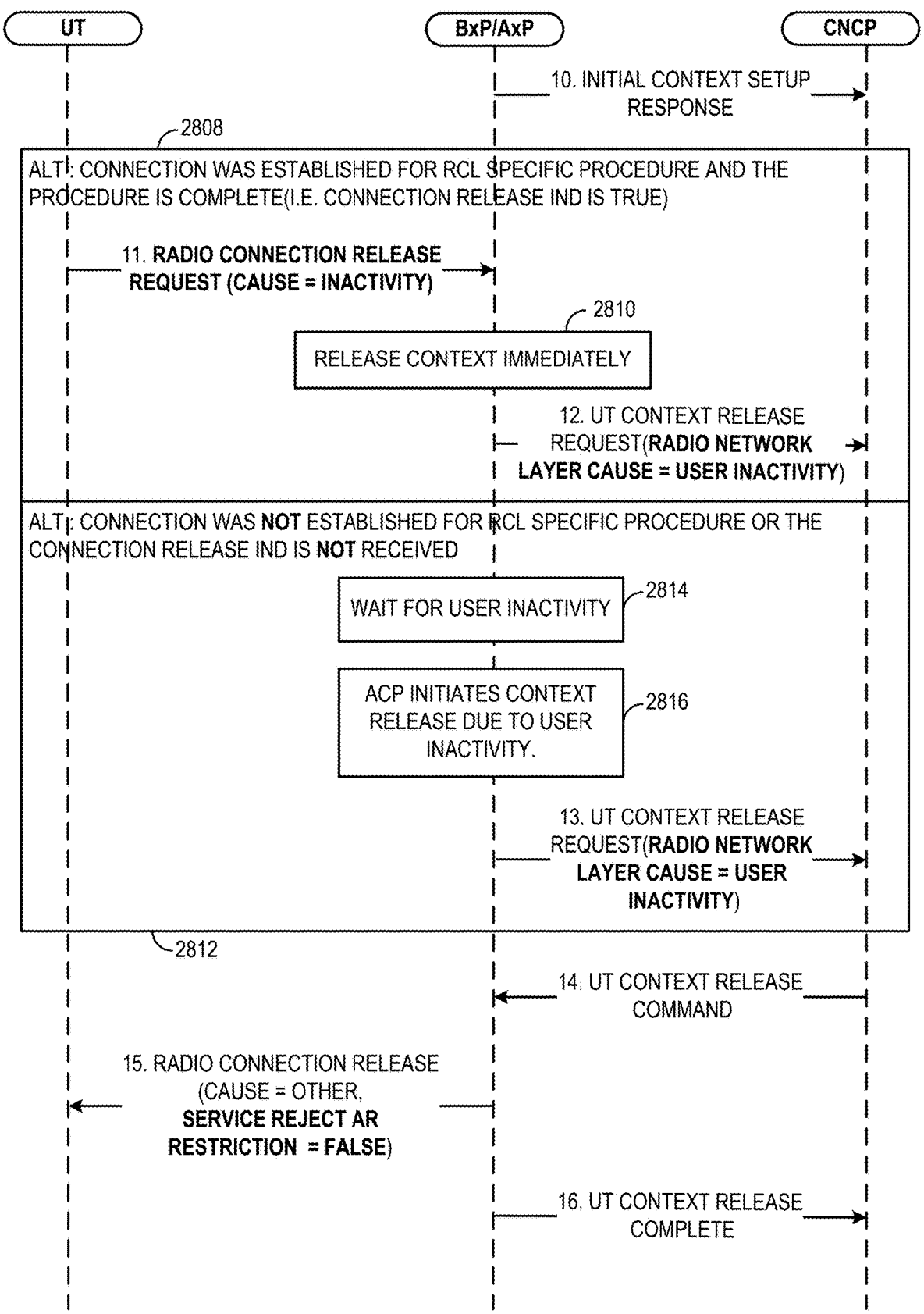

FIGS. 28A and 28B illustrate a message flow diagram for a procedure where a UT requests a connection release (e.g., via a new Radio signal) with after a procedure (e.g., an RCL procedure) is over in accordance with some aspects of the disclosure. The message flow will be discussed in the context of a satellite communication system that includes a UT, a BxP, an AxP, and a CNCP.

Initially, the UT is attach or updated with PACa (block 2802). In addition, default bearers (paths) are established. The UT is in Connection Management (CM) state IDLE and the CNI is released. When the UT's RCL requires a connection for sending a UT location report, a unicast request, or a unicast response, the RCL sends a new trigger to the UT's CNCL (block 2804). The CNCL initiates a PAU Request with type 'PA Updating' and an Active flag set as '1'. The message is integrity protected as discussed herein.

In a first operation (1), the UT sends a Radio Connection Request that includes the assigned PAC (PACa) to the ACP. In a second operation (2), the ACP sends a Radio Connection Setup to the UT. In a third operation (3), the UT sends a Radio Connection Setup Complete with a PAU Request to the ACP. In a fourth operation (4), the ACP sends an Initial UT Message to the CNCP with the PAU Request and the PAC value. The CNCP does an integrity check on the PAU Request as discussed above. In a fifth operation (5), the CNCP sends an Initial Context Setup Request including a PAU Accept to the AxP. In a sixth operation (6), the ACP activates Radio Connection Layer (RCL) security. The AxP waits for the UT's location information after activating RCL security.

In a seventh operation (7), the UT sends a Location Indication to the ACP after RCL security activation. The ACP updates a location database with the received UT location information (block 2806).

If the ACP determines that the UT location does not fall under any forbidden area, the ACP completes the Initial Context Setup procedure. In an eighth operation (8), the ACP sends a Radio Connection Reconfiguration with a PAU Accept to the UT. In a ninth operation (9), the UT sends a Radio Connection Reconfiguration Complete to the ACP. In a tenth operation (10), the ACP sends an Initial Context Setup Response to the CNCP.

If the connection was established for an RCL-specific procedure and the procedure has completed, the AxP proceeds to immediately release the context (block 2808). In this case, at an eleventh operation (11), the ACP receives a Radio Connection Release Request from the UT. In response, the ACP takes action to release the context immediately (block 2810). Thus, at a twelfth operation (12), the ACP sends a UT Context Release Request to the CNCP. The UT Context Release Request include a Radio Network Layer cause of "User Inactivity."

Otherwise, if the connection was not established for an RCL-specific procedure or the procedure has not completed (e.g., the Radio Connection Release Request was not received), the AxP may track user activity and when criteria for user inactivity is met, the AxP may request the CNCP to initiate a context release (block 2814). Accordingly, the ACP may wait for user inactivity (block 2816) and then initiates a context release due to user inactivity (block 2818). Accordingly, at a thirteenth operation (13), the ACP sends a UT Context Release Request to the CNCP, including a Radio Network Layer cause of "User Inactivity."

The CNCP may follow up with UT Context Release Command to break the Radio connection. At a fourteenth operation (14), the CNCP sends a UT Context Release Command to the ACP. At a fifteenth operation (15) and a sixteenth operation (16), the ACP sends a Radio Connection Release to the UT and a UT Context Release Complete to the CNCP. The above operations thus release a Radio connection when the purpose of signaling establishment is met.

X. Detailed Example for UT Location Reporting

Figure 29:
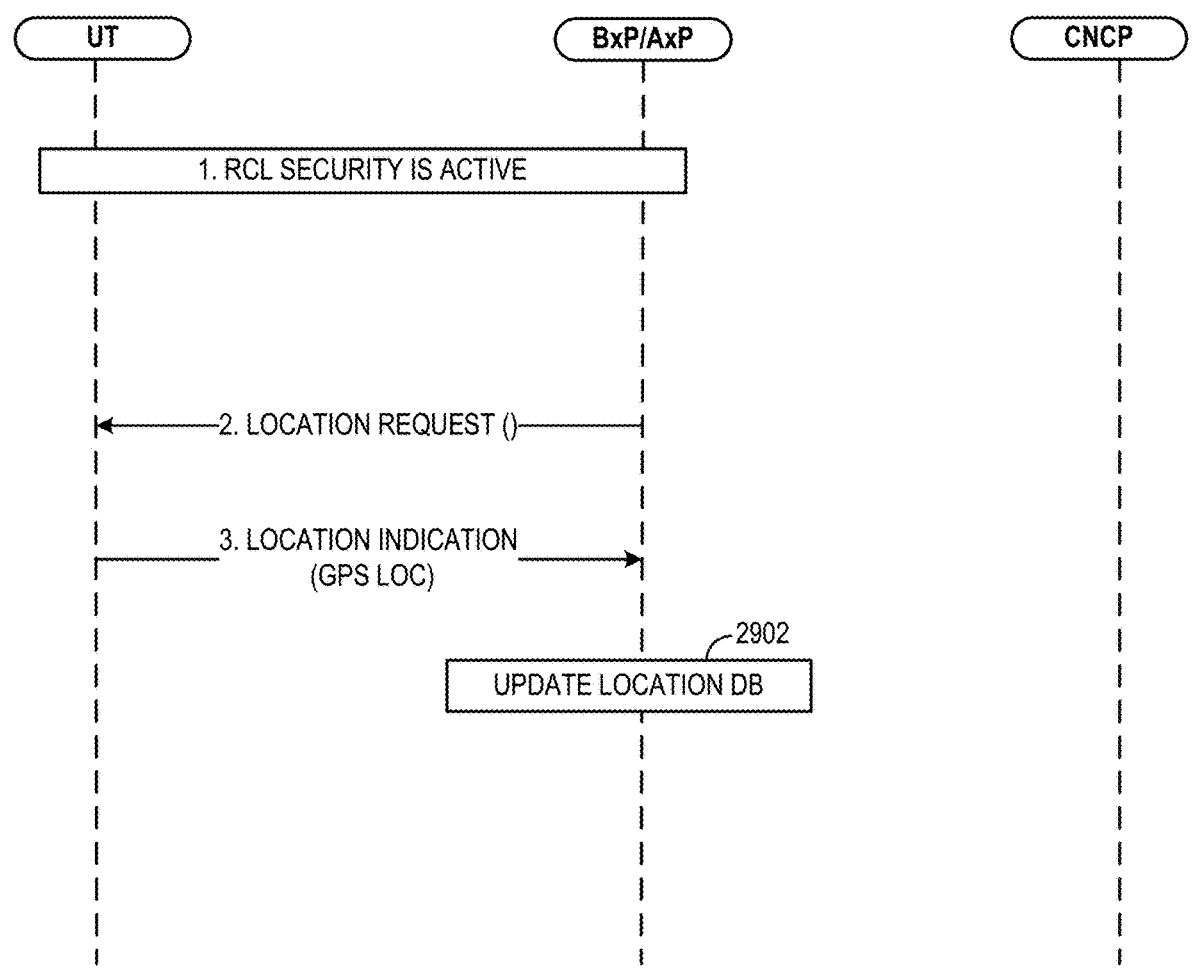
FIG. 29 is a flow diagram of an example location reporting process in accordance with some aspects of the disclosure.

FIG. 29 illustrates a message flow diagram for a procedure where a network initiates UT location reporting in accordance with some aspects of the disclosure. In some aspects, these techniques may be used to address Issue #5 discussed above. The message flow will be discussed in the context of a satellite communication system that includes a UT, a BxP, an AxP, and a CNCP.

The procedure shown in FIG. 29 can be used, for example, whenever the ACP requires the UT's current GPS location. The ACP initiates the procedure by sending a Location Request. The UT may report its latest location to ACP in a Location Indication message. This procedure may be used independent of threshold-based UT location reporting.

In a first operation (1), RCL security is active.

At some point in time, in a second operation (2), the AxP sends a Location Request to the UT. For example, the AxP may run a guard timer whereby, on expiry, the AxP sends a Location Request or a Release Radio Connection message.

In a third operation (3), the UT sends a Location Indication to the AxP. The Location Indication includes the GPS location of the UT or some other suitable indication of the UT's location. The AxP then updates a location database with the UT's location information (block 2902).

XI. Detailed Example for Reconfiguring a Reporting Threshold

Figure 30:
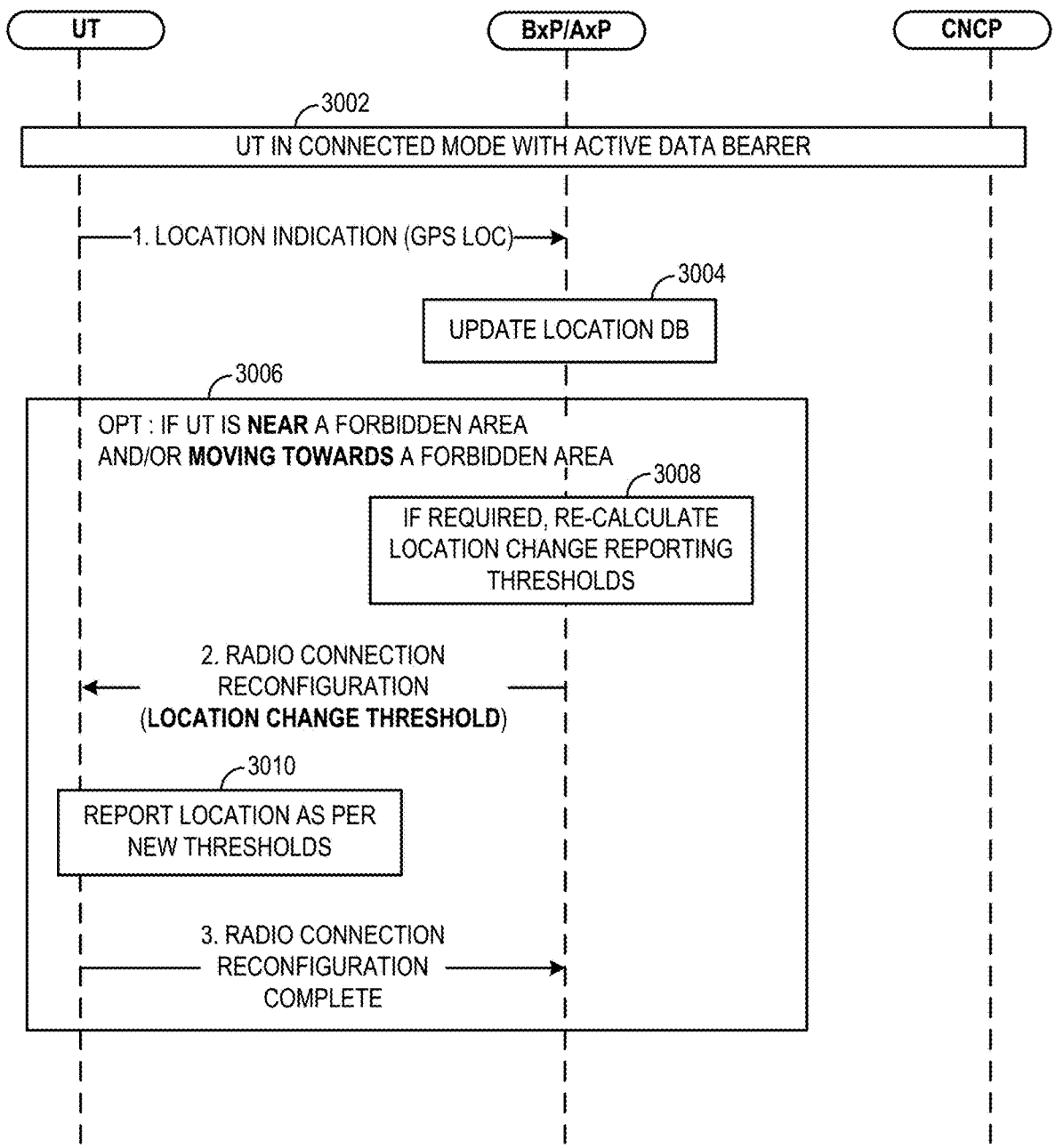
FIG. 30 is a flow diagram of an example threshold reconfiguration process in accordance with some aspects of the disclosure.

FIG. 30 illustrates a message flow diagram for a procedure where network sends a location reporting threshold to a UT in accordance with some aspects of the disclosure. In some aspects, these techniques may be used to address Issue #6 discussed above. The message flow will be discussed in the context of a satellite communication system that includes a UT, a BxP, an AxP, and a CNCP.

Initially, the UT is in connected mode with active data bearers (block 3002). In a first operation (1), the UT reports it location information by sending a Location Indication to the ACP. This reporting is based on a Location Change Threshold defined, for example, at the time of Radio connection setup.

Upon reception of the UT location information, the ACP updates a location database with the location information (block 3004).

If the ACP determines that the UT location does not fall under any forbidden area, the ACP can evaluate the UT's probability of entering any nearby forbidden area (block 3006). If the probability is significant, at block 3008, the ACP may recalculate one or more location change reporting thresholds (e.g., reduce a distance threshold and/or a duration threshold to the increase frequency of location reporting). Any newly set restriction thresholds (Location Change Threshold) are communicated to UT via a Radio Connection Reconfiguration message in a first operation (1). The UT then reports its location using the new threshold or thresholds (block 3010). At a third operation (3), the UT sends a Radio Connection Reconfiguration Complete to the ACP.

XII. Example Apparatuses and Processes

Several examples of apparatuses and processes that may be implemented in accordance with the teachings herein follow. It should be appreciated that other apparatuses and processes may be used in other examples.

First Example Apparatus

Figure 31:
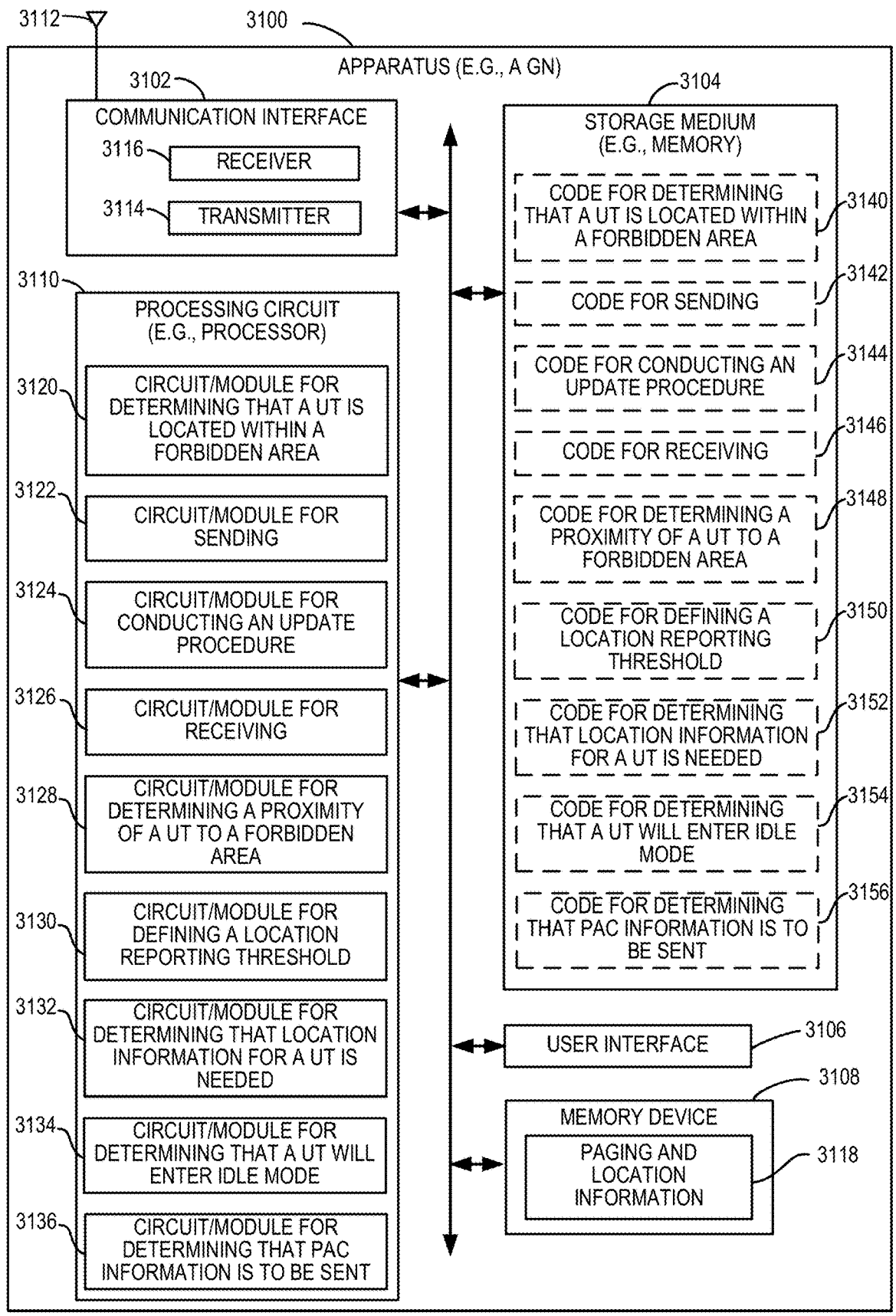
FIG. 31 is a block diagram illustrating an example hardware implementation for an apparatus (e.g., an electronic device) that can support communication in accordance with some aspects of the disclosure.

FIG. 31 illustrates a block diagram of an example hardware implementation of an apparatus 3100 configured to communicate according to one or more aspects of the disclosure. For example, the apparatus 3100 could embody or be implemented within a GN, or some other type of device that supports satellite communication. In various implementations, the apparatus 3100 could embody or be implemented within a gateway, a ground station, a satellite ground network, a vehicular component, or any other electronic device having circuitry.

The apparatus 3100 includes a communication interface 3102 (e.g., at least one transceiver), a storage medium 3104, a user interface 3106, a memory device (e.g., a memory circuit) 3108, and a processing circuit 3110 (e.g., at least one processor). In various implementations, the user interface 3106 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 31. The signaling bus may include any number of interconnecting buses and bridges depending on the specific application of the processing circuit 3110 and the overall design constraints. The signaling bus links together various circuits such that each of the communication interface 3102, the storage medium 3104, the user interface 3106, and the memory device 3108 are coupled to and/or in electrical communication with the processing circuit 3110. The signaling bus may also link various other circuits (not shown) such as timing sources, peripherals, voltage regulators, and power management circuits, which are well known in the art, and therefore, will not be described any further.

The communication interface 3102 provides a means for communicating with other apparatuses over a transmission medium. In some implementations, the communication interface 3102 includes circuitry and/or programming adapted to facilitate the communication of information bi-directionally with respect to one or more communication devices in a network. In some implementations, the communication interface 3102 is adapted to facilitate wireless communication of the apparatus 3100. In these implementations, the communication interface 3102 may be coupled to one or more antennas 3112 as shown in FIG. 31 for wireless communication within a wireless communication system. The communication interface 3102 can be configured with one or more standalone receivers and/or transmitters, as well as one or more transceivers. In the illustrated example, the communication interface 3102 includes a transmitter 3114 and a receiver 3116. The communication interface 3102 serves as one example of a means for receiving and/or means transmitting.

The memory device 3108 may represent one or more memory devices. As indicated, the memory device 3108 may maintain paging and location information 3118 along with other information used by the apparatus 3100. In some implementations, the memory device 3108 and the storage medium 3104 are implemented as a common memory component. The memory device 3108 may also be used for storing data that is manipulated by the processing circuit 3110 or some other component of the apparatus 3100.

The storage medium 3104 may represent one or more computer-readable, machine-readable, and/or processor-readable devices for storing programming, such as processor executable code or instructions (e.g., software, firmware), electronic data, databases, or other digital information. The storage medium 3104 may also be used for storing data that is manipulated by the processing circuit 3110 when executing programming. The storage medium 3104 may be any available media that can be accessed by a general purpose or special purpose processor, including portable or fixed storage devices, optical storage devices, and various other mediums capable of storing, containing or carrying programming.

By way of example and not limitation, the storage medium 3104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 3104 may be embodied in an article of manufacture (e.g., a computer program product). By way of example, a computer program product may include a computer-readable medium in packaging materials. In view of the above, in some implementations, the storage medium 3104 may be a non-transitory (e.g., tangible) storage medium.

The storage medium 3104 may be coupled to the processing circuit 3110 such that the processing circuit 3110 can read information from, and write information to, the storage medium 3104. That is, the storage medium 3104 can be coupled to the processing circuit 3110 so that the storage medium 3104 is at least accessible by the processing circuit 3110, including examples where at least one storage medium is integral to the processing circuit 3110 and/or examples where at least one storage medium is separate from the processing circuit 3110 (e.g., resident in the apparatus 3100, external to the apparatus 3100, distributed across multiple entities, etc.).

Programming stored by the storage medium 3104, when executed by the processing circuit 3110, causes the processing circuit 3110 to perform one or more of the various functions and/or process operations described herein. For example, the storage medium 3104 may include operations configured for regulating operations at one or more hardware blocks of the processing circuit 3110, as well as to utilize the communication interface 3102 for wireless communication utilizing their respective communication protocols. In some aspects, the storage medium 3104 may include computer-readable medium storing computer-executable code, including code to perform the functionality described herein.

The processing circuit 3110 is generally adapted for processing, including the execution of such programming stored on the storage medium 3104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 3110 is arranged to obtain, process and/or send data, control data access and storage, issue commands, and control other desired operations. The processing circuit 3110 may include circuitry configured to implement desired programming provided by appropriate media in at least one example. For example, the processing circuit 3110 may be implemented as one or more processors, one or more controllers, and/or other structure configured to execute executable programming Examples of the processing circuit 3110 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 3110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 3110 are for illustration and other suitable configurations within the scope of the disclosure are also contemplated.

According to one or more aspects of the disclosure, the processing circuit 3110 may be adapted to perform any or all of the features, processes, functions, operations and/or routines for any or all of the apparatuses described herein. For example, the processing circuit 3110 may be configured to perform any of the steps, functions, and/or processes described with respect to FIGS. 1-30 and 32-34. As used herein, the term "adapted" in relation to the processing circuit 3110 may refer to the processing circuit 3110 being one or more of configured, used, implemented, and/or programmed to perform a particular process, function, operation and/or routine according to various features described herein.

The processing circuit 3110 may be a specialized processor, such as an application-specific integrated circuit (ASIC) that serves as a means for (e.g., structure for) carrying out any one of the operations described in conjunction with FIGS. 1-30 and 32-34. The processing circuit 3110 serves as one example of a means for transmitting and/or a means for receiving. In some implementations, the processing circuit 3110 incorporates the functionality of the GN controller 250 of FIG. 2.

According to at least one example of the apparatus 3100, the processing circuit 3110 may include one or more of a circuit/module for determining that a UT is located in a forbidden area 3120, a circuit/module for sending 3122, a circuit/module for conducting an update procedure 3124, a circuit/module for receiving 3126, a circuit/module for determining a proximity of a UT to a forbidden area 3128, a circuit/module for defining a location reporting threshold 3130, a circuit/module for determining that location information for a UT is needed 3132, a circuit/module for determining that a UT will enter idle mode 3134, or a circuit/module for determining that PAC information is to be sent 3136.

As mentioned above, programming stored by the storage medium 3104, when executed by the processing circuit 3110, causes the processing circuit 3110 to perform one or more of the various functions and/or process operations described herein. For example, the programming, when executed by the processing circuit 3110, may cause the processing circuit 3110 to perform the various functions, steps, and/or processes described herein with respect to FIGS. 1-30 and 32-34 in various implementations. As shown in FIG. 31, the storage medium 3104 may include one or more of code for determining that a UT is located in a forbidden area 3140, code for sending 3142, code for conducting an update procedure 3144, code for receiving 3146, code for determining a proximity of a UT to a forbidden area 3148, code for defining a location reporting threshold 3150, code for determining that location information for a UT is needed 3152, code for determining that a UT will enter idle mode 3154, or code for determining that PAC information is to be sent 3156.

The circuit/module for determining that a UT is located within a forbidden area 3120 may include circuitry and/or programming (e.g., code for determining that a UT is located within a forbidden area 3140 stored on the storage medium 3104) adapted to perform several functions relating to, for example, determining where a UT is located relative to a particular area. In some aspects, the circuit/module for determining that a UT is located within a forbidden area 3120 (e.g., a means for determining that a UT is located within a forbidden area) may correspond to, for example, a processing circuit.

In some aspects, the circuit/module for determining that a UT is located within a forbidden area 3120 may compare a location indicated by GPS coordinates with an ellipsoid point and a distance from the ellipsoid point. In some aspects, the circuit/module for determining that a UT is located within a forbidden area 3120 may perform the corresponding operations described above in conjunction with FIGS. 8-30. In any event, the circuit/module for determining that a UT is located within a forbidden area 3120 may output a result of the determination (e.g., to the circuit/module for sending 3122, the communication interface 3102, the memory device 3108, or some other component).

The circuit/module for sending 3122 may include circuitry and/or programming (e.g., code for sending 3142 stored on the storage medium 3104) adapted to perform several functions relating to, for example, sending (e.g., transmitting) information. In some implementations, the circuit/module for sending 3122 may obtain information (e.g., from the circuit/module for determining that a UT is located within a forbidden area 3120, the memory device 3108, or some other component of the apparatus 3100), process the information (e.g., encode the information for transmission), and send the information to another component (e.g., the transmitter 3114, the communication interface 3102, or some other component) that will transmit the information to another device. In some scenarios (e.g., if the circuit/module for sending 3122 includes a transmitter), the circuit/module for sending 3122 transmits the information directly to another device (e.g., the ultimate destination) via radio frequency signaling or some other type of signaling suitable for the applicable communication medium.

The circuit/module for sending 3122 (e.g., a means for sending) may take various forms. In some aspects, the circuit/module for sending 3122 may correspond to, for example, an interface (e.g., a bus interface, a send/receive interface, or some other type of signal interface), a communication device, a transceiver, a transmitter, or some other similar component as discussed herein. In some implementations, the communication interface 3102 includes the circuit/module for sending 3122 and/or the code for sending 3142. In some implementations, the circuit/module for sending 3122 and/or the code for sending 3142 is configured to control the communication interface 3102 (e.g., a transceiver or a transmitter) to transmit information.

The circuit/module for conducting an update procedure 3124 may include circuitry and/or programming (e.g., code for conducting an update procedure 3144 stored on the storage medium 3104) adapted to perform several functions relating to, for example, performing update operations. In some aspects, the circuit/module for conducting an update procedure 3124 (e.g., a means for conducting an update procedure) may correspond to, for example, a processing circuit.

In some aspects, the circuit/module for conducting an update procedure 3124 may perform a CNCL update procedure. In some aspects, the circuit/module for conducting an update procedure 3124 may update a PAC. In some aspects, the circuit/module for conducting an update procedure 3124 may perform the corresponding operations described above in conjunction with FIGS. 8-30. In any event, the circuit/module for conducting an update procedure 3124 may output a result of the procedure (e.g., to the communication interface 3102, the memory device 3108, or some other component).

The circuit/module for receiving 3126 may include circuitry and/or programming (e.g., code for receiving 3146 stored on the storage medium 3104) adapted to perform several functions relating to, for example, receiving information. In some scenarios, the circuit/module for receiving 3126 may obtain information (e.g., from the communication interface 3102, the memory device, or some other component of the apparatus 3100) and processes (e.g., decodes) the information. In some scenarios (e.g., if the circuit/module for receiving 3126 is or includes an RF receiver), the circuit/module for receiving 3126 may receive information directly from a device that transmitted the information. In either case, the circuit/module for receiving 3126 may output the obtained information to another component of the apparatus 3100 (e.g., the memory device 3108, or some other component).

The circuit/module for receiving 3126 (e.g., a means for receiving) may take various forms. In some aspects, the circuit/module for receiving 3126 may correspond to, for example, an interface (e.g., a bus interface, a send/receive interface, or some other type of signal interface), a communication device, a transceiver, a receiver, or some other similar component as discussed herein. In some implementations, the communication interface 3102 includes the circuit/module for receiving 3126 and/or the code for receiving 3146. In some implementations, the circuit/module for receiving 3126 and/or the code for receiving 3146 is configured to control the communication interface 3102 (e.g., a transceiver or a receiver) to receive information.

The circuit/module for determining a proximity of a UT to a forbidden area 3128 may include circuitry and/or programming (e.g., code for determining a proximity of a UT to a forbidden area 3148 stored on the storage medium 3104) adapted to perform several functions relating to, for example, determining how close a UT is to a particular area. In some aspects, the circuit/module for determining that a UT is located within a forbidden area 3120 (e.g., a means for determining a proximity of a UT to a forbidden area) may correspond to, for example, a processing circuit.

In some aspects, the circuit/module for determining a proximity of a UT to a forbidden area 3128 may compare a location (or locations) indicated by GPS coordinates with an ellipsoid point and a distance from the ellipsoid point. In some aspects, the circuit/module for determining a proximity of a UT to a forbidden area 3128 may perform the corresponding operations described above in conjunction with FIGS. 8-30. In any event, the circuit/module for determining a proximity of a UT to a forbidden area 3128 may output a result of the determination (e.g., to the circuit/module for sending 3122, the communication interface 3102, the memory device 3108, or some other component).

The circuit/module for defining a location reporting threshold 3130 may include circuitry and/or programming (e.g., code for defining a location reporting threshold 3150 stored on the storage medium 3104) adapted to perform several functions relating to, for example, specifying at least one threshold. In some aspects, the circuit/module for defining a location reporting threshold 3130 (e.g., a means for defining a location reporting threshold) may correspond to, for example, a processing circuit.

In some aspects, the circuit/module for defining a location reporting threshold 3130 may decrease a threshold (e.g., to invoke more frequent reports) the closer a UT gets to a particular area (e.g., a forbidden area). In some aspects, the circuit/module for defining a location reporting threshold 3130 may perform the corresponding operations described above in conjunction with FIGS. 8-30. In any event, the circuit/module for defining a location reporting threshold 3130 may output a result of the definition (e.g., to the circuit/module for sending 3122, the communication interface 3102, the memory device 3108, or some other component).

The circuit/module for determining that location information for a UT is needed 3132 may include circuitry and/or programming (e.g., code for determining that location information for a UT is needed 3152 stored on the storage medium 3104) adapted to perform several functions relating to, for example, determining whether to obtain location information. In some aspects, the circuit/module for determining that location information for a UT is needed 3132 (e.g., a means for determining that location information for a UT is needed) may correspond to, for example, a processing circuit.

In some aspects, the circuit/module for determining that location information for a UT is needed 3132 may trigger a request for location information upon expiry of a guard timer. In some aspects, the circuit/module for determining that location information for a UT is needed 3132 may perform the corresponding operations described above in conjunction with FIGS. 8-30. In any event, the circuit/module for determining that location information for a UT is needed 3132 may output a result of the determination (e.g., to the circuit/module for sending 3122, the communication interface 3102, the memory device 3108, or some other component).

The circuit/module for determining that a UT will enter idle mode 3134 may include circuitry and/or programming (e.g., code for determining that a UT will enter idle mode 3154 stored on the storage medium 3104) adapted to perform several functions relating to, for example, determining an operating mode of a UT. In some aspects, the circuit/module for determining that a UT will enter idle mode 3134 (e.g., a means for determining that a UT will enter idle mode) may correspond to, for example, a processing circuit.

In some aspects, the circuit/module for determining that a UT will enter idle mode 3134 may involving receiving a corresponding indication from the UT and triggering an action (e.g., a connection release) based on the indication. In some aspects, the circuit/module for determining that a UT will enter idle mode 3134 may perform the corresponding operations described above in conjunction with FIGS. 8-30. In any event, the circuit/module for determining that a UT will enter idle mode 3134 may output a result of the determination (e.g., to the circuit/module for sending 3122, the communication interface 3102, the memory device 3108, or some other component).

The circuit/module for determining that PAC information is to be sent 3136 may include circuitry and/or programming (e.g., code for determining that PAC information is to be sent 3156 stored on the storage medium 3104) adapted to perform several functions relating to, for example, determining whether to send information. In some aspects, the circuit/module for determining that PAC information is to be sent 3136 (e.g., a means for determining that PAC information is to be sent) may correspond to, for example, a processing circuit.

In some aspects, the circuit/module for determining that PAC information is to be sent 3136 may involving determining that a UT has been handed-off and determining that the UT needs new PAC information due to the hand-off. In some aspects, the circuit/module for determining that PAC information is to be sent 3136 may perform the corresponding operations described above in conjunction with FIGS. 8-30. In any event, the circuit/module for determining that PAC information is to be sent 3136 may output a result of the determination (e.g., to the circuit/module for sending 3122, the communication interface 3102, the memory device 3108, or some other component).

First Example Process

Figure 32:
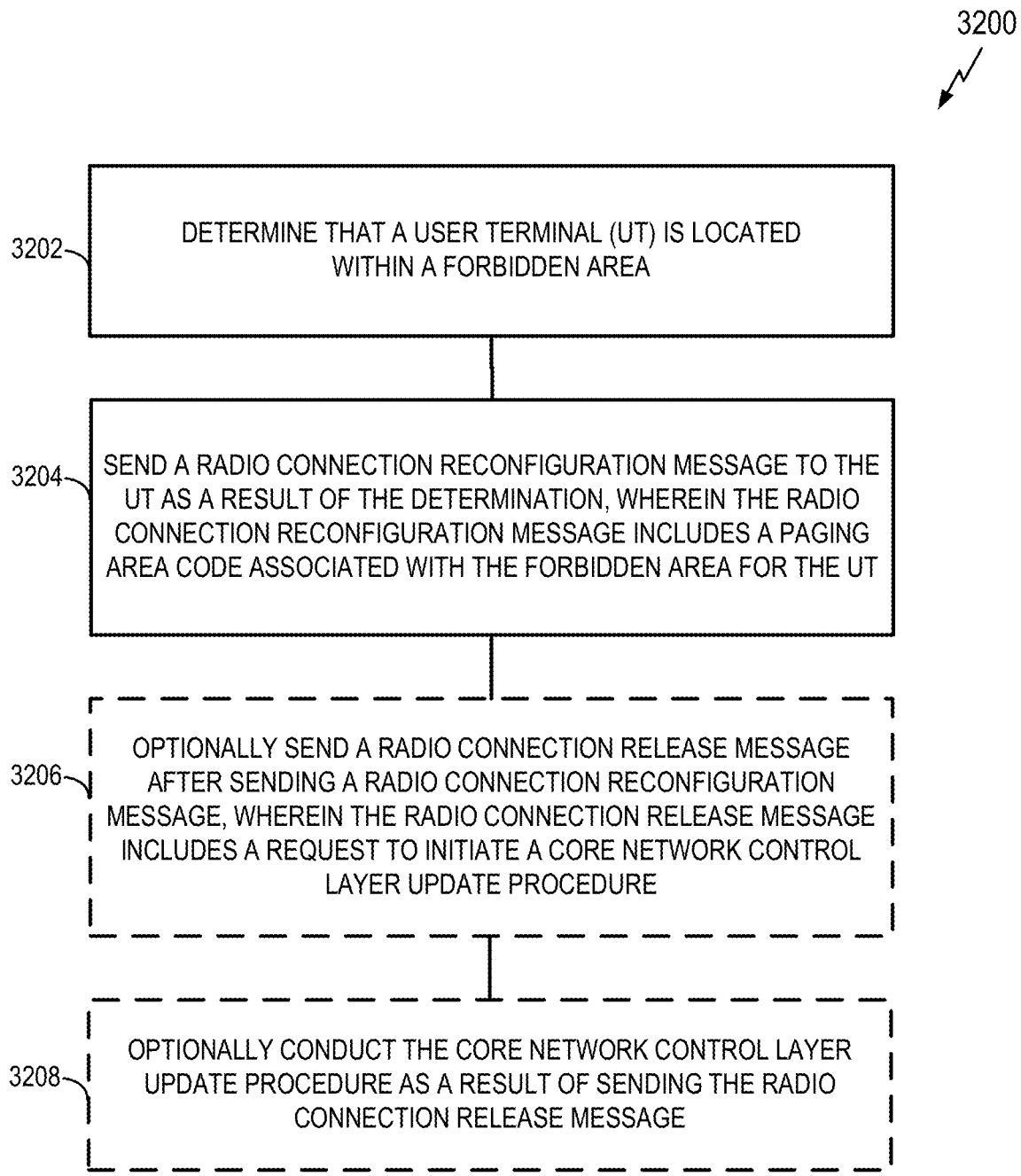
FIG. 32 is a flow diagram of an example forbidden area process in accordance with some aspects of the disclosure.

FIG. 32 illustrates a process 3200 for communication in accordance with some aspects of the disclosure. The process 3200 may take place within a processing circuit (e.g., the processing circuit 3110 of FIG. 31), which may be located in a GN or some other suitable apparatus. Of course, in various aspects within the scope of the disclosure, the process 3200 may be implemented by any suitable apparatus capable of supporting communication-related operations.

At block 3202, an apparatus (e.g., a GN) determines that a user terminal (UT) is located within a forbidden area. For example, a GN may compare the UT's current location (e.g., in GPS coordinates) with the known boundaries of a forbidden area (e.g., also defined in GPS coordinates).

At block 3204, the apparatus sends a Radio Connection Reconfiguration message to the UT as a result of the determination of block 3202. In some aspects, the Radio Connection Reconfiguration message may include a paging area code associated with the forbidden area for the UT.

At optional block 3206, the apparatus may send a Radio Connection Release message after sending the Radio Connection Reconfiguration message at block 3204. In some aspects, the Radio Connection Release message may include a request to initiate (e g, immediately initiate) a Core Network Control Layer update procedure In some aspects, the Radio Connection Release message may include timing information that controls when the UT is to attempt reconfiguration. In some aspects, the Radio Connection Release message may include information indicative of the forbidden area. In some aspects, the information indicative of the forbidden area may include an ellipsoid point (e.g., GPS coordinates of the center of the ellipsoid) and a distance from the ellipsoid point that together indicate (e.g., approximate) a forbidden area. In some aspects, the information indicative of the forbidden area may include an ellipsoid point (e.g., a center point) and a distance (e.g., a radius) from the ellipsoid point that together indicate (e.g., approximate) a forbidden area.

At optional block 3208, the apparatus may conduct a Core Network Control Layer update procedure as a result of sending the Radio Connection Release message. In some aspects, the Core Network Control Layer update procedure may include sending a forbidden paging area code (PAC).

Second Example Process

Figure 33:
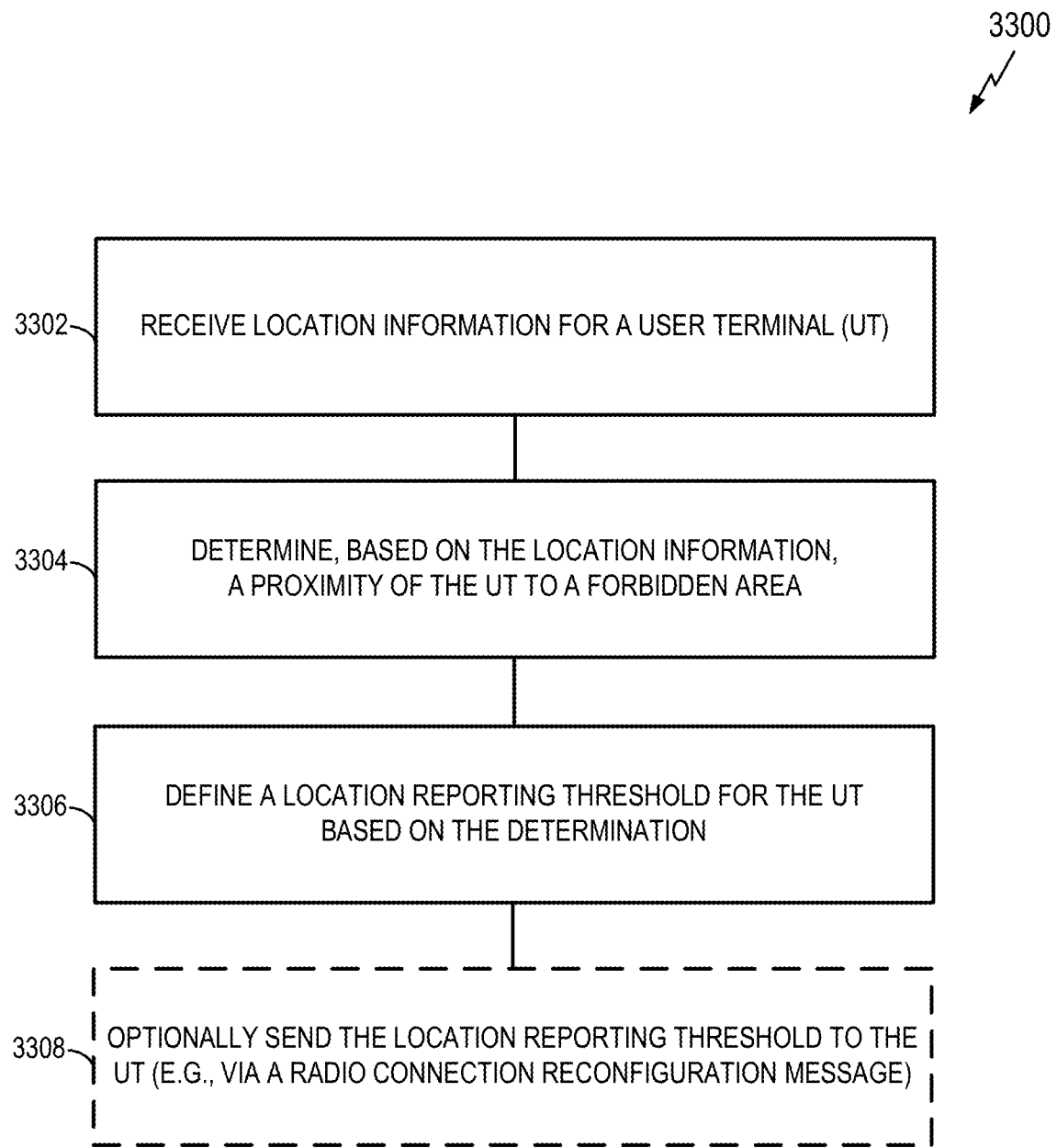
FIG. 33 is a flow diagram of an example location reporting threshold process in accordance with some aspects of the disclosure.

FIG. 33 illustrates a process 3300 for communication in accordance with some aspects of the disclosure. The process 3300 may take place within a processing circuit (e.g., the processing circuit 3110 of FIG. 31), which may be located in a GN or some other suitable apparatus. Of course, in various aspects within the scope of the disclosure, the process 3300 may be implemented by any suitable apparatus capable of supporting communication-related operations.

At block 3302, an apparatus (e.g., a GN) receives location information for a user terminal (UT).

At block 3304, the apparatus determines, based on the location information, a proximity of the UT to a forbidden area. In some aspects, the determination may include determining that the UT is near the forbidden area. In some aspects, the determination may include determining that the UT is in (is located within) the forbidden area.

At block 3306, the apparatus defines a location reporting threshold for the UT based on the determination of block 3304. For example, the threshold may indicate a distance (e.g., from the center of the restricted area) within which service for the UT is restricted. In some aspects, the location reporting threshold may include (e.g., may be) a distance threshold. In some aspects, the location reporting threshold may include a duration threshold. For example, the threshold may indicate an amount of time that service for the UT is restricted.

At optional block 3308, the apparatus may send the location reporting threshold to the UT (e.g., via a Radio Connection Reconfiguration message).

Third Example Process

Figure 34:
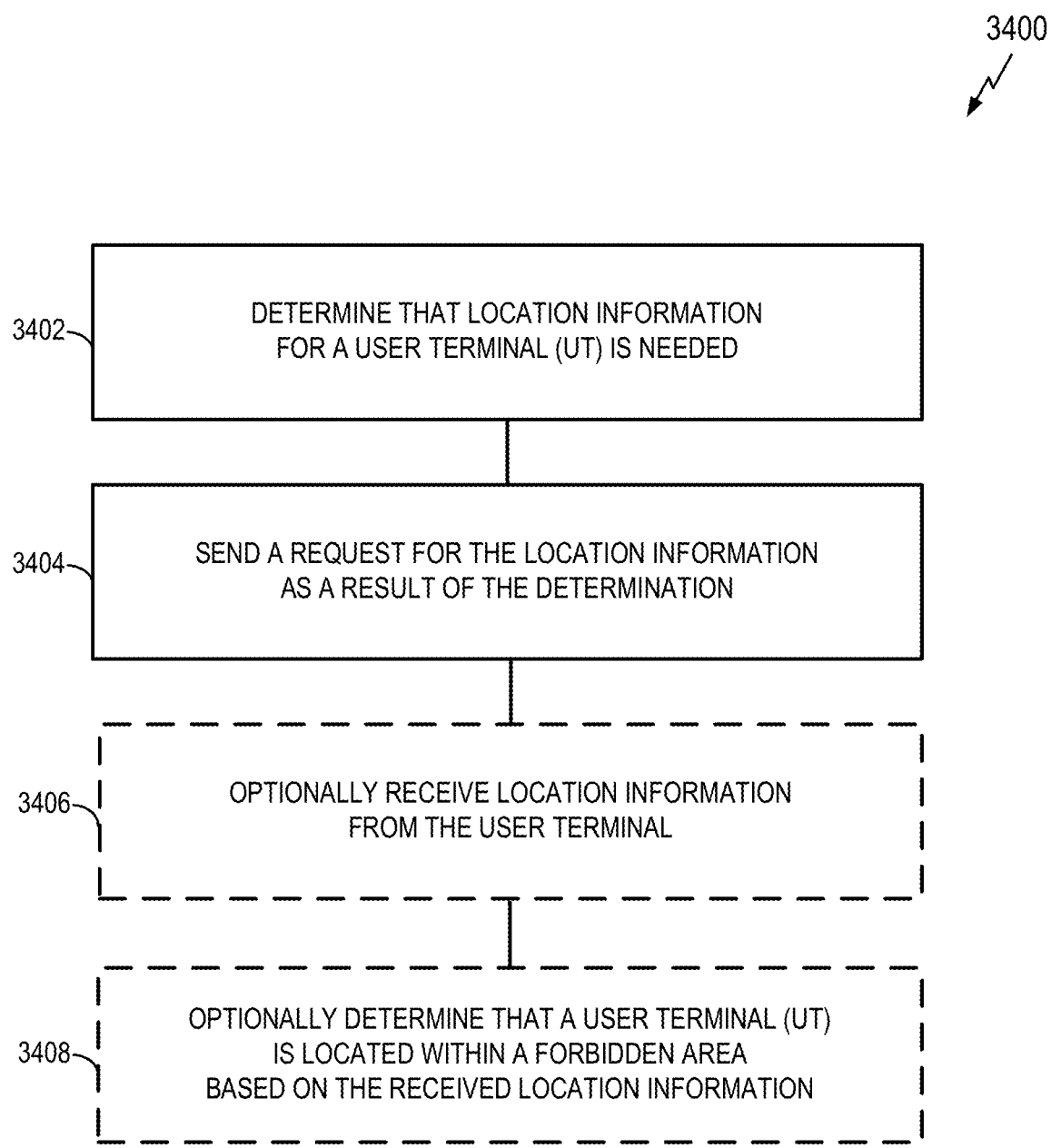
FIG. 34 is a flow diagram of an example process for requesting location in accordance with some aspects of the disclosure.

FIG. 34 illustrates a process 3400 for communication in accordance with some aspects of the disclosure. The process 3400 may take place within a processing circuit (e.g., the processing circuit 3110 of FIG. 31), which may be located in a GN or some other suitable apparatus. Of course, in various aspects within the scope of the disclosure, the process 3400 may be implemented by any suitable apparatus capable of supporting communication-related operations.

At block 3402, an apparatus (e.g., a GN) determines that location information for a user terminal (UT) is needed. For example, a GN may repeatedly (e.g., based on a timer) update a location database that includes information about the last known location of one or more UTs.

At block 3404, the apparatus sends a request for the location information as a result of the determination of block 3402.

At optional block 3406, the apparatus may receive the location information from the user terminal (e.g., in response to the request of block 3404).

At optional block 3408, the apparatus may determine that the user is located within a forbidden area. In some aspects, this determination may be based on the location information received at block 3406.

Second Example Apparatus

Figure 35:
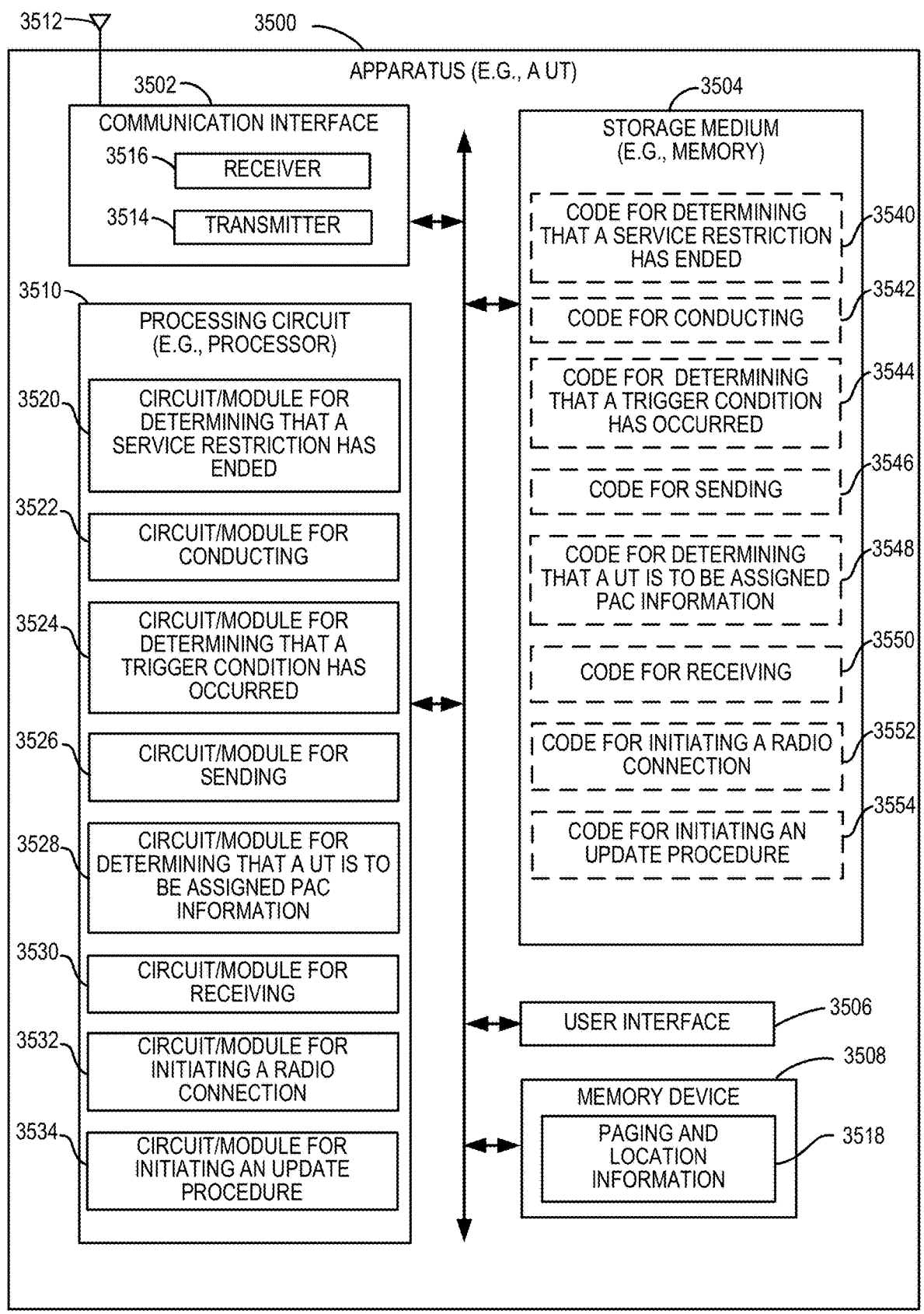
FIG. 35 is a block diagram illustrating another example hardware implementation for an apparatus (e.g., an electronic device) that can support communication in accordance with some aspects of the disclosure.

FIG. 35 illustrates a block diagram of an example hardware implementation of another apparatus 3500 configured to communicate according to one or more aspects of the disclosure. For example, the apparatus 3500 could embody or be implemented within a UT or some other type of device that supports satellite communication. In various implementations, the apparatus 3500 could embody or be implemented within a vehicular component, or any other electronic device having circuitry.

The apparatus 3500 includes a communication interface (e.g., at least one transceiver) 3502, a storage medium 3504, a user interface 3506, a memory device 3508 (e.g., storing paging and location information 3518), and a processing circuit (e.g., at least one processor) 3510. In various implementations, the user interface 3506 may include one or more of: a keypad, a display, a speaker, a microphone, a touchscreen display, of some other circuitry for receiving an input from or sending an output to a user. The communication interface 3502 may be coupled to one or more antennas 3512, and may include a transmitter 3514 and a receiver 3516. In general, the components of FIG. 35 may be similar to corresponding components of the apparatus 3100 of FIG. 31.

According to one or more aspects of the disclosure, the processing circuit 3510 may be adapted to perform any or all of the features, processes, functions, operations and/or routines for any or all of the apparatuses described herein. For example, the processing circuit 3510 may be configured to perform any of the steps, functions, and/or processes described with respect to FIGS. 1-30 and 36-42. As used herein, the term "adapted" in relation to the processing circuit 3510 may refer to the processing circuit 3510 being one or more of configured, used, implemented, and/or programmed to perform a particular process, function, operation and/or routine according to various features described herein.

The processing circuit 3510 may be a specialized processor, such as an application-specific integrated circuit (ASIC) that serves as a means for (e.g., structure for) carrying out any one of the operations described in conjunction with FIGS. 1-30 and 36-42. The processing circuit 3510 serves as one example of a means for transmitting and/or a means for receiving. In various implementations, the processing circuit 3510 may incorporate the functionality of the control processor 420 of FIG. 4.

According to at least one example of the apparatus 3500, the processing circuit 3510 may include one or more of a circuit/module for determining that a service restriction has ended 3520, a circuit/module for conducting 3522, a circuit/module for determining that a trigger condition has occurred 3524, a circuit/module for sending 3526, a circuit/module for determining that a UT is to be assigned PA information 3528, a circuit/module for receiving 3530, a circuit/module for initiating a radio connection 3532, or a circuit/module for initiating an update procedure 3534.

As mentioned above, programming stored by the storage medium 3504, when executed by the processing circuit 3510, causes the processing circuit 3510 to perform one or more of the various functions and/or process operations described herein. For example, the programming, when executed by the processing circuit 3510, may cause the processing circuit 3510 to perform the various functions, steps, and/or processes described herein with respect to FIGS. 1-30 and 36-42 in various implementations. As shown in FIG. 35, the storage medium 3504 may include one or more of code for determining that a service restriction has ended 3540, code for conducting 3542, code for determining that a trigger condition has occurred 3544, code for sending 3546, code for determining that a UT is to be assigned PA information 3548, code for receiving 3550, code for initiating a radio connection 3552, or code for initiating an update procedure 3554.

The circuit/module for determining that a service restriction has ended 3520 may include circuitry and/or programming (e.g., code for determining that a service restriction has ended 3540 stored on the storage medium 3504) adapted to perform several functions relating to, for example, determining whether a service restriction applies. In some aspects, the circuit/module for determining that a service restriction has ended 3520 (e.g., a means for determining that a service restriction has ended) may correspond to, for example, a processing circuit.

In some aspects, the circuit/module for determining that a service restriction has ended 3520 may compare a the current time with a threshold or monitor the value of a timer. In some aspects, the circuit/module for determining that a service restriction has ended 3520 may compare a location indicated by GPS coordinates with an ellipsoid point and a distance from the ellipsoid point. In some aspects, the circuit/module for In some aspects, the circuit/module for determining that a service restriction has ended 3520 may compare a location indicated by GPS coordinates with an ellipsoid point and a distance from the ellipsoid point. 3520 may perform the corresponding operations described above in conjunction with FIGS. 8-30. In any event, the circuit/module for In some aspects, the circuit/module for determining that a service restriction has ended 3520 may compare a location indicated by GPS coordinates with an ellipsoid point and a distance from the ellipsoid point. 3520 may output a result of the determination (e.g., to the circuit/module for sending 3522, the communication interface 3502, the memory device 3508, or some other component).

The circuit/module for conducting 3522 may include circuitry and/or programming (e.g., code for conducting 3542 stored on the storage medium 3504) adapted to perform several functions relating to, for example, conducting specified operations. In some aspects, the circuit/module for conducting 3522 (e.g., a means for conducting) may correspond to, for example, a processing circuit.

In some aspects, the circuit/module for conducting 3522 may conduct at least one mobility operation (e.g., by initiating a Radio Connection). In some aspects, the circuit/module for conducting 3522 may perform the corresponding operations described above in conjunction with FIGS. 8-30. In any event, the circuit/module for conducting 3522 may output a result of the procedure (e.g., to the communication interface 3502, the memory device 3508, or some other component).

The circuit/module for determining that a trigger condition has occurred 3524 may include circuitry and/or programming (e.g., code for determining that a trigger condition has occurred 3544 stored on the storage medium 3504) adapted to perform several functions relating to, for example, monitoring the status of a trigger condition. In some aspects, the circuit/module for determining that a trigger condition has occurred 3524 (e.g., a means for determining that a trigger condition has occurred) may correspond to, for example, a processing circuit.

In some aspects, the circuit/module for determining that a trigger condition has occurred 3524 may involving monitoring operations of a UT and/or a network. In some aspects, the circuit/module for determining that a trigger condition has occurred 3524 may perform the corresponding operations described above in conjunction with FIGS. 8-30. In any event, the circuit/module for determining that a trigger condition has occurred 3524 may output a result of the determination (e.g., to the circuit/module for sending 3522, the communication interface 3502, the memory device 3508, or some other component).

The circuit/module for sending 3526 may include circuitry and/or programming (e.g., code for sending 3546 stored on the storage medium 3504) adapted to perform several functions relating to, for example, sending (e.g., transmitting) information. In some implementations, the circuit/module for sending 3526 may obtain information (e.g., from the memory device 3508, or some other component of the apparatus 3500), process the information (e.g., encode the information for transmission), and send the information to another component (e.g., the transmitter 3514, the communication interface 3502, or some other component) that will transmit the information to another device. In some scenarios (e.g., if the circuit/module for sending 3526 includes a transmitter), the circuit/module for sending 3526 transmits the information directly to another device (e.g., the ultimate destination) via radio frequency signaling or some other type of signaling suitable for the applicable communication medium.

The circuit/module for sending 3526 (e.g., a means for sending) may take various forms. In some aspects, the circuit/module for sending 3526 may correspond to, for example, an interface (e.g., a bus interface, a send/receive interface, or some other type of signal interface), a communication device, a transceiver, a transmitter, or some other similar component as discussed herein. In some implementations, the communication interface 3502 includes the circuit/module for sending 3526 and/or the code for sending 3546. In some implementations, the circuit/module for sending 3526 and/or the code for sending 3546 is configured to control the communication interface 3502 (e.g., a transceiver or a transmitter) to transmit information.

The circuit/module for determining that a UT is to be assigned PAC information 3528 may include circuitry and/or programming (e.g., code for determining that a UT is to be assigned PAC information 3548 stored on the storage medium 3504) adapted to perform several functions relating to, for example, determining whether to assign information. In some aspects, the circuit/module for determining that a UT is to be assigned PAC information 3528 (e.g., a means for determining that a UT is to be assigned PAC information) may correspond to, for example, a processing circuit.

In some aspects, the circuit/module for determining that a UT is to be assigned PAC information 3528 may involving determining that a UT does not have valid PAC information. In some aspects, the circuit/module for determining that a UT is to be assigned PAC information 3528 may perform the corresponding operations described above in conjunction with FIGS. 8-30. In any event, the circuit/module for determining that a UT is to be assigned PAC information 3528 may output a result of the determination (e.g., to the circuit/module for sending 3522, the communication interface 3502, the memory device 3508, or some other component).

The circuit/module for receiving 3530 may include circuitry and/or programming (e.g., code for receiving 3550 stored on the storage medium 3504) adapted to perform several functions relating to, for example, receiving information. In some scenarios, the circuit/module for receiving 3530 may obtain information (e.g., from the communication interface 3502, the memory device, or some other component of the apparatus 3500) and processes (e.g., decodes) the information. In some scenarios (e.g., if the circuit/module for receiving 3530 is or includes an RF receiver), the circuit/module for receiving 3530 may receive information directly from a device that transmitted the information. In either case, the circuit/module for receiving 3530 may output the obtained information to another component of the apparatus 3500 (e.g., the memory device 3508, or some other component).

The circuit/module for receiving 3530 (e.g., a means for receiving) may take various forms. In some aspects, the circuit/module for receiving 3530 may correspond to, for example, an interface (e.g., a bus interface, a send/receive interface, or some other type of signal interface), a communication device, a transceiver, a receiver, or some other similar component as discussed herein. In some implementations, the communication interface 3502 includes the circuit/module for receiving 3530 and/or the code for receiving 3550. In some implementations, the circuit/module for receiving 3530 and/or the code for receiving 3550 is configured to control the communication interface 3502 (e.g., a transceiver or a receiver) to receive information.

The circuit/module for initiating a radio connection 3532 may include circuitry and/or programming (e.g., code for initiating a radio connection 3552 stored on the storage medium 3504) adapted to perform several functions relating to, for example, initiating radio-based communication. In some aspects, the circuit/module for initiating a radio connection 3532 (e.g., a means for initiating a radio connection) may correspond to, for example, a processing circuit.

In some aspects, the circuit/module for initiating a radio connection 3532 may send a Radio Connection Request and handle associated processing and messages. In some aspects, the circuit/module for initiating a radio connection 3532 may perform the corresponding operations described above in conjunction with FIGS. 8-30. In any event, the circuit/module for initiating a radio connection 3532 may output a result of the initiation (e.g., to the communication interface 3502, the memory device 3508, or some other component).

The circuit/module for initiating an update procedure 3534 may include circuitry and/or programming (e.g., code for initiating an update procedure 3554 stored on the storage medium 3504) adapted to perform several functions relating to, for example, initiating a specified procedure. In some aspects, the circuit/module for initiating an update procedure 3534 (e.g., a means for initiating an update procedure) may correspond to, for example, a processing circuit.

In some aspects, the circuit/module for initiating an update procedure 3534 may initiate a PAC update. In some aspects, the circuit/module for initiating an update procedure 3534 may perform the corresponding operations described above in conjunction with FIGS. 8-30. In any event, the circuit/module for initiating an update procedure 3534 may output a result of the initiation (e.g., to the communication interface 3502, the memory device 3508, or some other component).

Fourth Example Process

Figure 36:
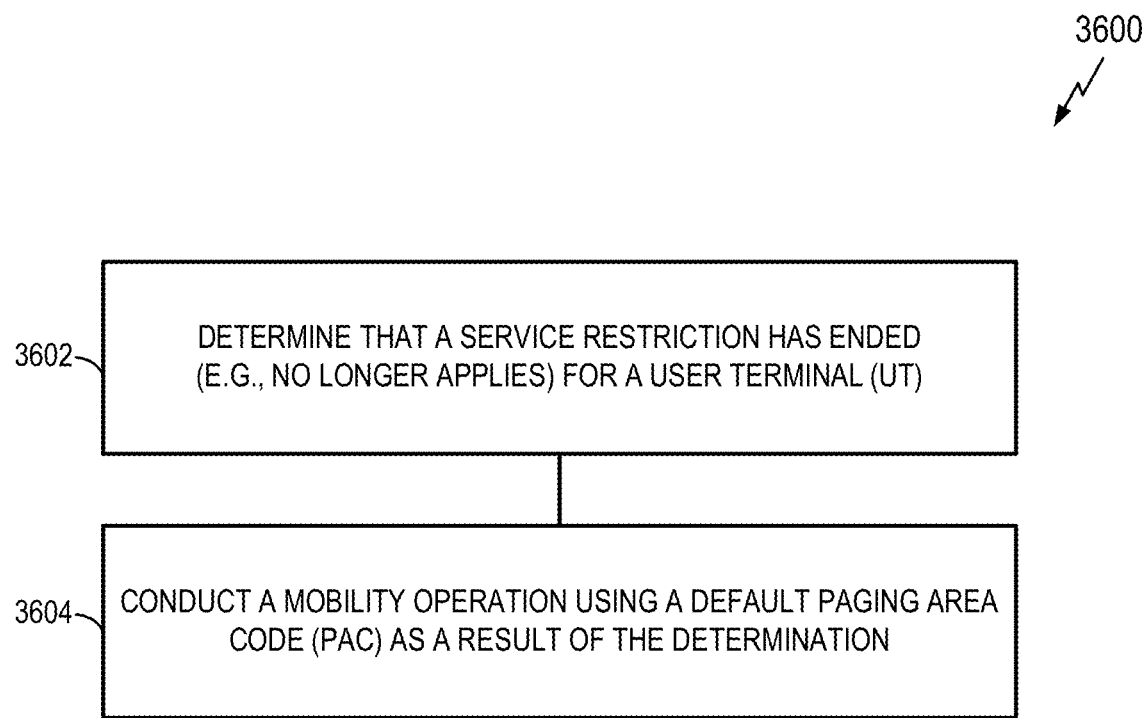
FIG. 36 is a flow diagram of an example default PAC process in accordance with some aspects of the disclosure.

FIG. 36 illustrates a process 3600 for communication in accordance with some aspects of the disclosure. The process 3600 may take place within a processing circuit (e.g., the processing circuit 3510 of FIG. 35), which may be located in a UT, UE, or some other suitable apparatus. Of course, in various aspects within the scope of the disclosure, the process 3600 may be implemented by any suitable apparatus capable of supporting communication-related operations.

At block 3602, an apparatus (e.g., a UT) determines that a service restriction for a user terminal (UT) has ended (e.g., no longer applies). In some aspects, the service restriction may be associated with a forbidden area. For example, a UT may determine that that a threshold time associated with the service restriction for a restricted area has expired or that the UT has moved a threshold distance (e.g., away from a center of a restricted area).

At block 3604, the apparatus conducts a mobility operation using a default paging area code (PAC) as a result of the determination of block 3602. In some aspects, the conducting of the mobility operation may include initiating a Radio Connection (e.g., after initiating a Register procedure). In some aspects, the conducting of the mobility operation may include initiating a Radio Connection without sending any PAC information for the initiation of the Radio Connection. In some aspects, the default paging area code is excluded from a set of paging area codes used for paging area update operations. In some aspects, the default paging area code is used between a Core Network Control Layer and a Radio Connection Layer internal to a user terminal (UT). In some aspects, the default paging area code might not be sent in any signaling messages over-the-air.

Fifth Example Process

Figure 37:
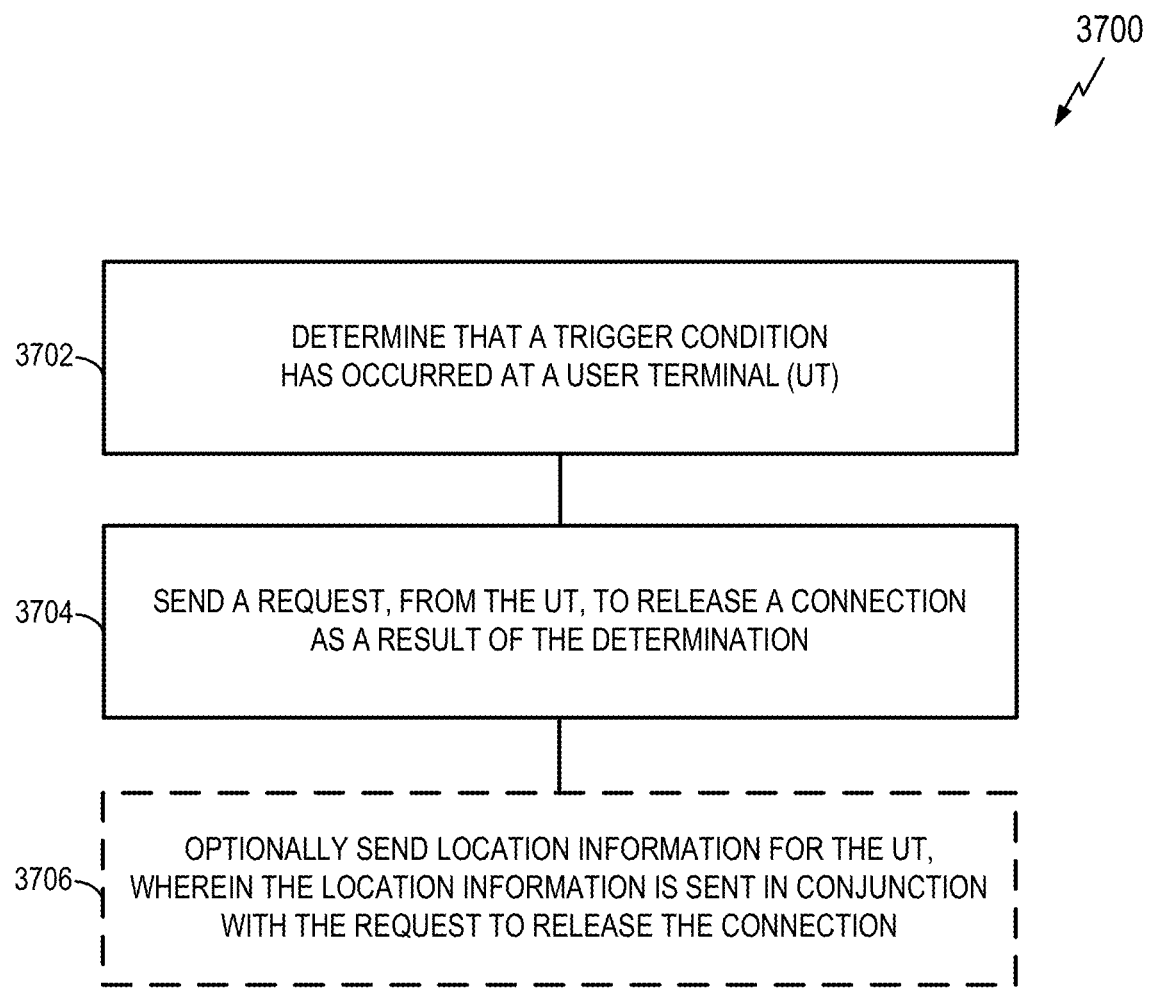
FIG. 37 is a flow diagram of an example connection release process in accordance with some aspects of the disclosure.

FIG. 37 illustrates a process 3700 for communication in accordance with some aspects of the disclosure. The process 3700 may take place within a processing circuit (e.g., the processing circuit 3510 of FIG. 35), which may be located in a UT, UE, or some other suitable apparatus. Of course, in various aspects within the scope of the disclosure, the process 3700 may be implemented by any suitable apparatus capable of supporting communication-related operations.

At block 3702, an apparatus (e.g., a UT) determines that a trigger condition has occurred at a user terminal (UT). In some aspects, the determination that the trigger condition has occurred may include determining that a network has completed downloading of satellite transition information (e.g., a table that indicates satellite beam or cell availability). In some aspects, the determination that the trigger condition has occurred may include determining that the UT has completed sending of location information. In some aspects, the determination that the trigger condition has occurred may include determining that the UT will transition (or has transitioned) to idle mode. In some aspects, the determination that the trigger condition has occurred may include determining that a procedure for which the connection was established has completed. In some aspects, the connection is a Radio Connection for the UT. In some aspects, the connection is a Core Network Interface connection.

At block 3704, the apparatus sends a request, from the UT, to release a connection as a result of the determination of block 3702. In some aspects, the determination that the trigger condition has occurred may include determining that a user terminal (UT) will enter (or has entered) idle mode after reporting location information for the UT.

At optional block 3706, the apparatus may send location information for the UT. In some aspects, the location information may be sent in conjunction with the request to release the connection sent at block 3704.

Sixth Example Process

Figure 38:
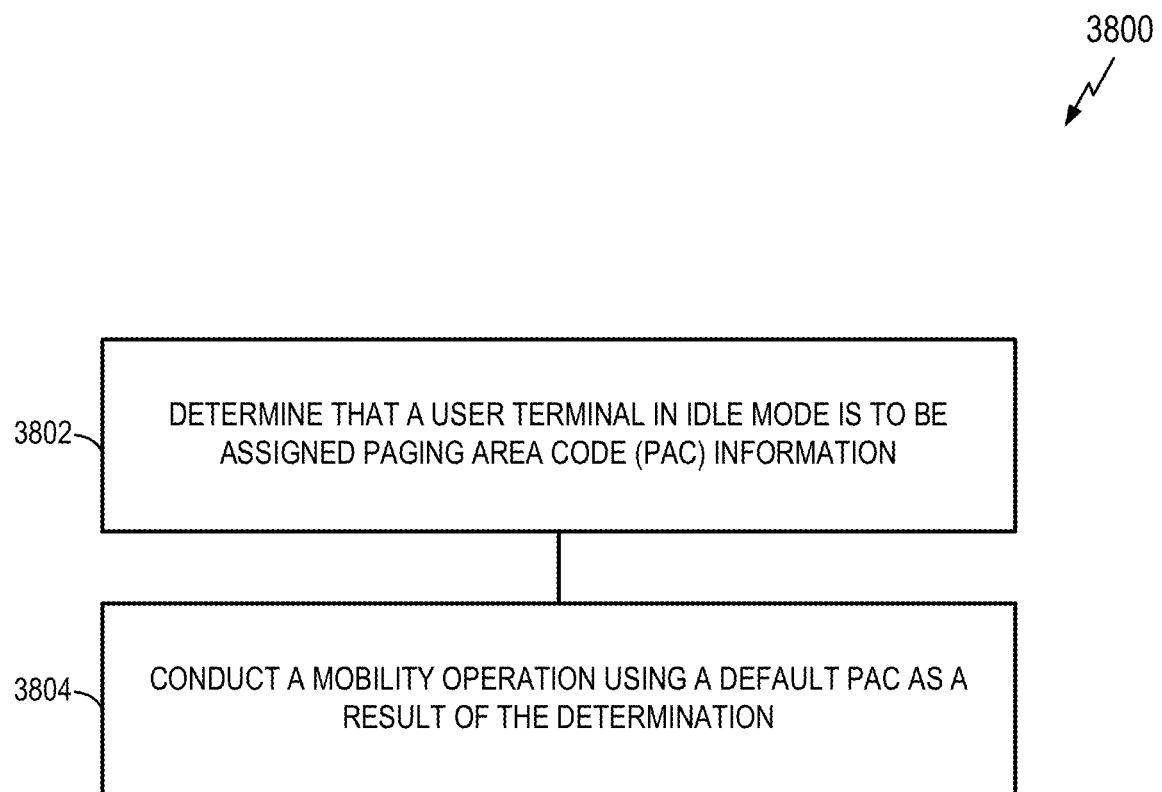
FIG. 38 is a flow diagram of an example default PAC process in accordance with some aspects of the disclosure.

FIG. 38 illustrates a process 3800 for communication in accordance with some aspects of the disclosure. The process 3800 may take place within a processing circuit (e.g., the processing circuit 3510 of FIG. 35), which may be located in a UT, UE, or some other suitable apparatus. Of course, in various aspects within the scope of the disclosure, the process 3800 may be implemented by any suitable apparatus capable of supporting communication-related operations.

At block 3802, an apparatus (e.g., a UT) determines that a user terminal in idle mode is to be assigned paging area code (PAC) information. For example, a UT may determine that it has not been assigned current PAC information.

At block 3804, the apparatus conducts a mobility operation using a default PAC as a result of the determination. In some aspects, conducting of the mobility operation may include initiating a Radio Connection (e.g., after initiating a Register procedure) without sending any PAC information for the initiation of the Radio Connection. In some aspects, the default paging area code may be excluded from a set of paging area codes used for paging area update operations. In some aspects, the default paging area code may be used between a Core Network Control Layer and a Radio Connection Layer internal to a user terminal (UT). In some aspects, the default paging area code might not be sent in any signaling messages over-the-air.

Seventh Example Process

Figure 39:
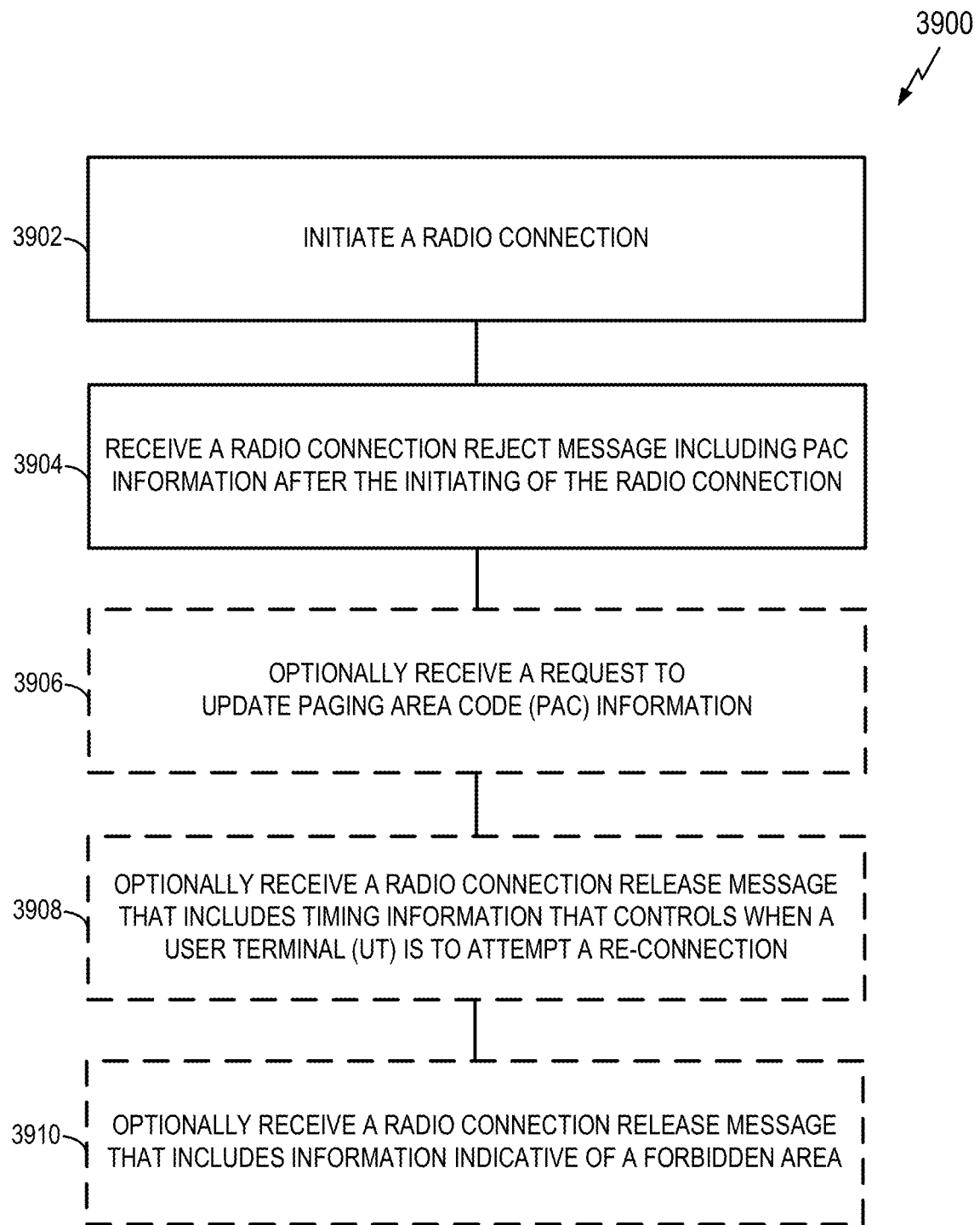
FIG. 39 is a flow diagram of an example connection reject process in accordance with some aspects of the disclosure.

FIG. 39 illustrates a process 3900 for communication in accordance with some aspects of the disclosure. The process 3900 may take place within a processing circuit (e.g., the processing circuit 3510 of FIG. 35), which may be located in a UT, UE, or some other suitable apparatus. Of course, in various aspects within the scope of the disclosure, the process 3900 may be implemented by any suitable apparatus capable of supporting communication-related operations. In some aspects, the operations of the process 3900 may correspond, at least in part, to the operations of FIGS. 14A-17B.

At block 3902, an apparatus (e.g., a UT) initiates a Radio Connection. In some aspects, the initiation of the Radio Connection may include sending old PAC information. In some aspects, the initiation of the Radio Connection may include sending a PAC associated with a forbidden paging area (PA). In some aspects, the initiation of the Radio Connection may be triggered by the receipt of the request.

At block 3904, the apparatus receives a Radio Connection reject message after the initiating of the Radio Connection at block 3902. In some aspects, the Radio Connection Reject message may include paging area code (PAC) information (e.g., a newly assigned PAC). In some aspects, the Radio Connection Reject message may include timing information that controls when the UT can attempt a reconnection. In some aspects, the Radio Connection Reject message may include a request for the UT to send old PAC information in a Radio Connection Request message.

At optional block 3906, the apparatus may receive a request to update PAC information. In some aspects, initiating of another Radio Connection (e.g., sending of a Connection Request message) may be triggered by the receipt of the request.

At optional block 3908, the apparatus may receive a Radio Connection Release message that includes timing information that controls when a user terminal (UT) is to attempt a re-connection.

At optional block 3910, the apparatus may receive a Radio Connection Release message that includes information indicative of a forbidden area. In some aspects, the information indicative of the forbidden area may include an ellipsoid point and a distance from the ellipsoid point. Accordingly, in some aspects, the Radio Connection Release message may identify an ellipsoid point and a distance from the ellipsoid point indicative of a forbidden area.

Eighth Example Process

Figure 40:
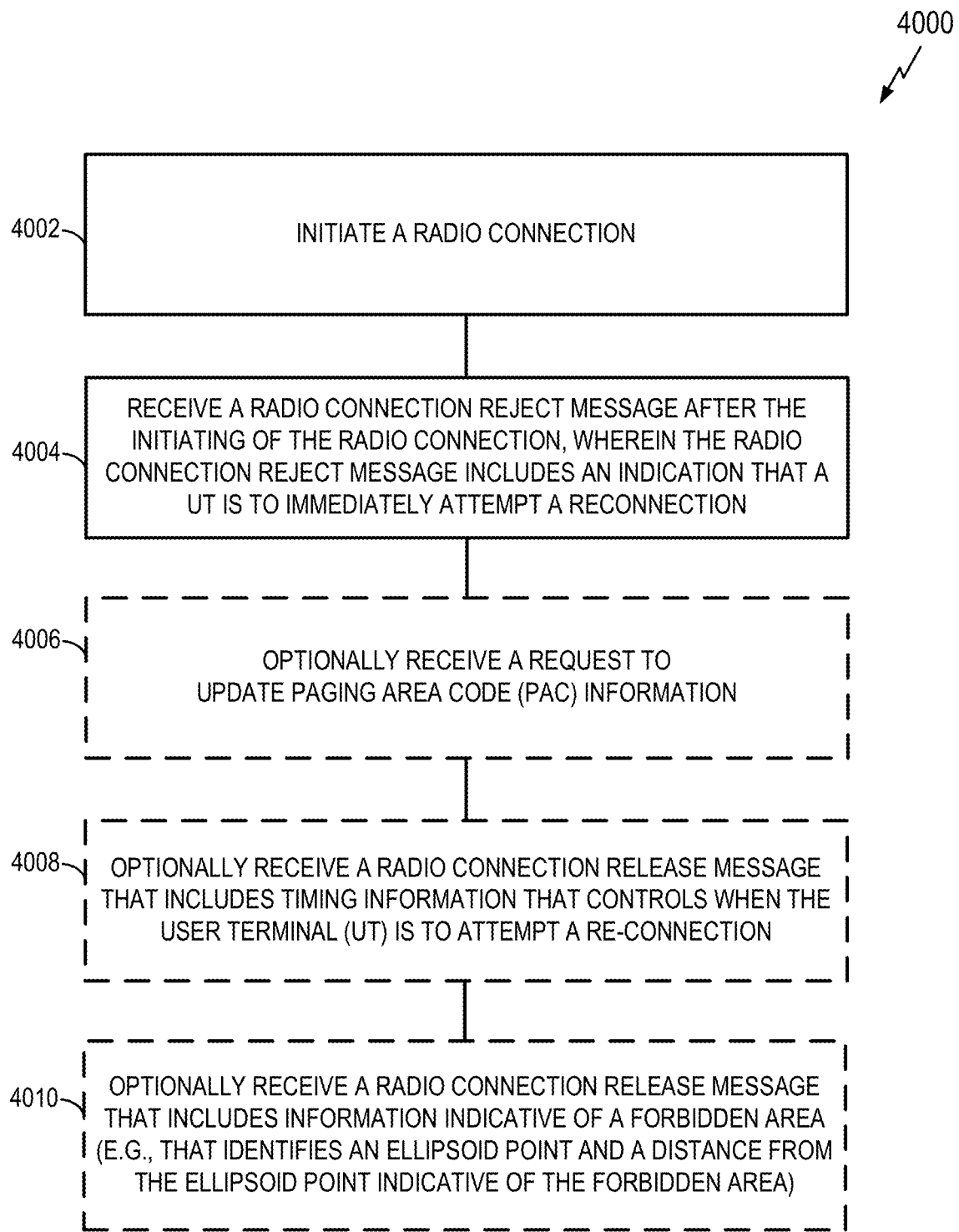
FIG. 40 is a flow diagram of an example connection reject process in accordance with some aspects of the disclosure.

FIG. 40 illustrates a process 4000 for communication in accordance with some aspects of the disclosure. The process 4000 may take place within a processing circuit (e.g., the processing circuit 3510 of FIG. 35), which may be located in a UT, UE, or some other suitable apparatus. Of course, in various aspects within the scope of the disclosure, the process 4000 may be implemented by any suitable apparatus capable of supporting communication-related operations. In some aspects, the operations of the process 4000 may correspond, at least in part, to the operations of FIGS. 14A-17B.

At block 4002, an apparatus (e.g., a UT) initiates a Radio Connection. In some aspects, the initiation of the Radio Connection may include sending old PAC information. In some aspects, the initiation of the Radio Connection may include sending a PAC associated with a forbidden paging area (PA). In some aspects, the initiation of the Radio Connection may be triggered by receipt of a request.

At block 4004, the apparatus receives a Radio Connection Reject message after the initiating of the Radio Connection at block 4002. In some aspects, the Radio Connection Reject message may include an indication that the UT is to immediately attempt a reconnection. For example, the Radio Connection Reject message may include a waittime parameter with a value of zero.

At optional block 4006, the apparatus may receive a request to update PAC information. In some aspects, initiating of another Radio Connection (e.g., sending of a Connection Request message) may be triggered by the receipt of the request.

At optional block 4008, the apparatus may receive a Radio Connection Release message that includes timing information that controls when a user terminal (UT) is to attempt a re-connection.

At optional block 4010, the apparatus may receive a Radio Connection Release message that includes information indicative of a forbidden area. In some aspects, the information indicative of the forbidden area may include an ellipsoid point and a distance from the ellipsoid point. Accordingly, in some aspects, the Radio Connection Release message may identify an ellipsoid point and a distance from the ellipsoid point indicative of a forbidden area.

Ninth Example Process

Figure 41:
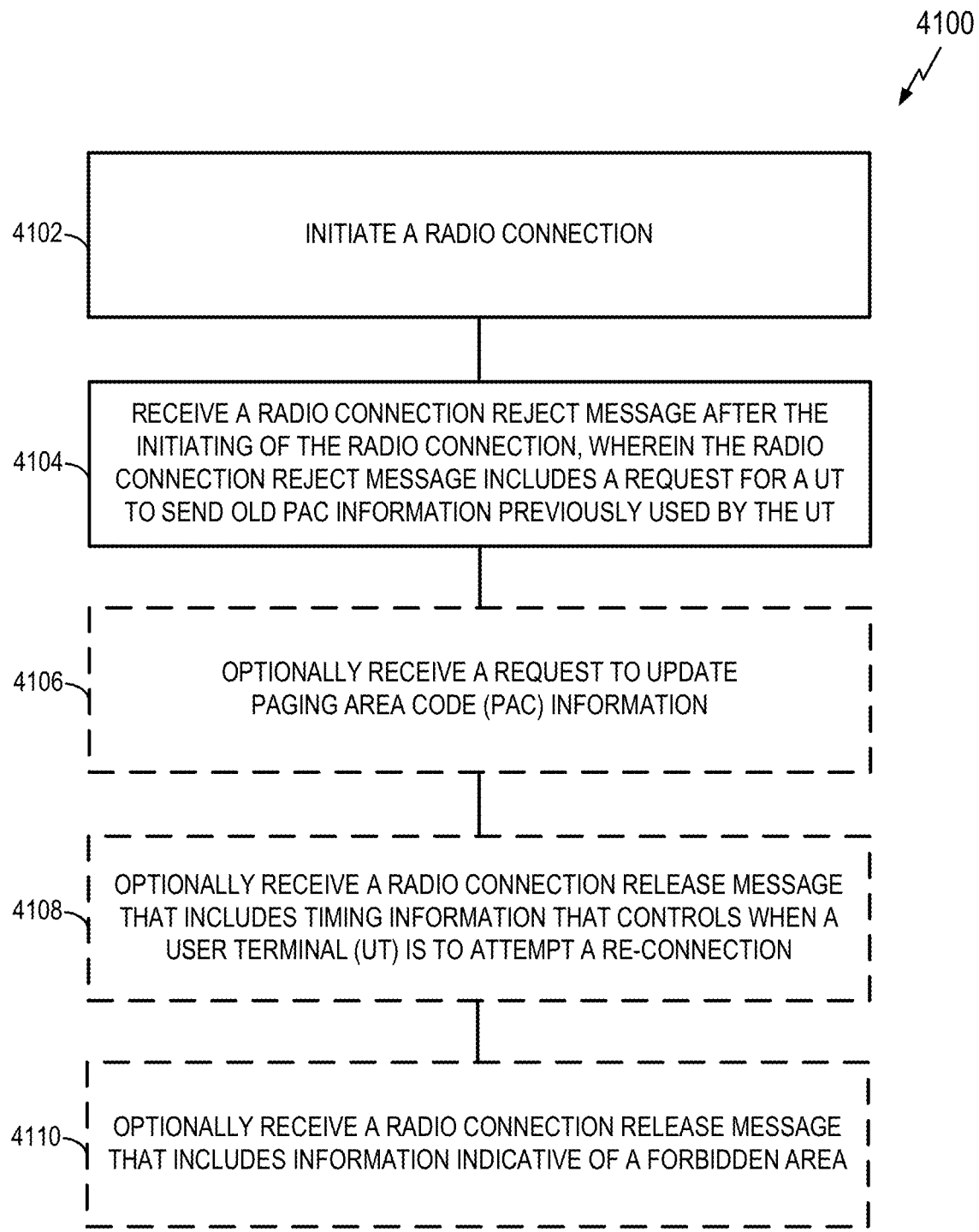
FIG. 41 is a flow diagram of an example connection reject process in accordance with some aspects of the disclosure.

FIG. 41 illustrates a process 4100 for communication in accordance with some aspects of the disclosure. The process 4100 may take place within a processing circuit (e.g., the processing circuit 3510 of FIG. 35), which may be located in a UT, UE, or some other suitable apparatus. Of course, in various aspects within the scope of the disclosure, the process 4100 may be implemented by any suitable apparatus capable of supporting communication-related operations. In some aspects, the operations of the process 4100 may correspond, at least in part, to the operations of FIGS. 17A and 17B.

At block 4102, an apparatus (e.g., a UT) initiates a Radio Connection. In some aspects, the initiation of the Radio Connection may include sending current PAC information. In some aspects, the initiation of the Radio Connection may include sending old PAC information. In some aspects, the initiation of the Radio Connection includes sending a PAC associated with a forbidden paging area (PA). In some aspects, the initiation of the Radio Connection may be triggered by the receipt of the request.

At block 4104, the apparatus receives a Radio Connection Reject message after the initiating of the Radio Connection at block 4102. In some aspects, Radio Connection Reject message may include a request for a UT to send old PAC information previously used by the UT. In some aspects, the request may be for the UT to send the old PAC information in a Radio Connection Request message.

At optional block 4106, the apparatus (e.g., a UT) may receive a request to update PAC information. In some aspects, the request indicates to send the old PAC information in a Radio Connection Request message. In some aspects, initiating of another Radio Connection (e.g., sending of a Connection Request message that includes the old PAC information) is triggered by receipt of the request to update paging area code information.

At optional block 4108, the apparatus may receive a Radio Connection Release message that includes timing information that controls when a user terminal (UT) is to attempt a re-connection.

At optional block 4110, the apparatus may receive a Radio Connection Release message that includes information indicative of a forbidden area. In some aspects, the information indicative of the forbidden area may include an ellipsoid point and a distance from the ellipsoid point.

Accordingly, in some aspects, the Radio Connection Release message may identify an ellipsoid point and a distance from the ellipsoid point indicative of a forbidden area.

Tenth Example Process

Figure 42:
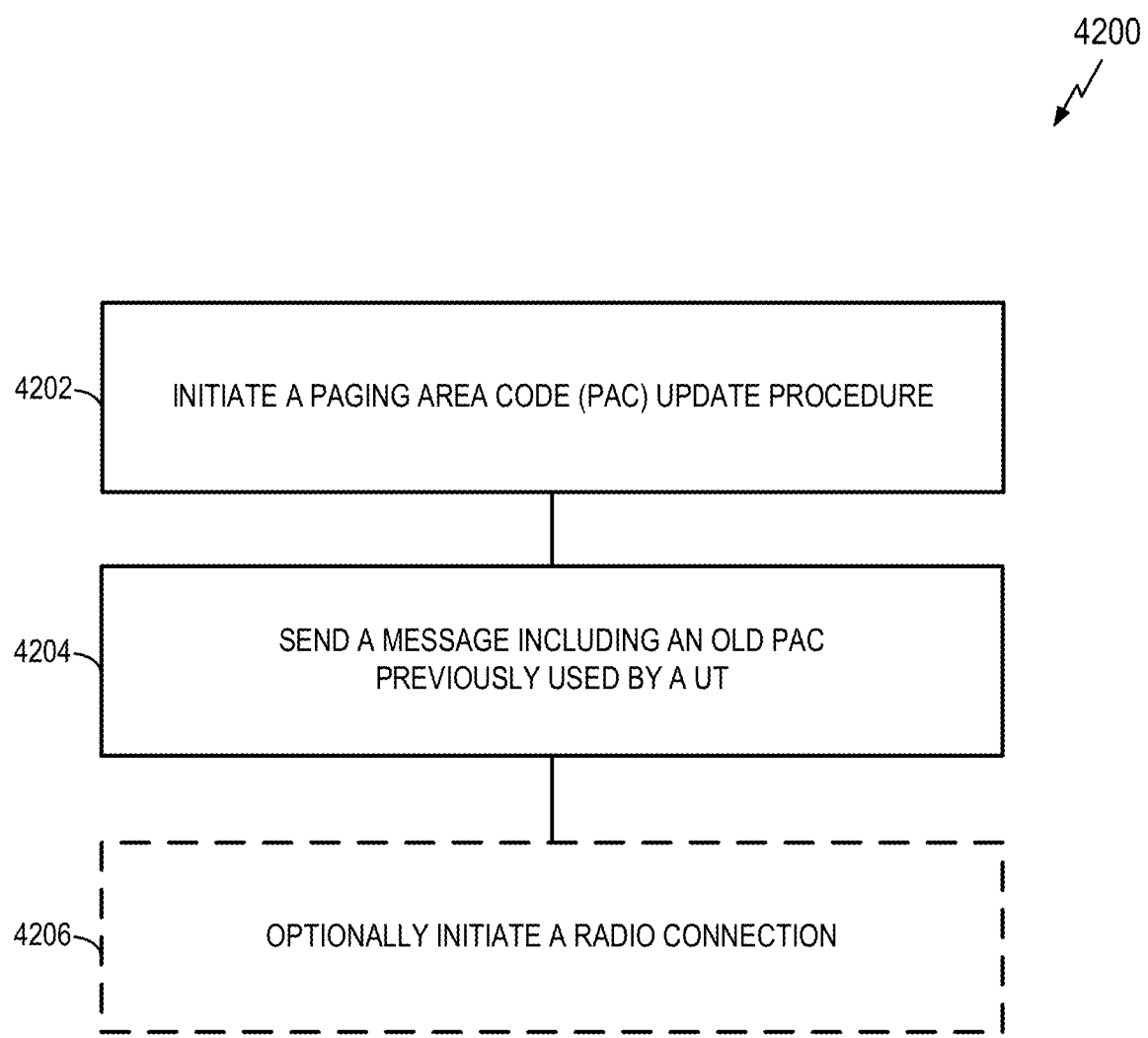
FIG. 42 is a flow diagram of an example paging area update process in accordance with some aspects of the disclosure.

FIG. 42 illustrates a process 4200 for communication in accordance with some aspects of the disclosure. The process 4200 may take place within a processing circuit (e.g., the processing circuit 3510 of FIG. 35), which may be located in a UT, UE, or some other suitable apparatus. Of course, in various aspects within the scope of the disclosure, the process 4200 may be implemented by any suitable apparatus capable of supporting communication-related operations. In some aspects, the operations of the process 4200 may correspond, at least in part, to the operations of FIG. 16.

At block 4202, the apparatus initiates a paging area update (PAU) procedure. In some aspects, the operations of block 4204 may be performed after conducting a mobility operation (e.g., as discussed at block 3804 of FIG. 38).

At block 4204, the apparatus sends a message comprising an old PAC previously used by a UT. In some aspects, the operations of block 4204 may be performed after initiating the PAU procedure at block 4202. In some aspects, the message may further include a new PAC.

At optional block 4206, an apparatus (e.g., a UT) may initiate a Radio Connection in conjunction with sending the message of block 4204. For example, the message may be a Connection Request message.

XIII. Other Aspects

The disclosure relates in some aspects to managing paging area information for a user terminal (UT) and connection signaling. In some aspects, paging area information is provided for an idle UT by defining a default paging area code (PAC) that is known by the network and the UT. In some aspects, paging area information is communicated via connection signaling. In some aspects, connection signaling may be used to force a UT to invoke an update procedure (e.g., a reconnection).

The disclosure relates in some aspects to forbidden area procedures and connection release management for a user terminal (UT). Forbidden area-related procedures include, for example, using a special paging area code (PAC) in conjunction with a forbidden area, defining a location reporting threshold for a UT based on the proximity of the UT to a forbidden area, or using a default paging area code if a service restriction for a UT has ended. Connection release management includes, for example, a UT sending a request to cause the release of a Radio Connection that the UT no longer needs, or a UT sending a Location Indication (e.g., including a flag requesting release of a connection) to release the connection used for location reporting when a UT is done sending the location information and is going to go back to idle mode.

In some aspects, a method of communication includes determining that a user terminal in idle mode is to be assigned paging area code (PAC) information, and conducting a mobility operation using a default PAC as a result of the determination. In some aspects, the conducting of the mobility operation includes initiating a Register procedure, and initiating a Radio Connection without sending any PAC information. In some aspects, the default PAC is excluded from a set of PACs used for paging area update operations. In some aspects, the default PAC is used between a Core Network Control Layer and a Radio Connection Layer internal to a user terminal (UT). In some aspects, the default PAC is not sent in any signaling messages over-the-air.

In an aspect of the disclosure, an apparatus for communication includes a memory and a processor coupled to the memory. The processor and the memory are configured to determine that a user terminal in idle mode is to be assigned paging area code (PAC) information, and conduct a mobility operation using a default PAC as a result of the determination.

In an aspect of the disclosure, an apparatus for communication includes means for determining that a user terminal in idle mode is to be assigned paging area code (PAC) information, and means for conducting a mobility operation using a default PAC as a result of the determination.

In an aspect of the disclosure, a non-transitory computer-readable medium storing computer-executable code includes code to: determine that a user terminal in idle mode is to be assigned paging area code (PAC) information, and conduct a mobility operation using a default PAC as a result of the determination.

In some aspects, a method of communication includes initiating a Radio Connection, and receiving a Radio Connection Reject message comprising paging area code (PAC) information after the initiating of the Radio Connection. In some aspects, the Radio Connection Reject message includes timing information that controls when the UT can attempt a reconnection. In some aspects, the Radio Connection Reject message includes a request for the UT to send old PAC information in a Radio Connection Request message. In some aspects, the initiating of the Radio Connection includes sending old PAC information. In some aspects, the initiating of the Radio Connection comprises sending a PAC associated with a forbidden paging area (PA). In some aspects, the method further includes receiving a request to update PAC information, wherein the initiating of the Radio Connection is triggered by the receipt of the request. In some aspects, the method further includes receiving a Radio Connection Release message that comprises timing information that controls when a user terminal (UT) is to attempt a re-connection. In some aspects, the method further includes receiving a Radio Connection Release message that includes information indicative of a forbidden area (e.g., a forbidden zone).

In an aspect of the disclosure, an apparatus for communication includes a memory and a processor coupled to the memory. The processor and the memory are configured to initiate a Radio Connection, and receive a Radio Connection Reject message comprising paging area code (PAC) information after the initiating of the Radio Connection.

In an aspect of the disclosure, an apparatus for communication includes means for initiating a Radio Connection, and means for receiving a Radio Connection Reject message comprising paging area code (PAC) information after the initiating of the Radio Connection.

In an aspect of the disclosure, a non-transitory computer-readable medium storing computer-executable code includes code to: initiate a Radio Connection, and receive a Radio Connection Reject message comprising paging area code (PAC) information after the initiating of the Radio Connection.

In some aspects, a method of communication includes initiating a Radio Connection, and receiving a Radio Connection Reject message after the initiating of the Radio Connection, where the Radio Connection Reject message includes an indication that a user terminal (UT) is to immediately attempt a reconnection. In some aspects, the initiating of the Radio Connection includes sending old paging area code (PAC) information. In some aspects, the initiating of the Radio Connection includes sending a PAC associated with a forbidden paging area (PA). In some aspects, the method further includes receiving a request to update PAC information, wherein the initiating of the Radio Connection is triggered by the receipt of the request. In some aspects, the method further includes receiving a Radio Connection Release message that comprises timing information that controls when a user terminal (UT) is to attempt a re-connection. In some aspects, the method further includes receiving a Radio Connection Release message that comprises information indicative of a forbidden area.

In an aspect of the disclosure, an apparatus for communication includes a memory and a processor coupled to the memory. The processor and the memory are configured to initiate a Radio Connection, and receive a Radio Connection Reject message after the initiation of the Radio Connection, where the Radio Connection Reject message includes an indication that the UT is to immediately attempt a reconnection.

In an aspect of the disclosure, an apparatus for communication includes means for initiating a Radio Connection, and means for receiving a Radio Connection Reject message after the initiating of the Radio Connection, where the Radio Connection Reject message includes an indication that the UT is to immediately attempt a reconnection.

In an aspect of the disclosure, a non-transitory computer-readable medium storing computer-executable code includes code to: initiate a Radio Connection, and receive a Radio Connection Reject message after the initiation of the Radio Connection, where the Radio Connection Reject message includes an indication that the UT is to immediately attempt a reconnection.

In some aspects, a method of communication includes initiating a Radio Connection, and receiving a Radio Connection Reject message after the initiating of the Radio Connection, where the Radio Connection Reject message includes a request for a user terminal (UT) to send old paging area code (PAC) information previously used by the UT. In some aspects, the request is to send the old PAC information in a Radio Connection Request message. In some aspects, the initiating of the Radio Connection includes sending old PAC information. In some aspects, the initiating of the Radio Connection includes sending a PAC associated with a forbidden paging area (PA). In some aspects, the method further includes receiving a request to update PAC information, wherein the initiating of the Radio Connection is triggered by the receipt of the request. In some aspects, the method further includes receiving a Radio Connection Release message that comprises timing information that controls when a UT is to attempt a re-connection. In some aspects, the method further includes receiving a Radio Connection Release message that comprises information indicative of a forbidden area.

In an aspect of the disclosure, an apparatus for communication includes a memory and a processor coupled to the memory. The processor and the memory are configured to initiate a Radio Connection, and receive a Radio Connection Reject message after the initiation of the Radio Connection, where the Radio Connection Reject message includes a request for a UT to send old PAC information previously used by the UT.

In an aspect of the disclosure, an apparatus for communication includes means for initiating a Radio Connection, and means for receive a Radio Connection Reject message after the initiating of the Radio Connection, where the Radio Connection Reject message includes a request for a UT to send old PAC information previously used by the UT.

In an aspect of the disclosure, a non-transitory computer-readable medium storing computer-executable code includes code to: initiate a Radio Connection, and receive a Radio Connection Reject message after the initiation of the Radio Connection, where the Radio Connection Reject message includes a request for a UT to send old PAC information previously used by the UT.

In some aspects, a method of communication includes initiating a paging area code (PAC) update procedure, and sending a message comprising an old PAC previously used by a user terminal (UT). In some aspects, the message is a Connection Request message. In some aspects, the message further comprises a new PAC. In some aspects, the method further includes initiating a Radio Connection.

In an aspect of the disclosure, an apparatus for communication includes a memory and a processor coupled to the memory. The processor and the memory are configured to initiate a paging area code (PAC) update procedure, and send a message comprising an old PAC previously used by a UT.

In an aspect of the disclosure, an apparatus for communication includes means for initiating a paging area code (PAC) update procedure, and means for sending a message comprising an old PAC previously used by a UT.

In an aspect of the disclosure, a non-transitory computer-readable medium storing computer-executable code includes code to: initiate a paging area code (PAC) update procedure, and send a message comprising an old PAC previously used by a UT.

The disclosure relates in some aspect to defining a reserved value for PAC (PACdefault). PACdefault may be used when an AxP assigned PAC is not available (e.g., when initiating an Attach procedure on "power on", or after a lapse of "service restriction for forbidden area").

The disclosure relates in some aspect to assigning a new PAC and communicating it to the UT in a Radio Connection Reject message indicating an immediate re-attempt. In addition, the message may include an optional indicator requesting the UT to send its old PAC in the next Radio Connection Request.

In some aspects, a Radio Connection Reject may include a value of 0 for a waitTime field indicating that a UT is to "immediately re-attempt" reconnection. A Radio Connection Reject may include a field for a new PAC that is any valid PAC different from an old PAC. A Radio Connection Reject may include a field that indicates whether an old PAC is needed (e.g., a value of TRUE or FALSE).

The disclosure relates in some aspect to sending an old PAC in a Radio Connection Request on request of an AxP (e.g., indicated to the UT in an old PAC needed field).

The disclosure relates in some aspect to sending a restriction duration, a restricted area definition, and a trigger for initiating a PAU procedure in a Radio Connection Release message. The Radio Connection Release may include, for example: a field for a Duration Threshold, a field for list of Restricted Areas, and a field for an indication that an immediate update is required. The Duration Threshold may define the duration of a service restriction. Each restricted area in the list may be defined as tuple of a GPS coordinate and a Distance around that coordinate. The Update Required field set to Immediate may forces a PAU procedure with an invalid PAC value.

The disclosure relates in some aspect to assigning a UT to a forbidden PAC (when the GPS location is false in a forbidden area) and sending this information in a Radio Connection Reconfiguration message. The Radio Connection Reconfiguration message may include, for example: a field for a new PAC, a field for an indication that an update is required on release, and a field for a Location Change Threshold. The field for the new PAC may include, in some cases, any valid PAC value from a forbidden PA set. The Update Required set to On Release may initiates a PAU procedure only after connection release. The Location Change Threshold may allowing for fine tuning of a location threshold for idle mode and connected mode during a span of a Radio connection.

The disclosure relates in some aspect to requesting a connection release on completion of a UT location report procedure using an indicator in a Location Indication message. The Location Indication message may include, for example, a field for a Connection Release Indication (e.g., a value of TRUE or FALSE). A value of TRUE may force an AxP to release a connection.

The disclosure relates in some aspect to requesting a connection release with a Radio Connection Release Request message. The disclosure relates in some aspect to requesting a UT location with a Location Request message.

In an aspect of the disclosure, an apparatus for communication includes a memory and a processor coupled to the memory. The processor and the memory are configured to determine that a user terminal in idle mode is to be assigned paging area code (PAC) information, and conduct a mobility operation using a default PAC as a result of the determination.

In an aspect of the disclosure, an apparatus for communication includes means for determining that a user terminal in idle mode is to be assigned paging area code (PAC) information, and means for conducting a mobility operation using a default PAC as a result of the determination.

In an aspect of the disclosure, a non-transitory computer-readable medium storing computer-executable code includes code to: determine that a user terminal in idle mode is to be assigned paging area code (PAC) information, and conduct a mobility operation using a default PAC as a result of the determination.

In an aspect of the disclosure, an apparatus for communication includes a memory and a processor coupled to the memory. The processor and the memory are configured to initiate a Radio Connection, and receive a Radio Connection Reject message comprising paging area code (PAC) information after the initiating of the Radio Connection. In some aspects, the processor and the memory are further configured to receive a request to update PAC information, wherein the initiating of the Radio Connection is triggered by the receipt of the request. In some aspects, the processor and the memory are further configured to receive a Radio Connection Release message that comprises timing information that controls when a user terminal (UT) is to attempt a re-connection. In some aspects, the processor and the memory are further configured to receive a Radio Connection Release message that comprises information indicative of a forbidden area.

In an aspect of the disclosure, an apparatus for communication includes means for initiating a Radio Connection, and means for receiving a Radio Connection Reject message comprising paging area code (PAC) information after the initiating of the Radio Connection. In some aspects, the apparatus further includes means for receiving a request to update PAC information, wherein the initiating of the Radio Connection is triggered by the receipt of the request. In some aspects, the apparatus further includes means for receiving a Radio Connection Release message that comprises timing information that controls when a user terminal (UT) is to attempt a re-connection. In some aspects, the apparatus further includes means for receiving a Radio Connection Release message that comprises information indicative of a forbidden area.

In an aspect of the disclosure, a non-transitory computer-readable medium storing computer-executable code includes code to: initiate a Radio Connection, and receive a Radio Connection Reject message comprising paging area code (PAC) information after the initiating of the Radio Connection. In some aspects, the computer-executable code further includes code to receive a request to update PAC information, wherein the initiating of the Radio Connection is triggered by the receipt of the request. In some aspects, the computer-executable code further includes code to receive a Radio Connection Release message that comprises timing information that controls when a user terminal (UT) is to attempt a re-connection. In some aspects, the computer-executable code further includes code to receive a Radio Connection Release message that comprises information indicative of a forbidden area.

In an aspect of the disclosure, an apparatus for communication includes a memory and a processor coupled to the memory. The processor and the memory are configured to initiate a Radio Connection, and receive a Radio Connection Reject message comprising an indication that the UT is to immediately attempt a reconnection after the initiating of the Radio Connection. In some aspects, the processor and the memory are further configured to receive a request to update PAC information, wherein the initiating of the Radio Connection is triggered by the receipt of the request. In some aspects, the processor and the memory are further configured to receive a Radio Connection Release message that comprises timing information that controls when a user terminal (UT) is to attempt a re-connection. In some aspects, the processor and the memory are further configured to receive a Radio Connection Release message that comprises information indicative of a forbidden area.

In an aspect of the disclosure, an apparatus for communication includes means for initiating a Radio Connection, and means for receiving a Radio Connection Reject message comprising an indication that the UT is to immediately attempt a reconnection after the initiating of the Radio Connection. In some aspects, the apparatus further includes means for receiving a request to update PAC information, wherein the initiating of the Radio Connection is triggered by the receipt of the request. In some aspects, the apparatus further includes means for receiving a Radio Connection Release message that comprises timing information that controls when a user terminal (UT) is to attempt a re-connection. In some aspects, the apparatus further includes means for receiving a Radio Connection Release message that comprises information indicative of a forbidden area.

In an aspect of the disclosure, a non-transitory computer-readable medium storing computer-executable code includes code to: initiate a Radio Connection, and receive a Radio Connection Reject message comprising an indication that the UT is to immediately attempt a reconnection after the initiating of the Radio Connection. In some aspects, the computer-executable code further includes code to receive a request to update PAC information, wherein the initiating of the Radio Connection is triggered by the receipt of the request. In some aspects, the computer-executable code further includes code to receive a Radio Connection Release message that comprises timing information that controls when a user terminal (UT) is to attempt a re-connection. In some aspects, the computer-executable code further includes code to receive a Radio Connection Release message that comprises information indicative of a forbidden area.

In an aspect of the disclosure, an apparatus for communication includes a memory and a processor coupled to the memory. The processor and the memory are configured to initiate a Radio Connection, and receive a Radio Connection Reject message comprising a request for a UT to send old PAC information previously used by the UT after the initiating of the Radio Connection. In some aspects, the processor and the memory are further configured to receive a request to update PAC information, wherein the initiating of the Radio Connection is triggered by the receipt of the request. In some aspects, the processor and the memory are further configured to receive a Radio Connection Release message that comprises timing information that controls when a user terminal (UT) is to attempt a re-connection. In some aspects, the processor and the memory are further configured to receive a Radio Connection Release message that comprises information indicative of a forbidden area.

In an aspect of the disclosure, an apparatus for communication includes means for initiating a Radio Connection, and means for receive a Radio Connection Reject message comprising a request for a UT to send old PAC information previously used by the UT after the initiating of the Radio Connection. In some aspects, the apparatus further includes means for receiving a request to update PAC information, wherein the initiating of the Radio Connection is triggered by the receipt of the request. In some aspects, the apparatus further includes means for receiving a Radio Connection Release message that comprises timing information that controls when a user terminal (UT) is to attempt a re-connection. In some aspects, the apparatus further includes means for receiving a Radio Connection Release message that comprises information indicative of a forbidden area.

In an aspect of the disclosure, a non-transitory computer-readable medium storing computer-executable code includes code to: initiate a Radio Connection, and receive a Radio Connection Reject message comprising a request for a UT to send old PAC information previously used by the UT after the initiating of the Radio Connection. In some aspects, the computer-executable code further includes code to receive a request to update PAC information, wherein the initiating of the Radio Connection is triggered by the receipt of the request. In some aspects, the computer-executable code further includes code to receive a Radio Connection Release message that comprises timing information that controls when a user terminal (UT) is to attempt a re-connection. In some aspects, the computer-executable code further includes code to receive a Radio Connection Release message that comprises information indicative of a forbidden area.

In an aspect of the disclosure, an apparatus for communication includes a memory and a processor coupled to the memory. The processor and the memory are configured to initiate a paging area code (PAC) update procedure, and send a message comprising an old PAC previously used by a UT. In some aspects, the processor and the memory are further configured to initiate a Radio Connection.

In an aspect of the disclosure, an apparatus for communication includes means for initiating a paging area code (PAC) update procedure, and means for sending a message comprising an old PAC previously used by a UT. In some aspects, the apparatus further includes means for initiating a Radio Connection.

In an aspect of the disclosure, a non-transitory computer-readable medium storing computer-executable code includes code to: initiate a paging area code (PAC) update procedure, and send a message comprising an old PAC previously used by a UT. In some aspects, the computer-executable code further includes code to initiate a Radio Connection.

In an aspect of the disclosure, an apparatus for communication includes a memory and a processor coupled to the memory. The processor and the memory are configured to determine that a user terminal (UT) is located within a forbidden area, and send a Radio Connection Reconfiguration message to the UT as a result of the determination, wherein the Radio Connection Reconfiguration message includes a paging area code associated with the forbidden area for the UT. In some aspects, the processor and the memory are further configured to receive a Radio Connection Release message that comprises a request to initiate a Core Network Control Layer update procedure after sending a Radio Connection Reconfiguration message, and initiate the Core Network Control Layer update procedure as a result of receiving the Radio Connection Release message.

In an aspect of the disclosure, an apparatus for communication includes means for determining that a user terminal (UT) is located within a forbidden area, and means for sending a Radio Connection Reconfiguration message to the UT as a result of the determination, wherein the Radio Connection Reconfiguration message includes a paging area code associated with the forbidden area for the UT. In some aspects, the apparatus further includes means for receiving a Radio Connection Release message that comprises a request to initiate a Core Network Control Layer update procedure after sending a Radio Connection Reconfiguration message, and means for initiating the Core Network Control Layer update procedure as a result of receiving the Radio Connection Release message.

In an aspect of the disclosure, a non-transitory computer-readable medium storing computer-executable code includes code to: determine that a user terminal (UT) is located within a forbidden area, and send a Radio Connection Reconfiguration message to the UT as a result of the determination, wherein the Radio Connection Reconfiguration message includes a paging area code associated with the forbidden area for the UT. In some aspects, the computer-executable code further includes code to receive a Radio Connection Release message that comprises a request to initiate a Core Network Control Layer update procedure after sending a Radio Connection Reconfiguration message, and initiate the Core Network Control Layer update procedure as a result of receiving the Radio Connection Release message.

In an aspect of the disclosure, an apparatus for communication includes a memory and a processor coupled to the memory. The processor and the memory are configured to receive location information for a user terminal (UT), determine, based on the location information, a proximity of the UT to a forbidden area, and define a location reporting threshold for the UT based on the determination. In some aspects, the processor and the memory are further configured to send the location reporting threshold to the UT via a Radio Connection Reconfiguration message.

In an aspect of the disclosure, an apparatus for communication includes means for receiving location information for a user terminal (UT), means for determining, based on the location information, a proximity of the UT to a forbidden area, and means for defining a location reporting threshold for the UT based on the determination. In some aspects, the apparatus further includes means for sending the location reporting threshold to the UT via a Radio Connection Reconfiguration message.

In an aspect of the disclosure, a non-transitory computer-readable medium storing computer-executable code includes code to: receive location information for a user terminal (UT), determine, based on the location information, a proximity of the UT to a forbidden area, and define a location reporting threshold for the UT based on the determination. send the location reporting threshold to the UT via a Radio Connection Reconfiguration message. In some aspects, the computer-executable code further includes code to send the location reporting threshold to the UT via a Radio Connection Reconfiguration message.

In an aspect of the disclosure, an apparatus for communication includes a memory and a processor coupled to the memory. The processor and the memory are configured to determine that a service restriction no longer applies for a user terminal (UT), and conduct a mobility operation using a default paging area code (PAC) as a result of the determination.

In an aspect of the disclosure, an apparatus for communication includes means for determining that a service restriction no longer applies for a user terminal (UT), and means for conducting a mobility operation using a default paging area code (PAC) as a result of the determination In an aspect of the disclosure, a non-transitory computer-readable medium storing computer-executable code includes code to: determine that a service restriction no longer applies for a user terminal (UT), and conduct a mobility operation using a default paging area code (PAC) as a result of the determination In an aspect of the disclosure, an apparatus for communication includes a memory and a processor coupled to the memory. The processor and the memory are configured to determine that a trigger condition has occurred at a user terminal (UT), and send a request, from the UT, to release a connection as a result of the determination. In some aspects, the processor and the memory are further configured to send the location information for the UT, wherein the location information is sent in conjunction with the request to release the connection.

In an aspect of the disclosure, an apparatus for communication includes means for determining that a trigger condition has occurred at a user terminal (UT), and means for sending a request, from the UT, to release a connection as a result of the determination. In some aspects, the apparatus further includes means for sending the location information for the UT, wherein the location information is sent in conjunction with the request to release the connection.

In an aspect of the disclosure, a non-transitory computer-readable medium storing computer-executable code includes code to: determine that a trigger condition has occurred at a user terminal (UT), and send a request, from the UT, to release a connection as a result of the determination. In some aspects, the computer-executable code further includes code to send the location information for the UT, wherein the location information is sent in conjunction with the request to release the connection.

In an aspect of the disclosure, a method of communication includes determining that a user terminal in idle mode is to be assigned paging area code (PAC) information, and conducting a mobility operation using a default PAC as a result of the determination. In some aspects, the conducting of the mobility operation includes initiating a Register procedure, and initiating a Radio Connection without sending any PAC information. In some aspects, the default paging area code is excluded from a set of paging area codes used for paging area update operations. In some aspects, the default paging area code is used between a Core Network Control Layer and a Radio Connection Layer internal to a user terminal (UT). In some aspects, the default paging area code is not sent in any signaling messages over-the-air.

In an aspect of the disclosure, a method of communication includes determining that paging area code (PAC) information is to be sent to a user terminal (UT), and communicating the PAC information to the UT. In some aspects, the determination that the PAC information is to be sent to the UT includes determining that the UT needs an initial PAC assignment. In some aspects, the determination that the PAC information is to be sent to the UT includes determining that the UT needs a PAC reassignment. In some aspects, the determination that the UT needs a PAC reassignment is based on load balancing. In some aspects, the PAC information is communicated via a Radio Connection Reject message. In some aspects, the Radio Connection Reject message includes an indication that the UT is to immediately attempt a reconnection. In some aspects, the Radio Connection Reject message includes a request for the UT to send old PAC information in a Radio Connection Request. In some aspects, the method further includes using a receiving UT location report to determine whether to accept or reject the UT. In some aspects, the paging area information is communicated via a Radio Connection Request message. In some aspects, the paging area information is communicated via a Radio Connection Reconfiguration message for a non-handoff scenario. In some aspects, the Radio Connection Reconfiguration message includes timing information that controls when the UT is to attempt reconfiguration.

In an aspect of the disclosure, a method of communication includes initiating a Radio Connection, and receiving a message comprising paging area code (PAC) information after the initiating of the Radio Connection. In some aspects, the message includes a Radio Connection Reject message. In some aspects, the Radio Connection Reject message includes timing information that controls when the UT can attempt a reconnection. In some aspects, the Radio Connection Reject message includes a request for the UT to send old PAC information in a Radio Connection Request message. In some aspects, the message includes a Radio Connection Request message. In some aspects, the message includes a Radio Connection Reconfiguration message. In some aspects, the Radio Connection Reconfiguration message includes timing information that controls when a user terminal (UT) is to attempt reconfiguration. In some aspects, the initiating of the Radio Connection includes sending old PAC information. In some aspects, the initiating of the Radio Connection includes sending a PAC associated with a forbidden paging area (PA). In some aspects, the method further includes receiving a request to update PAC information, wherein the initiating of the Radio Connection is triggered by the receipt of the request. In some aspects, the method further includes receiving a Radio Connection Release message that includes timing information that controls when a user terminal (UT) is to attempt a re-connection. In some aspects, the method further includes receiving a Radio Connection Release message that includes information indicative of a forbidden area.

In an aspect of the disclosure, a method of communication includes determining that a user terminal (UT) is located within a forbidden area, and sending a Radio Connection Release message to the UT as a result of the determination. In some aspects, the Radio Connection Release message includes a request to initiate a Core Network Control Layer update procedure. In some aspects, the Radio Connection Release message includes timing information that controls when the UT is to attempt reconfiguration. In some aspects, the Radio Connection Release message includes information indicative of the forbidden area.

In an aspect of the disclosure, a method of communication includes receiving a Radio Connection Release message that includes a request to initiate a Core Network Control Layer update procedure, and initiating the Core Network Control Layer update procedure as a result of receiving the Radio Connection Release message. In some aspects, the Radio Connection Release message further includes timing information that controls when the UT is to attempt reconfiguration. In some aspects, the Radio Connection Release message further includes information indicative of a forbidden area. In some aspects, the Core Network Control Layer update procedure includes sending a forbidden paging area code (PAC).

In an aspect of the disclosure, a method of communication includes receiving location information for a user terminal (UT), determining, based on the location information, a probability of the UT being in a forbidden area, and defining a location reporting threshold for the UT based on the determination. In some aspects, the method further includes sending the location reporting threshold to the UT via a Radio Connection Reconfiguration message. In some aspects, the location reporting threshold includes a distance threshold. In some aspects, the location reporting threshold includes a duration threshold. In some aspects, the determination includes determining that the UE is near the forbidden area. In some aspects, the determination includes determining that the UE is in the forbidden area.

In an aspect of the disclosure, a method of communication includes determining that a service restriction no longer applies for a user terminal (UT), and conducting a mobility operation using a default paging area code (PAC) as a result of the determination. In some aspects, the conducting of the mobility operation includes initiating a Register procedure, and initiating a Radio Connection without sending any PAC information. In some aspects, the default paging area code is excluded from a set of paging area codes used for paging area update operations. In some aspects, the default paging area code is used between a Core Network Control Layer and a Radio Connection Layer internal to a user terminal (UT). In some aspects, the default paging area code is not sent in any signaling messages over-the-air.

In an aspect of the disclosure, a method of communication includes determining that a user terminal (UT) will enter idle mode after reporting location information for the UT, and sending the location information for the UT, wherein the location information is sent in conjunction with a request to release a connection. In some aspects, the connection is a Radio Connection for the UT. In some aspects, the connection is a Core Network Interface connection.

In an aspect of the disclosure, a method of communication includes determining that a trigger condition has occurred at a user terminal (UT), and sending a request, from the UT, to release a connection as a result of the determination. In some aspects, the determination that the trigger condition has occurred includes determining that the network has completed downloading of satellite transition information. In some aspects, the determination that the trigger condition has occurred includes determining that the UT has completed sending of location information. In some aspects, the determination that the trigger condition has occurred includes determining that the UT will transition to idle mode. In some aspects, the determination that the trigger condition has occurred includes determining that a procedure for which the connection was established has completed. In some aspects, the connection is a Radio Connection for the UT. In some aspects, the connection is a Core Network Interface connection.

In an aspect of the disclosure, a method of communication includes determining that location information for a user terminal (UT) is needed, and sending a request for the location information as a result of the determination. In some aspects, the method is performed by control processor of a ground network. In some aspects, the method is performed by traffic processor of a ground network.

In an aspect of the disclosure, an apparatus for communication includes a memory and a processor coupled to the memory. The processor and the memory are configured to determine that a user terminal in idle mode is to be assigned paging area code (PAC) information, and conduct a mobility operation using a default PAC as a result of the determination. In some aspects, the conducting of the mobility operation includes initiating a Register procedure, initiating a Radio Connection without sending any PAC information. In some aspects, the default paging area code is excluded from a set of paging area codes used for paging area update operations. In some aspects, the default paging area code is used between a Core Network Control Layer and a Radio Connection Layer internal to a user terminal (UT). In some aspects, the default paging area code is not sent in any signaling messages over-the-air.

In an aspect of the disclosure, an apparatus for communication includes a memory and a processor coupled to the memory. The processor and the memory are configured to determine that paging area code (PAC) information is to be sent to a user terminal (UT), and communicate the PAC information to the UT. In some aspects, the determination that the PAC information is to be sent to the UT includes determining that the UT needs an initial PAC assignment. In some aspects, the determination that the PAC information is to be sent to the UT includes determining that the UT needs a PAC reassignment. In some aspects, the determination that the UT needs a PAC reassignment is based on load balancing. In some aspects, the PAC information is communicated via a Radio Connection Reject message. In some aspects, the Radio Connection Reject message includes an indication that the UT is to immediately attempt a reconnection. In some aspects, the Radio Connection Reject message includes a request for the UT to send old PAC information in a Radio Connection Request. In some aspects, the processor and the memory are further configured to use a receiving UT location report to determine whether to accept or reject the UT. In some aspects, the paging area information is communicated via a Radio Connection Request message. In some aspects, the paging area information is communicated via a Radio Connection Reconfiguration message for a non-handoff scenario. In some aspects, the Radio Connection Reconfiguration message includes timing information that controls when the UT is to attempt reconfiguration.

In an aspect of the disclosure, an apparatus for communication includes a memory and a processor coupled to the memory. The processor and the memory are configured to initiate a Radio Connection, and receive a message comprising paging area code (PAC) information after the initiating of the Radio Connection. In some aspects, the message includes a Radio Connection Reject message. In some aspects, the Radio Connection Reject message includes timing information that controls when the UT can attempt a reconnection. In some aspects, the Radio Connection Reject message includes a request for the UT to send old PAC information in a Radio Connection Request message. In some aspects, the message includes a Radio Connection Request message. In some aspects, the message includes a Radio Connection Reconfiguration message. In some aspects, the Radio Connection Reconfiguration message includes timing information that controls when a user terminal (UT) is to attempt reconfiguration. In some aspects, the initiating of the Radio Connection includes sending old PAC information. In some aspects, the initiating of the Radio Connection includes sending a PAC associated with a forbidden paging area (PA). In some aspects, the processor and the memory are further configured to receive a request to update PAC information, and the initiating of the Radio Connection is triggered by the receipt of the request. In some aspects, the processor and the memory are further configured to receive a Radio Connection Release message that includes timing information that controls when a user terminal (UT) is to attempt a re-connection. In some aspects, the processor and the memory are further configured to receive a Radio Connection Release message that includes information indicative of a forbidden area.

In an aspect of the disclosure, an apparatus for communication includes a memory and a processor coupled to the memory. The processor and the memory are configured to determine that a user terminal (UT) is located within a forbidden area, and send a Radio Connection Release message to the UT as a result of the determination. In some aspects, the Radio Connection Release message includes a request to initiate a Core Network Control Layer update procedure. In some aspects, the Radio Connection Release message includes timing information that controls when the UT is to attempt reconfiguration. In some aspects, the Radio Connection Release message includes information indicative of the forbidden area.

In an aspect of the disclosure, an apparatus for communication includes a memory and a processor coupled to the memory. The processor and the memory are configured to receive a Radio Connection Release message that includes a request to initiate a Core Network Control Layer update procedure, and initiate the Core Network Control Layer update procedure as a result of receiving the Radio Connection Release message. In some aspects, the Radio Connection Release message further includes timing information that controls when the UT is to attempt reconfiguration. In some aspects, the Radio Connection Release message further includes information indicative of a forbidden area. In some aspects, the Core Network Control Layer update procedure includes sending a forbidden paging area code (PAC).

In an aspect of the disclosure, an apparatus for communication includes a memory and a processor coupled to the memory. The processor and the memory are configured to receive location information for a user terminal (UT), determine, based on the location information, a probability of the UT being in a forbidden area, and define a location reporting threshold for the UT based on the determination. In some aspects, the processor and the memory are further configured to send the location reporting threshold to the UT via a Radio Connection Reconfiguration message. In some aspects, the location reporting threshold includes a distance threshold. In some aspects, the location reporting threshold includes a duration threshold. In some aspects, the determination includes determining that the UE is near the forbidden area. In some aspects, the determination includes determining that the UE is in the forbidden area.

In an aspect of the disclosure, an apparatus for communication includes a memory and a processor coupled to the memory. The processor and the memory are configured to determine that a service restriction no longer applies for a user terminal (UT), and conduct a mobility operation using a default paging area code (PAC) as a result of the determination. In some aspects, the conducting of the mobility operation includes initiating a Register procedure, and initiating a Radio Connection without sending any PAC information. In some aspects, the default paging area code is excluded from a set of paging area codes used for paging area update operations. In some aspects, the default paging area code is used between a Core Network Control Layer and a Radio Connection Layer internal to a user terminal (UT). In some aspects, the default paging area code is not sent in any signaling messages over-the-air.

In an aspect of the disclosure, an apparatus for communication includes a memory and a processor coupled to the memory. The processor and the memory are configured to determine that a user terminal (UT) will enter idle mode after reporting location information for the UT, and send the location information for the UT, wherein the location information is sent in conjunction with a request to release a connection. In some aspects, the connection is a Radio Connection for the UT. In some aspects, the connection is a Core Network Interface connection.

In an aspect of the disclosure, an apparatus for communication includes a memory and a processor coupled to the memory. The processor and the memory are configured to determine that a trigger condition has occurred at a user terminal (UT), and send a request, from the UT, to release a connection as a result of the determination. In some aspects, the determination that the trigger condition has occurred includes determining that the network has completed downloading of satellite transition information. In some aspects, the determination that the trigger condition has occurred includes determining that the UT has completed sending of location information. In some aspects, the determination that the trigger condition has occurred includes determining that the UT will transition to idle mode. In some aspects, the determination that the trigger condition has occurred includes determining that a procedure for which the connection was established has completed. In some aspects, the connection is a Radio Connection for the UT. In some aspects, the connection is a Core Network Interface connection.

In an aspect of the disclosure, an apparatus for communication includes a memory and a processor coupled to the memory. The processor and the memory are configured to determine that location information for a user terminal (UT) is needed, and send a request for the location information as a result of the determination. In some aspects, the apparatus is a control processor of a ground network. In some aspects, the apparatus is a traffic processor of a ground network.

In an aspect of the disclosure, an apparatus for communication includes means for determining that a user terminal in idle mode is to be assigned paging area code (PAC) information, and means for conducting a mobility operation using a default PAC as a result of the determination.

In an aspect of the disclosure, an apparatus for communication includes means for determining that paging area code (PAC) information is to be sent to a user terminal (UT), and means for communicating the PAC information to the UT. In some aspects, the apparatus further includes means for using a receiving UT location report to determine whether to accept or reject the UT.

In an aspect of the disclosure, an apparatus for communication includes means for initiating a Radio Connection, and means for receiving a message comprising paging area code (PAC) information after the initiating of the Radio Connection. In some aspects, the apparatus further includes means for receiving a request to update PAC information, wherein the initiating of the Radio Connection is triggered by the receipt of the request. In some aspects, the apparatus further includes means for receiving a Radio Connection Release message that includes timing information that controls when a user terminal (UT) is to attempt a re-connection. In some aspects, the apparatus further includes means for receiving a Radio Connection Release message that includes information indicative of a forbidden area.

In an aspect of the disclosure, an apparatus for communication includes means for determining that a user terminal (UT) is located within a forbidden area, and means for sending a Radio Connection Release message to the UT as a result of the determination.

In an aspect of the disclosure, an apparatus for communication includes means for receiving a Radio Connection Release message that includes a request to initiate a Core Network Control Layer update procedure, and means for initiating the Core Network Control Layer update procedure as a result of receiving the Radio Connection Release message.

In an aspect of the disclosure, an apparatus for communication includes means for receiving location information for a user terminal (UT), means for determining, based on the location information, a probability of the UT being in a forbidden area, and means for defining a location reporting threshold for the UT based on the determination. In some aspects, the apparatus further includes means for sending the location reporting threshold to the UT via a Radio Connection Reconfiguration message.

In an aspect of the disclosure, an apparatus for communication includes means for determining that a service restriction no longer applies for a user terminal (UT), and means for conducting a mobility operation using a default paging area code (PAC) as a result of the determination.

In an aspect of the disclosure, an apparatus for communication includes means for determining that a user terminal (UT) will enter idle mode after reporting location information for the UT, and means for sending the location information for the UT, wherein the location information is sent in conjunction with a request to release a connection.

In an aspect of the disclosure, an apparatus for communication includes means for determining that a trigger condition has occurred at a user terminal (UT), and means for sending a request, from the UT, to release a connection as a result of the determination.

In an aspect of the disclosure, an apparatus for communication includes means for determining that location information for a user terminal (UT) is needed, and means for sending a request for the location information as a result of the determination.

In an aspect of the disclosure, a non-transitory computer-readable medium storing computer-executable code, includes code to determine that a user terminal in idle mode is to be assigned paging area code (PAC) information, and conduct a mobility operation using a default PAC as a result of the determination.

In an aspect of the disclosure, a non-transitory computer-readable medium storing computer-executable code, includes code to determine that paging area code (PAC) information is to be sent to a user terminal (UT), and communicate the PAC information to the UT.

In an aspect of the disclosure, a non-transitory computer-readable medium storing computer-executable code, includes code to initiate a Radio Connection, and receive a message comprising paging area code (PAC) information after the initiating of the Radio Connection.

In an aspect of the disclosure, a non-transitory computer-readable medium storing computer-executable code, includes code to determine that a user terminal (UT) is located within a forbidden area, and send a Radio Connection Release message to the UT as a result of the determination.

In an aspect of the disclosure, a non-transitory computer-readable medium storing computer-executable code, includes code to receive a Radio Connection Release message that includes a request to initiate a Core Network Control Layer update procedure, and initiate the Core Network Control Layer update procedure as a result of receiving the Radio Connection Release message.

In an aspect of the disclosure, a non-transitory computer-readable medium storing computer-executable code, includes code to receive location information for a user terminal (UT), determine, based on the location information, a probability of the UT being in a forbidden area, and define a location reporting threshold for the UT based on the determination.

In an aspect of the disclosure, a non-transitory computer-readable medium storing computer-executable code, includes code to determine that a service restriction no longer applies for a user terminal (UT), and conduct a mobility operation using a default paging area code (PAC) as a result of the determination.

In an aspect of the disclosure, a non-transitory computer-readable medium storing computer-executable code, includes code to determine that a user terminal (UT) will enter idle mode after reporting location information for the UT, and send the location information for the UT, wherein the location information is sent in conjunction with a request to release a connection.

In an aspect of the disclosure, a non-transitory computer-readable medium storing computer-executable code, includes code to determine that a trigger condition has occurred at a user terminal (UT), and send a request, from the UT, to release a connection as a result of the determination.

In an aspect of the disclosure, a non-transitory computer-readable medium storing computer-executable code, includes code to determine that location information for a user terminal (UT) is needed, and send a request for the location information as a result of the determination.

XIV. Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication with a user terminal in a cell that includes a service area and a forbidden area, comprising:
by a satellite ground network:
sending, via a satellite to the user terminal that is in the cell that includes the service area and the forbidden area, a request for location information for the user terminal;
receiving, via a satellite from the user terminal that is in the cell that includes the service area and the forbidden area, the requested location information for the user terminal;

based on the location information for the user terminal received via a satellite from the user terminal, determining that the user terminal is located within the forbidden area of the cell that also includes the service area; and sending, via a satellite to the user terminal that is in the cell that includes the service area and the forbidden area, a Radio Connection Reconfiguration message to the user terminal as a result of the determination that the user terminal is located within the forbidden area of the cell that also includes the service area, wherein the Radio Connection Reconfiguration message, which is sent via a satellite to the user terminal that is in the cell that includes the service area and the forbidden area, includes a paging area code associated with the forbidden area within which it was determined that the user terminal is located.

2. The method of claim 1, further comprising:
sending, via a satellite to the user terminal that is in the cell that includes the service area and the forbidden area, a Radio Connection Release message after sending the Radio Connection Reconfiguration message, wherein the Radio Connection Release message comprises a request to initiate a Core Network Control Layer update procedure.

3. The method of claim 2, wherein the Core Network Control Layer update procedure includes sending a forbidden paging area code.

4. The method of claim 2, wherein the Radio Connection Release message comprises a request to immediately initiate the Core Network Control Layer update procedure.

5. The method of claim 2, wherein the Radio Connection Release message comprises timing information that controls when the user terminal is to attempt reconfiguration.

6. The method of claim 2, wherein the Radio Connection Release message comprises information indicative of the forbidden area.

7. The method of claim 6, wherein the information indicative of the forbidden area comprises an ellipsoid point and a distance from the ellipsoid point.

8. An apparatus for communication comprising:
a memory; and
a processor coupled to the memory, the processor and the memory configured to:
send, via a satellite to a user terminal that is in a cell that includes a service area and a forbidden area, a request for location information for the user terminal;
receive, via a satellite from the user terminal that is in the cell that includes the service area and the forbidden area, the requested location information for the user terminal;
based on the location information for the user terminal received via a satellite from the user terminal, determine that the user terminal is located within the forbidden area of the cell that also includes the service area; and
send, via a satellite to the user terminal that is in the cell that includes the service area and the forbidden area, a Radio Connection Reconfiguration message to the user terminal as a result of the determination that the user terminal is located within the forbidden area of the cell that also includes the service area, wherein the Radio Connection Reconfiguration message, which is sent via a satellite to the user terminal that is in the cell that includes the service area and the forbidden area, includes a paging area code associated with the forbidden area within which it was determined that the user terminal is located.

9. The apparatus of claim 8, wherein:
the processor and the memory are further configured to send, via a satellite to the user terminal that is in the cell that includes the service area and the forbidden area, a Radio Connection Release message after sending the Radio Connection Reconfiguration message; and
the Radio Connection Release message comprises a request to initiate a Core Network Control Layer update procedure.

10. The apparatus of claim 9, wherein the Core Network Control Layer update procedure includes sending a forbidden paging area code.

11. The apparatus of claim 9, wherein the Radio Connection Release message comprises information indicative of the forbidden area.

12. An apparatus for communication comprising:
sending, via a satellite to a user terminal that is in a cell that includes a service area and a forbidden area, a request for location information for the user terminal;
receiving, via a satellite from the user terminal that is in the cell that includes the service area and the forbidden area, the requested location information for the user terminal;
means for determining, based on the location information for the user terminal received via a satellite from the user terminal, that the user terminal is located within the forbidden area of the cell that also includes the service area; and
means for sending, via a satellite to the user terminal that is in the cell that includes the service area and the forbidden area, a Radio Connection Reconfiguration message to the user terminal as a result of the determination that the user terminal is located within the forbidden area of the cell that also includes the service area, wherein the Radio Connection Reconfiguration message, which is sent via a satellite to the user terminal that is in the cell that includes the service area and the forbidden area, includes a paging area code associated with the forbidden area within which it was determined that the user terminal is located.

13. The apparatus of claim 12, wherein:
the means for sending is configured to send, via a satellite to the user terminal that is in the cell that includes the service area and the forbidden area, a Radio Connection Release message after sending the Radio Connection Reconfiguration message; and
the Radio Connection Release message comprises a request to initiate a Core Network Control Layer update procedure.

14. The apparatus of claim 12, further comprising:
means for receiving location information from the user terminal,
wherein the determination is based on the received location information.

15. The apparatus of claim 12, further comprising:
means for determining that location information for the user terminal is needed,
wherein the means for sending is configured to send a request for the location information as a result of the determination that location information for the user terminal is needed.

16. A non-transitory computer-readable medium storing computer-executable code, including code to:

send, via a satellite to a user terminal that is in a cell that includes a service area and a forbidden area, a request for location information for the user terminal;

receive, via a satellite from the user terminal that is in the cell that includes the service area and the forbidden area, the requested location information for the user terminal;

based on the location information for the user terminal received via a satellite from the user terminal, determine that the user terminal is located within the forbidden area of the cell that also includes the service area; and send, via a satellite to the user terminal that is in the cell that includes the service area and the forbidden area, a Radio Connection Reconfiguration message to the user terminal as a result of the determination that the user terminal is located within the forbidden area of the cell that also includes the service area, wherein the Radio Connection Reconfiguration message, which is sent via a satellite to the user terminal that is in the cell that includes the service area and the forbidden area, includes a paging area code associated with the forbidden area within which it was determined that the user terminal is located.

* * * * *